US008351983B2

(12) United States Patent
Kim et al.

(10) Patent No.: US 8,351,983 B2
(45) Date of Patent: *Jan. 8, 2013

(54) MOBILE TERMINAL FOR DISPLAYING AN IMAGE ON AN EXTERNAL SCREEN AND CONTROLLING METHOD THEREOF

(75) Inventors: Jong Hwan Kim, Suwon-si (KR); Bong Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 512 days.

This patent is subject to a terminal disclaimer.

(21) Appl. No.: 12/421,606

(22) Filed: Apr. 9, 2009

(65) Prior Publication Data

US 2010/0137026 A1 Jun. 3, 2010

(30) Foreign Application Priority Data

Dec. 2, 2008 (KR) ........................ 10-2008-0120994

(51) Int. Cl.
*H04M 1/00* (2006.01)
(52) U.S. Cl. ...................... 455/556.1; 455/566; 353/122; 353/31; 353/39; 353/119; 353/25; 345/1.1; 345/156; 345/166; 715/719; 715/730
(58) Field of Classification Search .................... None
See application file for complete search history.

(56) References Cited

U.S. PATENT DOCUMENTS

| 6,753,907 | B1 * | 6/2004 | Sukthankar et al. ........ 348/222.1 |
| 7,804,492 | B2 * | 9/2010 | Chang ............................ 345/173 |
| 7,883,221 | B2 * | 2/2011 | Nozaki et al. .................. 353/122 |
| 2005/0018144 | A1 * | 1/2005 | Wada et al. ...................... 353/69 |
| 2005/0041216 | A1 * | 2/2005 | Kobayashi ........................ 353/69 |
| 2005/0168705 | A1 * | 8/2005 | Li et al. ............................. 353/69 |
| 2006/0146015 | A1 | 7/2006 | Buchmann |
| 2007/0152984 | A1 * | 7/2007 | Ording et al. .................. 345/173 |
| 2007/0265717 | A1 * | 11/2007 | Chang ............................. 700/83 |
| 2007/0282564 | A1 | 12/2007 | Sprague et al. |
| 2008/0018591 | A1 * | 1/2008 | Pittel et al. ...................... 345/156 |
| 2008/0126145 | A1 * | 5/2008 | Rackley, III et al. .............. 705/7 |
| 2008/0239132 | A1 * | 10/2008 | Kohama .................... 348/333.01 |
| 2008/0259289 | A1 * | 10/2008 | Nozaki et al. ................... 353/70 |
| 2009/0027550 | A1 * | 1/2009 | Yang .............................. 348/445 |
| 2009/0036158 | A1 * | 2/2009 | Fujinawa et al. ........... 455/556.1 |
| 2009/0143098 | A1 * | 6/2009 | Shiono ........................ 455/556.1 |
| 2010/0031150 | A1 * | 2/2010 | Andrew ........................ 715/728 |

FOREIGN PATENT DOCUMENTS

| EP | 1396981 | 3/2004 |
| EP | 1793599 | 6/2007 |
| EP | 1793600 | 6/2007 |
| JP | WO2006/033255 | * 3/2006 |

* cited by examiner

*Primary Examiner* — Marcos Batista
*Assistant Examiner* — Keith Fang
(74) *Attorney, Agent, or Firm* — Lee, Hong, Degerman, Kang & Waimey

(57) ABSTRACT

A mobile terminal includes a projector module projecting an image onto an external surface; a display having a touchscreen; and a controller configured to receive a control signal corresponding to a touch input received via the display, wherein the control signal is for adjusting at least a size or a position of an external display area formed on the external surface such that the external display area is adjusted based on a touch pattern of the touch input, to adjust the external display area in response to the control signal, and to control the projector module to project the image on the adjusted external display area, wherein a screen area set and positioned according to the touch input is displayed via the touchscreen and the external display area is adjusted according to a size and a position of the screen area.

24 Claims, 72 Drawing Sheets

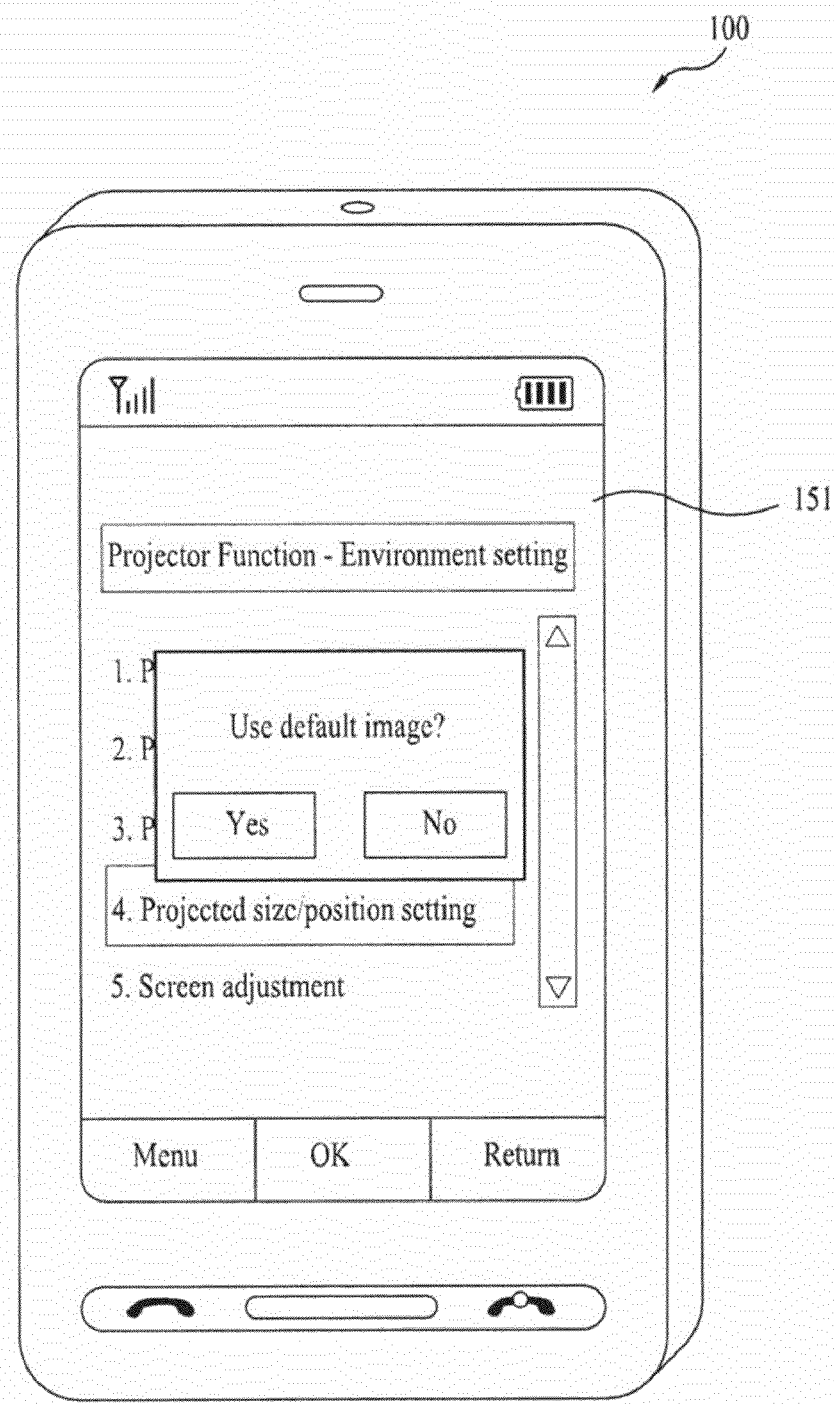

FIG. 10
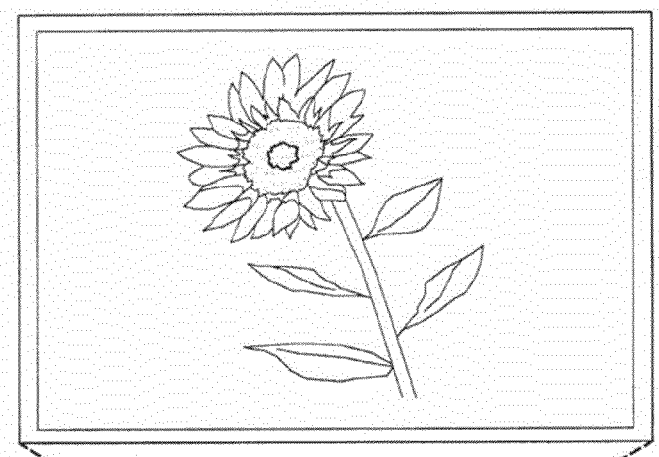
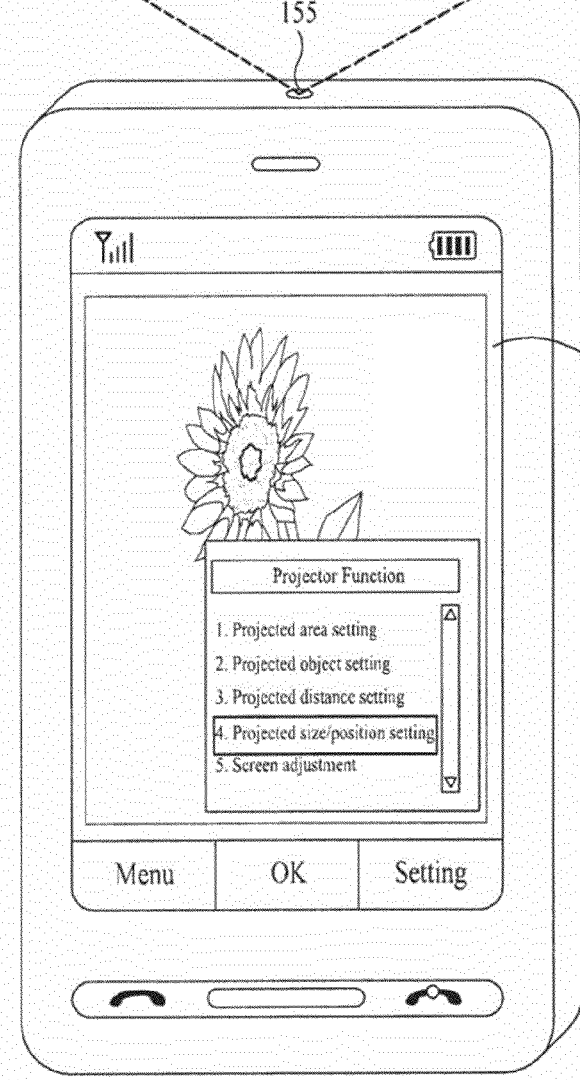

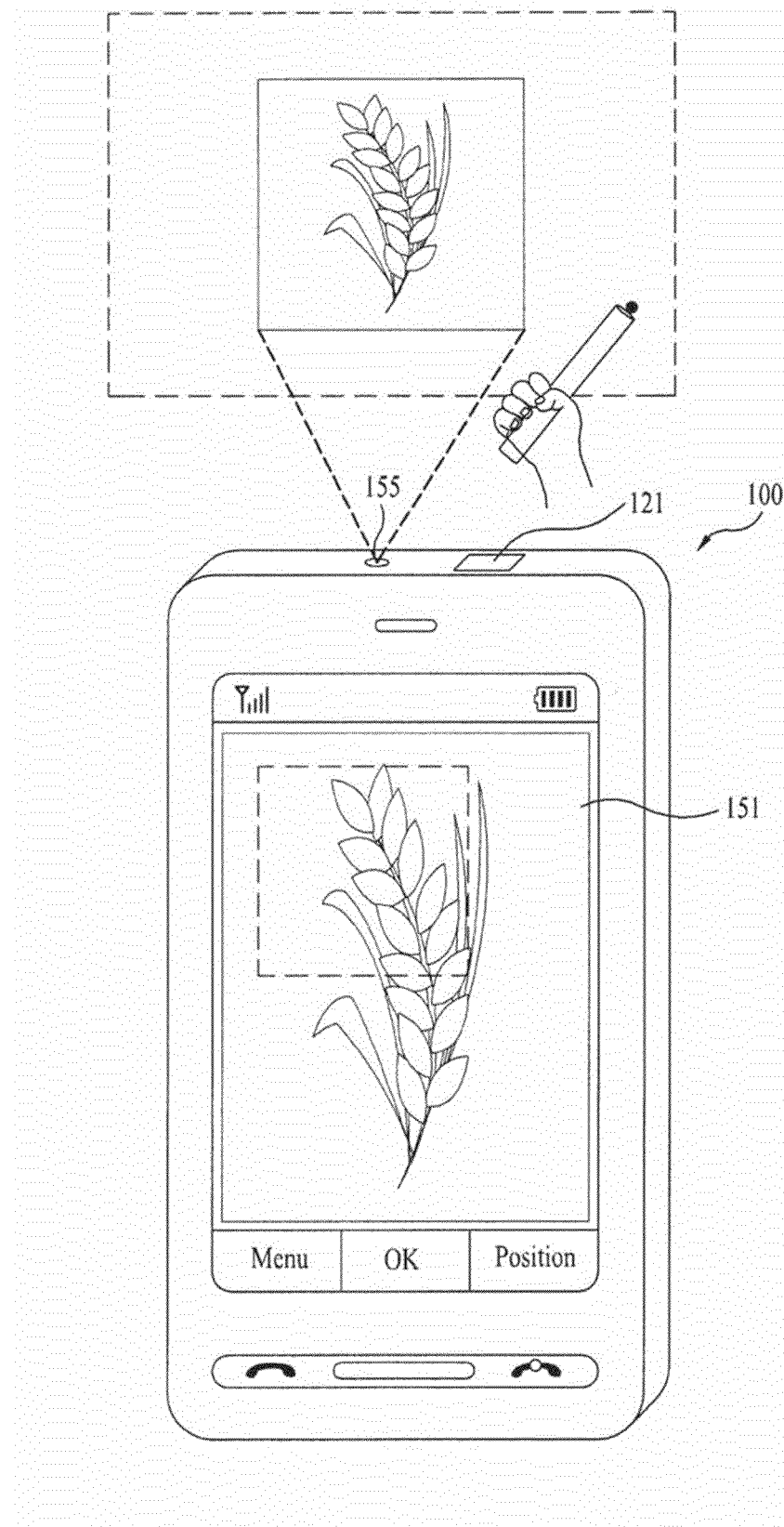

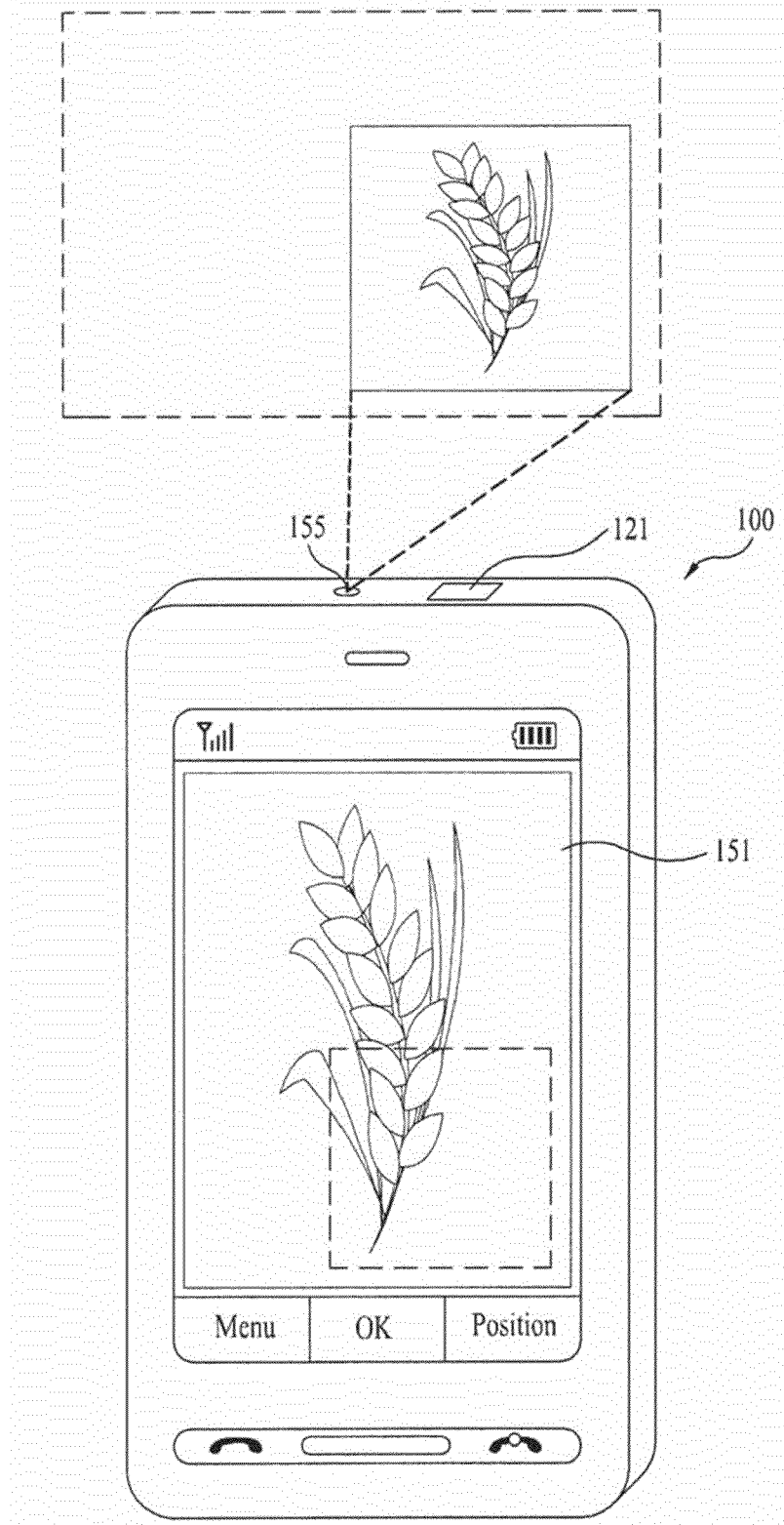

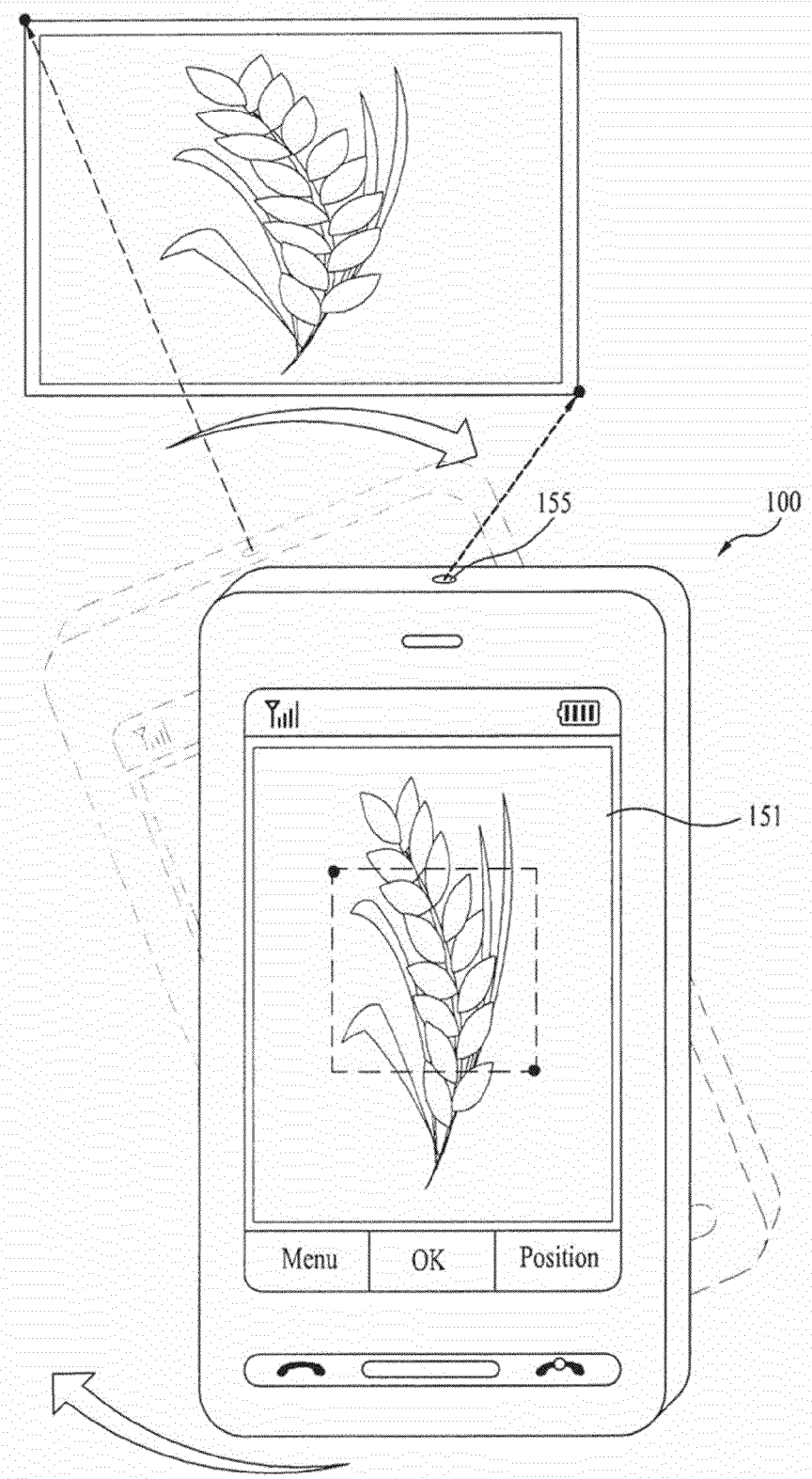

FIG. 22A
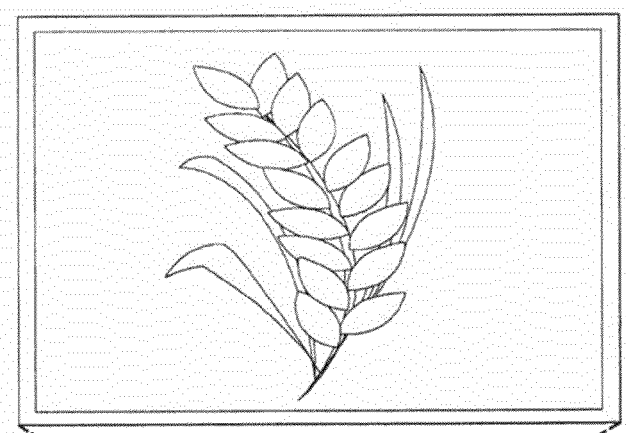
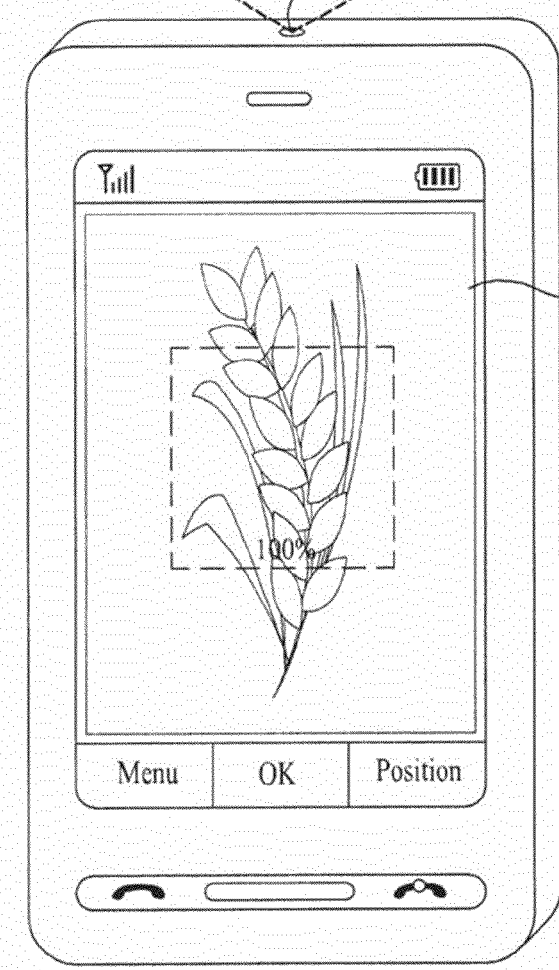

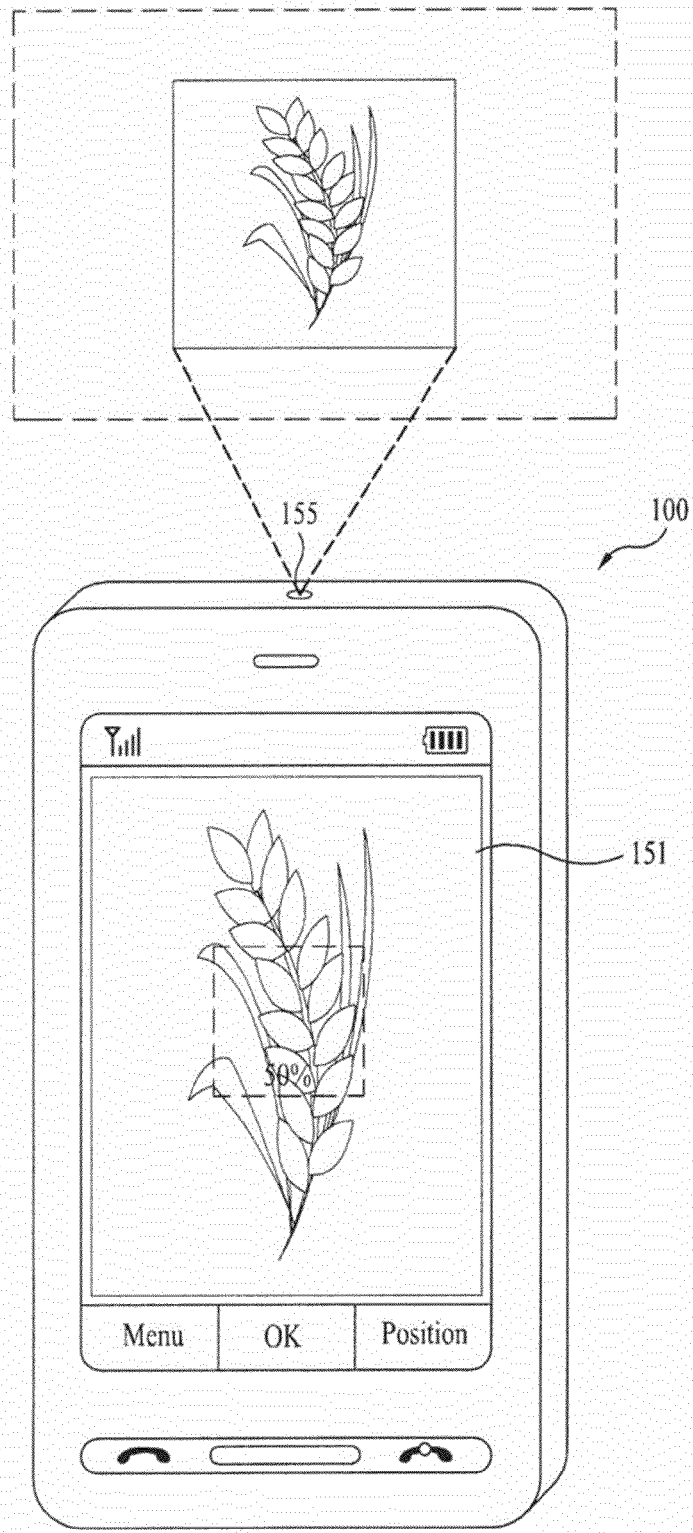

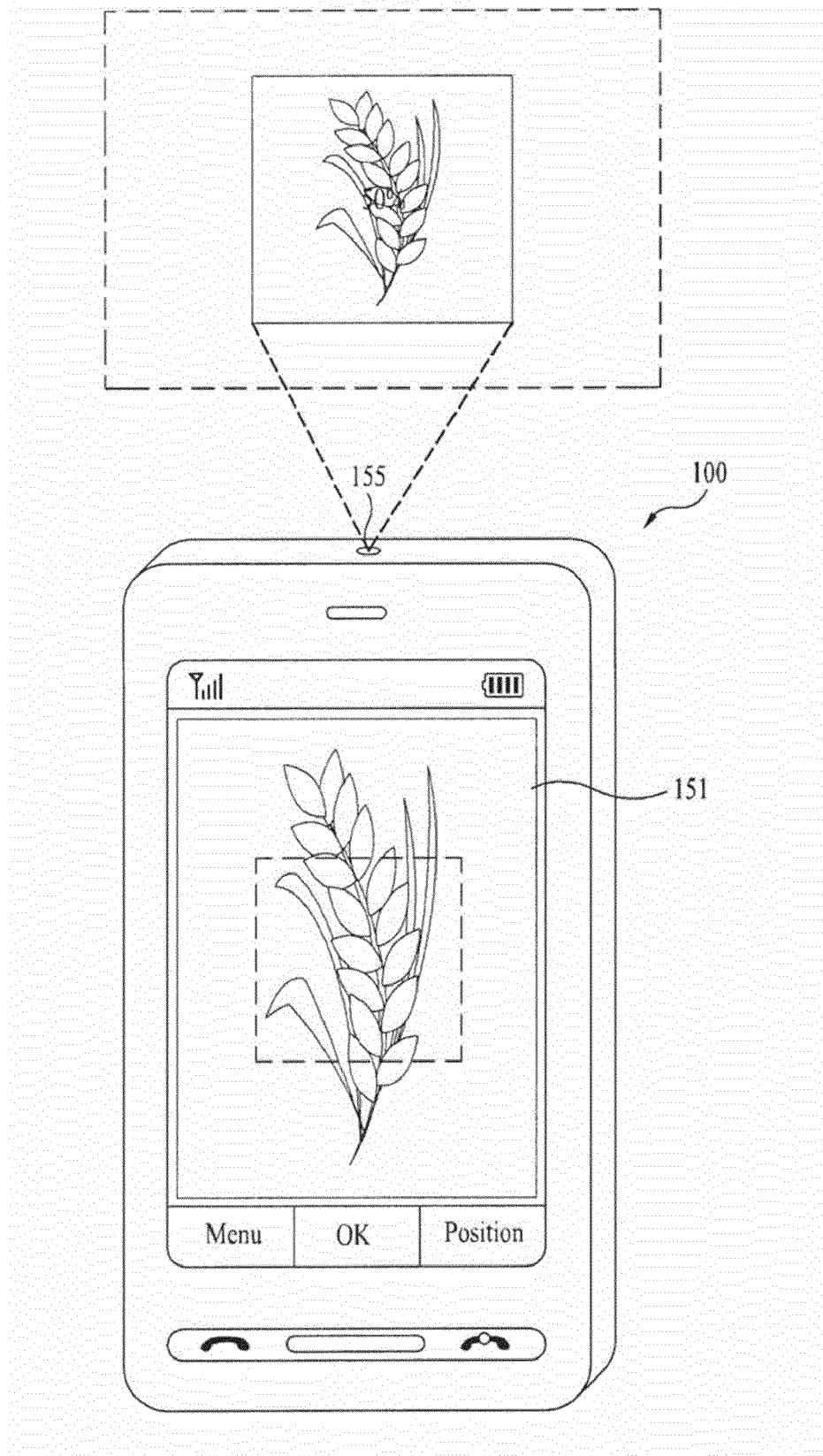

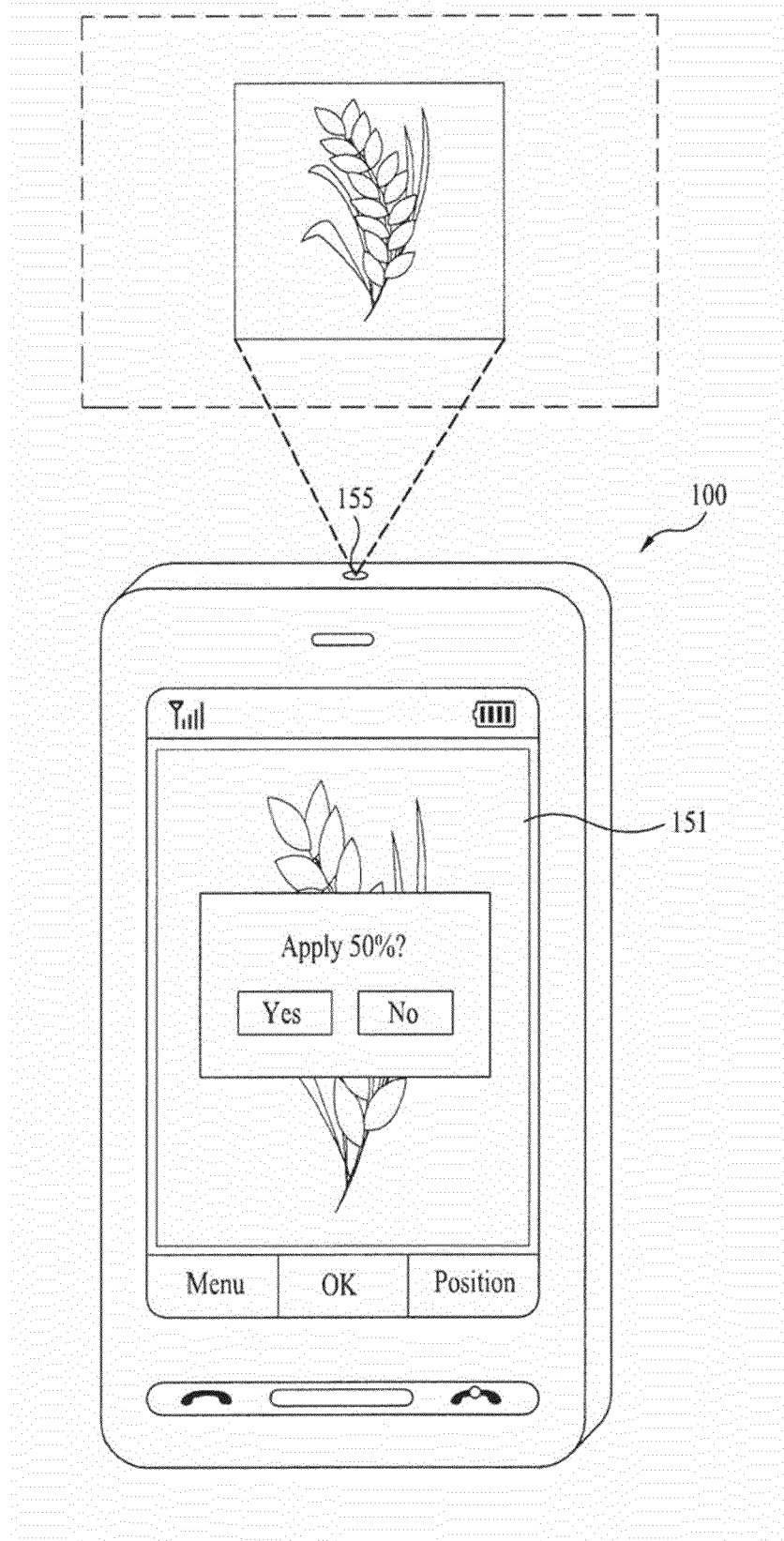

FIG. 32A
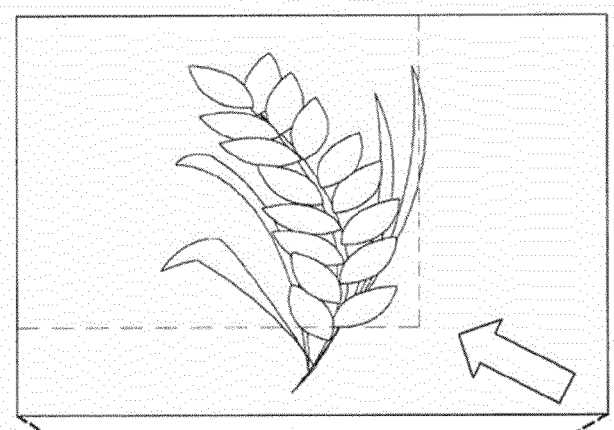
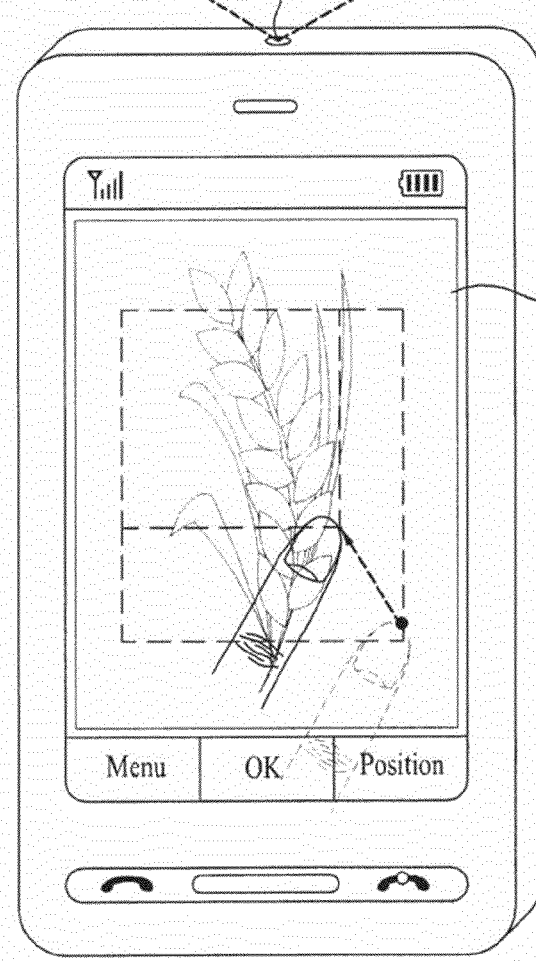

FIG. 33B
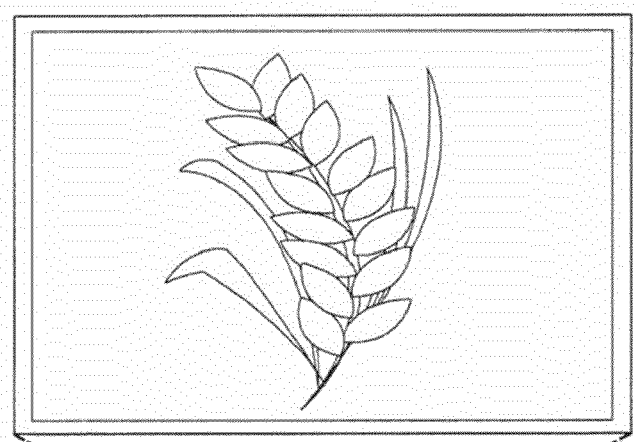
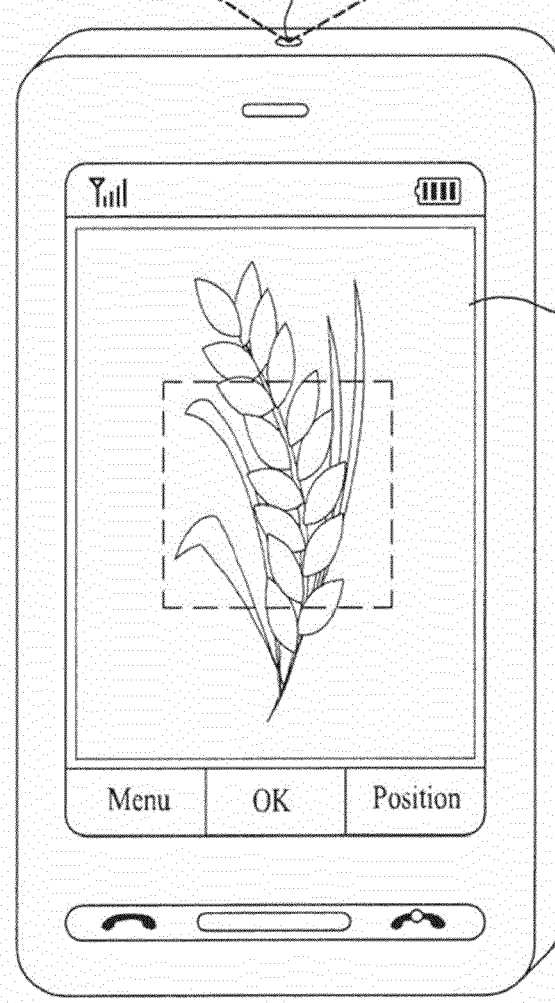

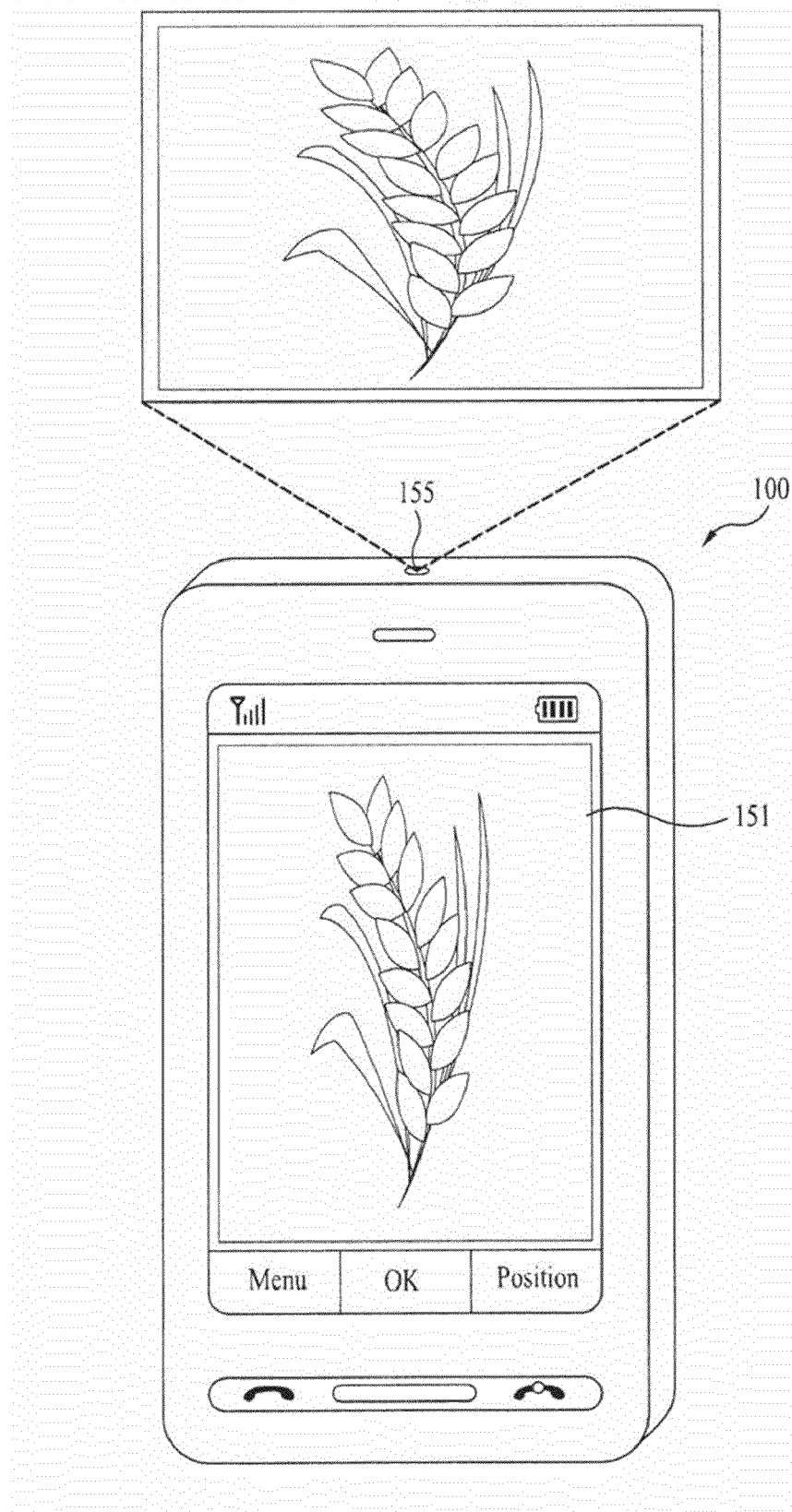

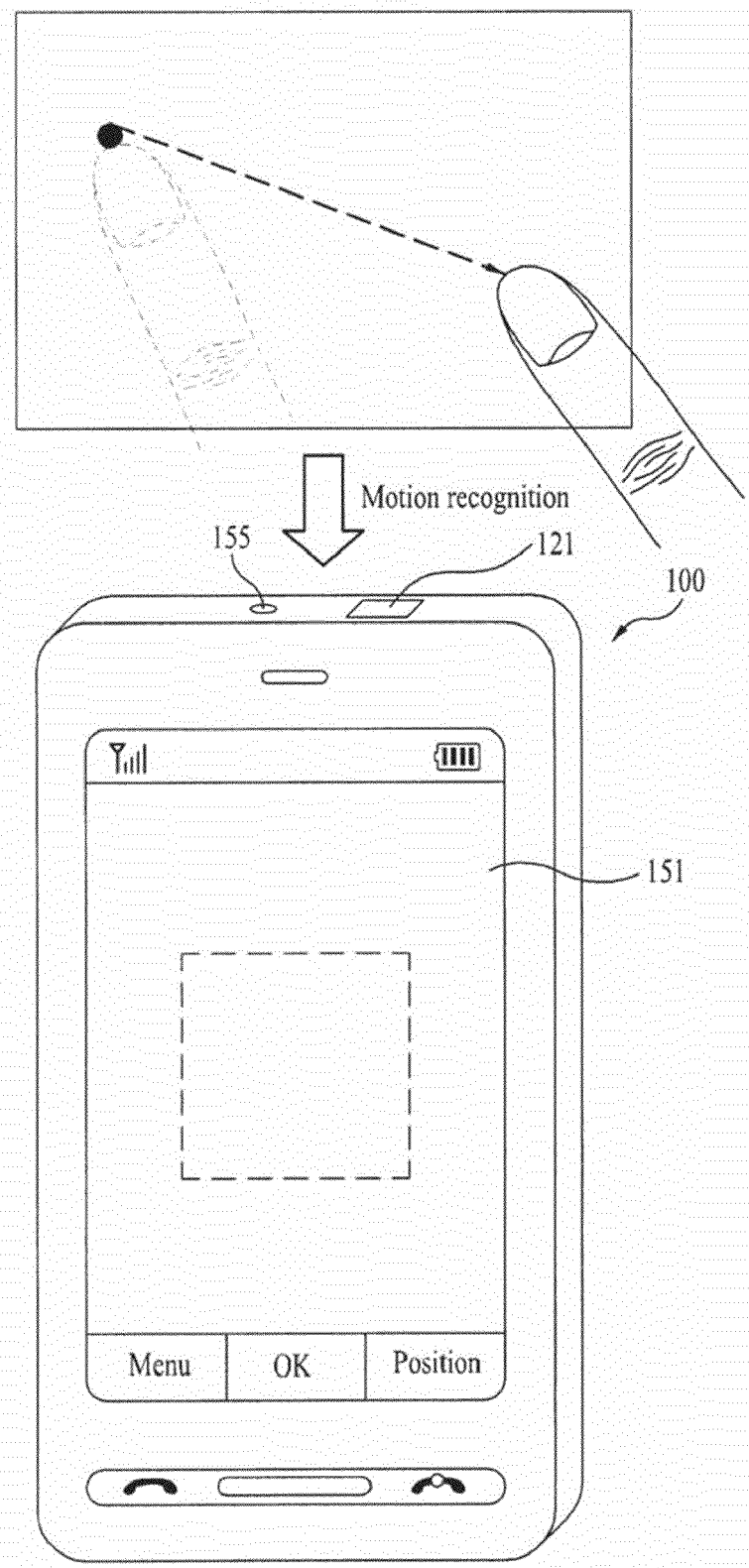

FIG. 36A
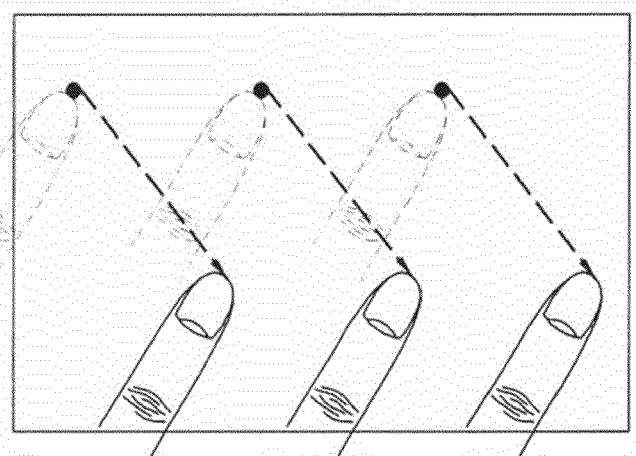
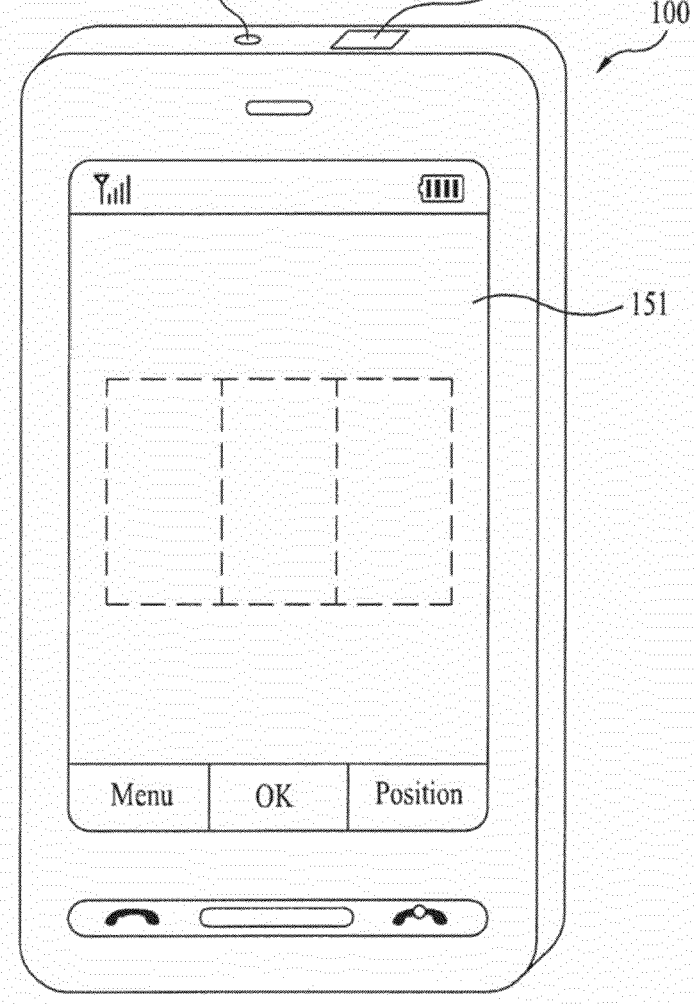

FIG. 38A
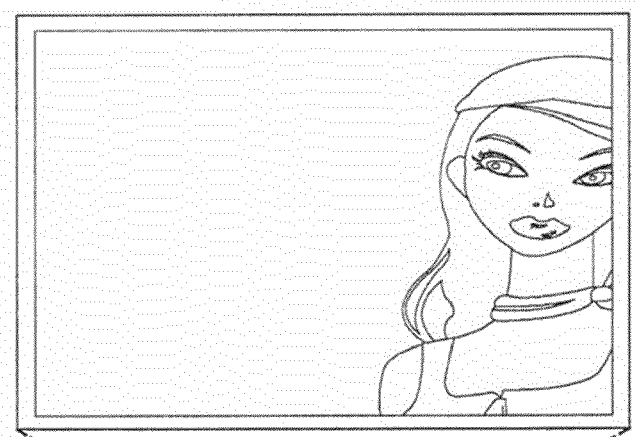
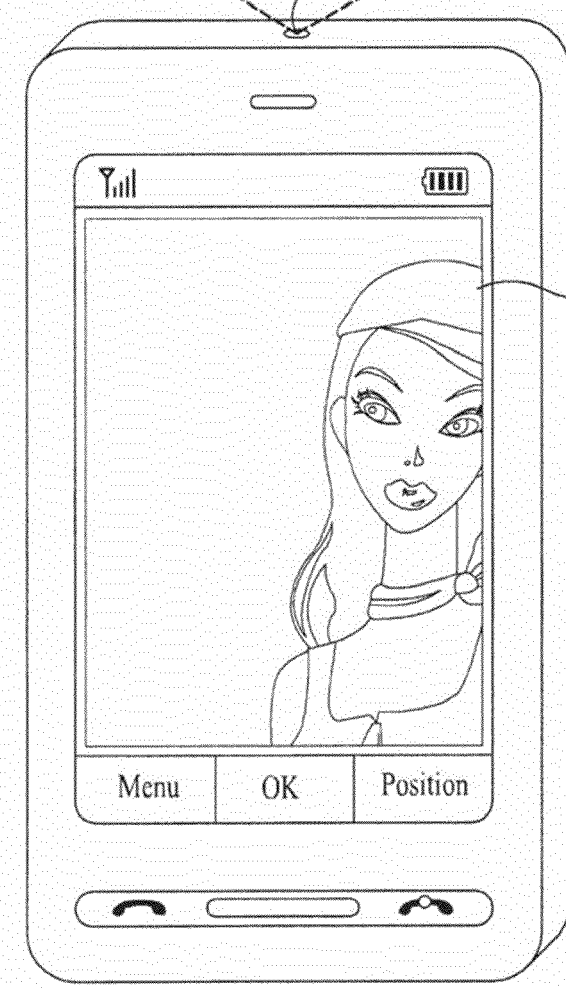

MOBILE TERMINAL FOR DISPLAYING AN IMAGE ON AN EXTERNAL SCREEN AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2008-0120994, filed on Dec. 2, 2008, the contents of which are hereby incorporated by reference herein in their entirety.

FIELD OF THE INVENTION

The present invention relates to a mobile terminal and a method of controlling a display of the mobile terminal. In particular, the mobile terminal according to the present invention is configured to display an image on an external screen.

DISCUSSION OF THE RELATED ART

Generally, terminals can be classified into mobile/portable terminals and stationary terminals. The mobile terminals can be further classified into handheld terminals and vehicle mountable terminals according to their portability.

As functions of the terminal become diversified, the terminal may also be implemented as a multimedia player provided with various functions such as photographing of photos or moving pictures, reproducing music or moving picture files, playing games, receiving broadcast and the like. Accordingly, to support the various functions of the terminal, the structural part and/or software part of the terminal need to be improved continuously.

In general, a mobile terminal provided with a projector function is able to display an image on a prescribed area of an external screen via a projector module implemented in the mobile terminal. However, in the related art, a method of controlling a size or a position of the display area on the external screen has not been provided.

SUMMARY OF THE INVENTION

In accordance with an embodiment, a mobile terminal includes a projector module configured to project an image onto an external surface to display the image on the external surface and a controller configured to adjust at least one of an area or a position of the displayed image.

In accordance with an embodiment, a mobile terminal includes a wireless communication unit configured to transmit an image that is displayable on an external surface responsive to a control signal and a controller configured to adjust the at least one of the area or the position of the displayed image responsive to the control signal.

In accordance with an embodiment, a method for projecting an image on an external surface via a mobile terminal having a projector module includes projecting an image onto an external surface to display the image onto the external surface, adjusting at least one of an area or a position of the displayed image, and displaying the image according to the adjusted at least one of the area or position.

In accordance with an embodiment, a method for displaying an image on an external screen via a mobile terminal having a projector module and a wireless communication unit includes communicating with the external screen via the wireless communication unit, transmitting the image and a control signal to the external screen, adjusting at least one of an area or a position of the displayed image responsive to the control signal, and displaying the image on the external screen according to the adjusted at least one of the area or the position.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawings.

FIGS. 9A to 10 are diagrams of screen configurations illustrating selecting menu items to control a size and a position of an area on an external screen of a mobile terminal according to one embodiment of the present invention.

FIG. 19A and FIG. 19B illustrate setting an area position according to pointer motion in a mobile terminal according to one embodiment of the present invention.

FIG. 20A and FIG. 20B illustrate setting an area size according to a motion pattern of a mobile terminal according to one embodiment of the present invention.

FIGS. 22A to 22C illustrate setting an area size according to a speech signal in a mobile terminal according to one embodiment of the present invention.

FIG. 30 illustrates displaying area setting information on an external screen with a mobile terminal according to one embodiment of the present invention.

FIG. 31 illustrates prompting a text for selecting whether to apply an area setting on an external screen in a mobile terminal according to one embodiment of the present invention.

FIG. 32A and FIG. 32B illustrate enlarging/reducing an area on an external screen according to a touch and drag action on a touchscreen of a mobile terminal according to one embodiment of the present invention.

FIG. 33A and FIG. 33B illustrate correcting an area of an external screen with a mobile terminal according to one embodiment of the present invention.

FIG. 34A and FIG. 34B illustrate displaying a preview image on an area of an external screen by a mobile terminal according to one embodiment of the present invention.

FIGS. 35A to 36B illustrate a mobile terminal according to one embodiment of the present invention displaying an image on a prescribed area of an external screen having a data transceiving function.

DETAILED DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure include a mobile phone, a smart phone, a laptop computer, a digital broadcast terminal, a PDA (personal digital assistants), a PMP (portable multimedia player), a navigation system and the like. Except a case applicable to a mobile terminal only, it is apparent to those skilled in the art that the configurations according to an embodiment described in this disclosure is also applicable to a stationary terminal such as a digital TV, a desktop computer and the like.

Figure 1:
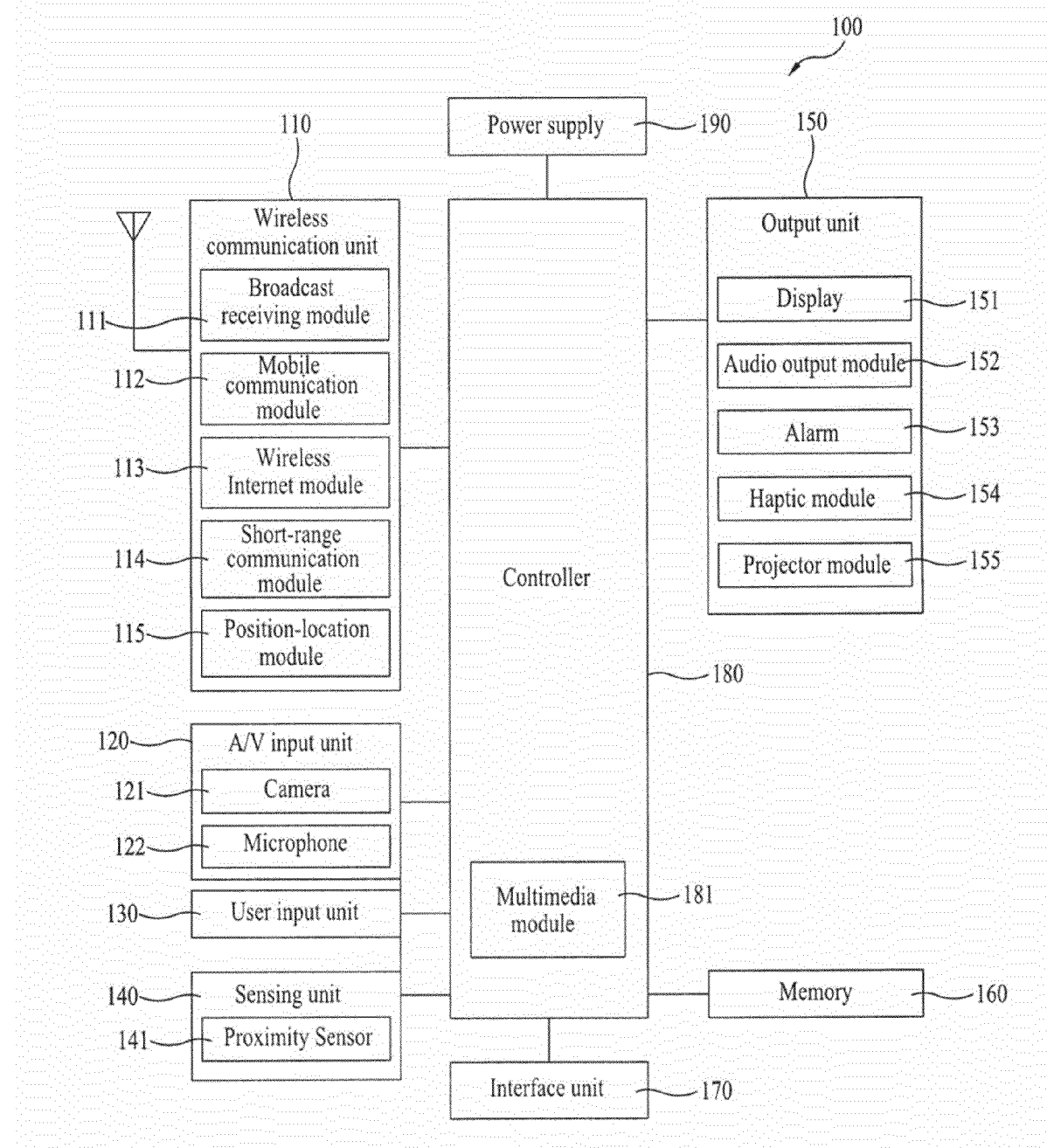
FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, and a power supply unit 190. While FIG. 1 shows the mobile terminal 100 having the above mentioned components, but it is understood that implementing all of the illustrated components is not a requirement, and thus, greater or fewer components may alternatively be implemented in the mobile terminal.

In the following description, the above mentioned elements of the mobile terminal 100 are explained. The wireless communication unit 110 typically includes one or more components which permits wireless communication between the mobile terminal 100 and a wireless communication system or network within which the mobile terminal 100 is located. For example, the wireless communication unit 110 includes a broadcast receiving module 111, a mobile communication module 112, a wireless Internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to the mobile terminal 100. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, and the like. The broadcast associated information can be provided via a mobile communication network. In this case, the broadcast associated information can be received by the mobile communication module 112.

The broadcast associated information can be implemented in various forms. For example, the broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). The broadcast receiving module 111 can also be configured to be suitable for other broadcasting systems as well as the above-described digital broadcasting systems. The broadcast signal and/or broadcast associated information received by the broadcast receiving module 111 may be stored in a suitable device, such as the memory 160.

The mobile communication module 112 transmits/receives wireless signals to/from one or more network entities, such as base station, external terminal, server, and the like. Such wireless signals may represent audio, video, and data according to text/multimedia message transceivings, among others.

The wireless Internet module 113 supports Internet access for the mobile terminal 100. This module may be internally or externally coupled to the mobile terminal 100. In this case, the wireless Internet technology can include WLAN (Wireless LAN), WI-FI, WIBRO (Wireless broadband), WIMAX (World Interoperability for Microwave Access), HSDPA (High Speed Downlink Packet Access), and the like.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as BLUETOOTH and ZIGBEE, to name a few.

The position-location module 115 identifies or otherwise obtains the location of the mobile terminal 100. If desired, this module may be implemented with a global positioning system (GPS) module.

Further referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. The processed image frames can be displayed on the display 151.

The image frames processed by the camera 121 can be stored in the memory 160 or can be externally transmitted via the wireless communication unit 110. According to one embodiment of the present invention, at least two cameras 121 can be provided to the mobile terminal 100.

The microphone 122 receives an external audio signal while the mobile terminal 100 is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad such as static pressure/capacitance, a jog wheel, a jog switch, and the like.

The sensing unit 140 provides sensing signals for controlling operations of the mobile terminal 100 using status measurements of various aspects of the mobile terminal. For example, the sensing unit 140 may detect an open/close status of the mobile terminal 100, relative positioning of components, such as a display and keypad, of the mobile terminal 100, a change of position of the mobile terminal 100 or a component of the mobile terminal 100, a presence or absence of user contact with the mobile terminal 100, orientation or acceleration/deceleration of the mobile terminal 100. For example, in the mobile terminal 100 configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. The sensing unit 140 may include a proximity sensor 141.

The output unit 150 generates outputs relevant to the senses of sight, hearing, touch and the like. The output unit 150 includes the display 151, an audio output module 152, an alarm unit 153, a haptic module 154, a projector module 155 and the like.

The display 151 is typically implemented to visually display information associated with the mobile terminal 100. For example, if the mobile terminal 100 is operating in a phone call mode, the display 151 generally provides a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some displays 151 can be implemented as a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For example, a plurality of displays 151 can be arranged on a single face of the mobile terminal 100 in a manner of being spaced apart from each other or being built in one body. Alternatively, a plurality of displays 151 can be arranged on different faces of the mobile terminal 100.

In the case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

The proximity sensor 141 can be provided to an internal area of the mobile terminal 100 enclosed by the touchscreen or around the touchscreen. The proximity sensor 141 is a sensor that detects a presence or non-presence of an object approaching a prescribed detecting surface or an object existing around the proximity sensor using an electromagnetic field strength or infrared ray without mechanical contact. Hence, the proximity sensor 141 generally has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen or touch sensor can be classified as the proximity sensor 141.

In the following description, for clarity, an action that a pointer approaches without contacting with the touchscreen to be recognized as located on the touchscreen is named 'proximity touch'. An action that a pointer actually touches the touchscreen is named 'contact touch'. The position on the touchscreen proximity-touched by the pointer refers to the position of the pointer which vertically opposes the touchscreen when the pointer performs the proximity touch.

The proximity sensor 141 detects a proximity touch and a proximity touch pattern such as a proximity touch distance, a proximity touch duration, a proximity touch position, a proximity touch shift state, and the like. Information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function such as call received, message received, and the like. The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For example, different vibrations can be outputted in a manner of being synthesized together or can be outputted in sequence.

The haptic module 154 is able to generate various tactile effects as well as the vibration. For example, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. At least two haptic modules 154 can be provided to the mobile terminal 100 in accordance with the corresponding configuration type of the mobile terminal 100.

The projector module 155 performs an image projector function using the mobile terminal 100. The projector module 155 is able to display an image, which is identical to or partially identical to the image displayed on the display 151, on an external screen or wall according to a control signal of the controller 180.

In particular, the projector module 155 can include a light source generating light, for example, laser, for projecting an image externally, an image producing means for producing an image to output externally using the light generated from the light source, and a lens for magnifying the projected image in a predetermined focus distance. The projector module 155 can further include a device for adjusting an image projection direction by mechanically moving the lens or the entire module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip, and thus, can be implemented to decrease the size of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, and the like. A recent use history or a cumulative use frequency of each data, for example, use frequency for each phonebook, each message or each multimedia, can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory, such as SD memory, XD memory, and the like, or other similar memory or data storage device. The mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is a chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, and the like. The controller 180 may include a multimedia module 181 that provides multimedia playback. The multimedia module 181 may be configured as part of the controller 180, or implemented as a separate component. Moreover, the controller 180 is able to perform a pattern recognition process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
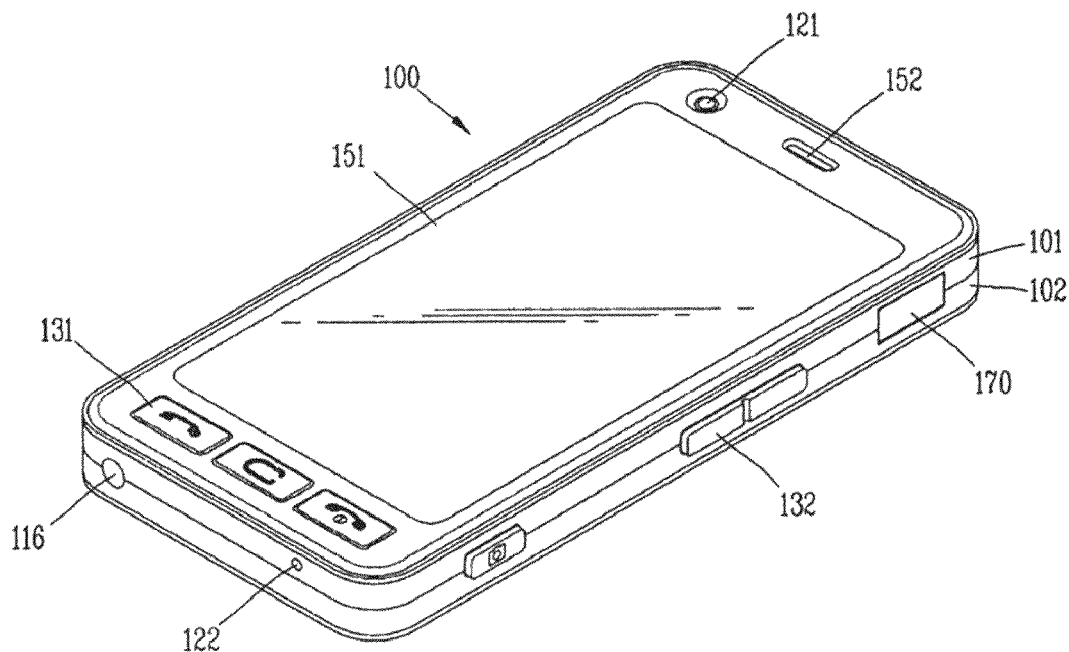
FIG. 2A is a front perspective diagram of a mobile terminal according to one embodiment of the present invention.
Figure 2B:
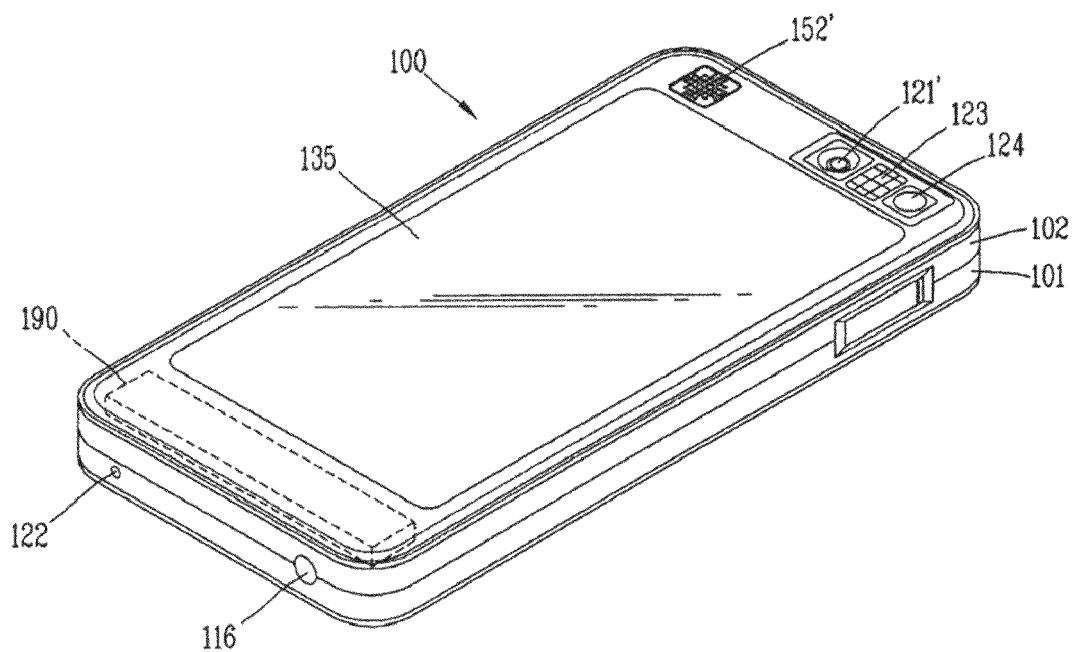
FIG. 2B is a rear perspective diagram of a mobile terminal according to one embodiment of the present invention.

In FIGS. 2A and 2B, while the mobile terminal 100 is shown to have a bar type terminal body, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, and the like) configuring an exterior thereof. In the present embodiment, the case can be divided into a front case 101 and a rear case 102. Various electric/electronic parts are loaded in a space provided between the front and rear cases 101 and 102. Alternatively, at least one middle case can be further provided between the front and rear cases 101 and 102 in addition. The cases 101 and 102 are formed by injection molding of synthetic resin or can be formed of metal substance such as stainless steel (STS), titanium (Ti) or the like for example.

The display 151, audio output unit 152, camera 121, user input units 130/131 and 132, microphone 122, interface 180 and the like can be provided to the terminal body, and more particularly, to the front case 101. The display 151 occupies most area of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the mobile terminal 100. The input unit 130 is able to include a plurality of manipulating units 131 and 132. The manipulating units 131 and 132 may also be called a manipulating portion and may adopt any mechanism of a tactile manner that enables a user to perform a manipulation action by experiencing a tactile feeling.

Content inputted by the first or second manipulating unit 131 or 132 can be diversely set. For example, a command, such as start, end, scroll and the like, is inputted to the first manipulating unit 131 and a command for a volume adjustment of sound outputted from the audio output unit 152, a command for a switching to a touch recognizing mode of the display 151 or the like can be inputted to the second manipulating unit 132.

Referring to FIG. 2B, a camera 121' can be additionally provided to a backside of the terminal body, and more particularly, to the rear case 102. The camera 121' has a photographing direction that is substantially opposite to that of the front camera 121 shown in FIG. 2A and may have a resolution differing from that of the front camera 121.

For example, the front camera 121 has a low resolution sufficient to capture and transmit a picture of user's face for a video call, while the rear camera 121' has a higher resolution for capturing a general subject for photography without transmitting the captured subject. Alternative to the configuration shown in FIGS. 2A and 2B, each of the cameras 121 and 121' can be installed at the terminal body to be rotated or popped up.

A flash 123 and a mirror 124 are additionally provided adjacent to the rear camera 121'. The flash 123 projects light toward a subject in case of photographing the subject using the rear camera 121'. In case that a user attempts to take a self-portrait using the rear camera 121', the mirror 124 enables the user to view the self image through the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the mobile terminal 100 is provided to the terminal body. The power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 such that a touchscreen can be provided to the rear case 102 as well.

The touchpad 135 is activated by interconnecting with the display 151 of the front case 101. The touchpad 135 can be provided in the rear side of the display 151 in parallel. The touchpad 135 can have a size equal to or smaller than that of the display 151.

Figure 3A:
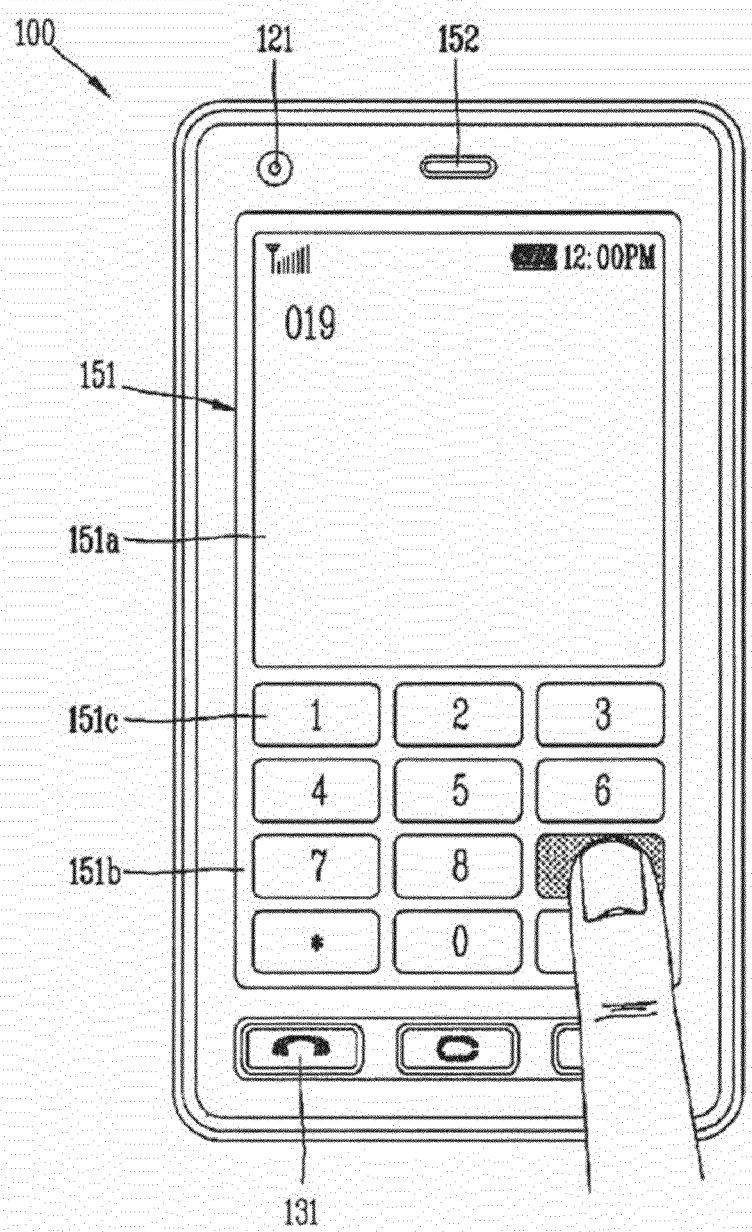
FIG. 3A and FIG. 3B are front diagrams of a mobile terminal according to one embodiment of the present invention.
Figure 3B:
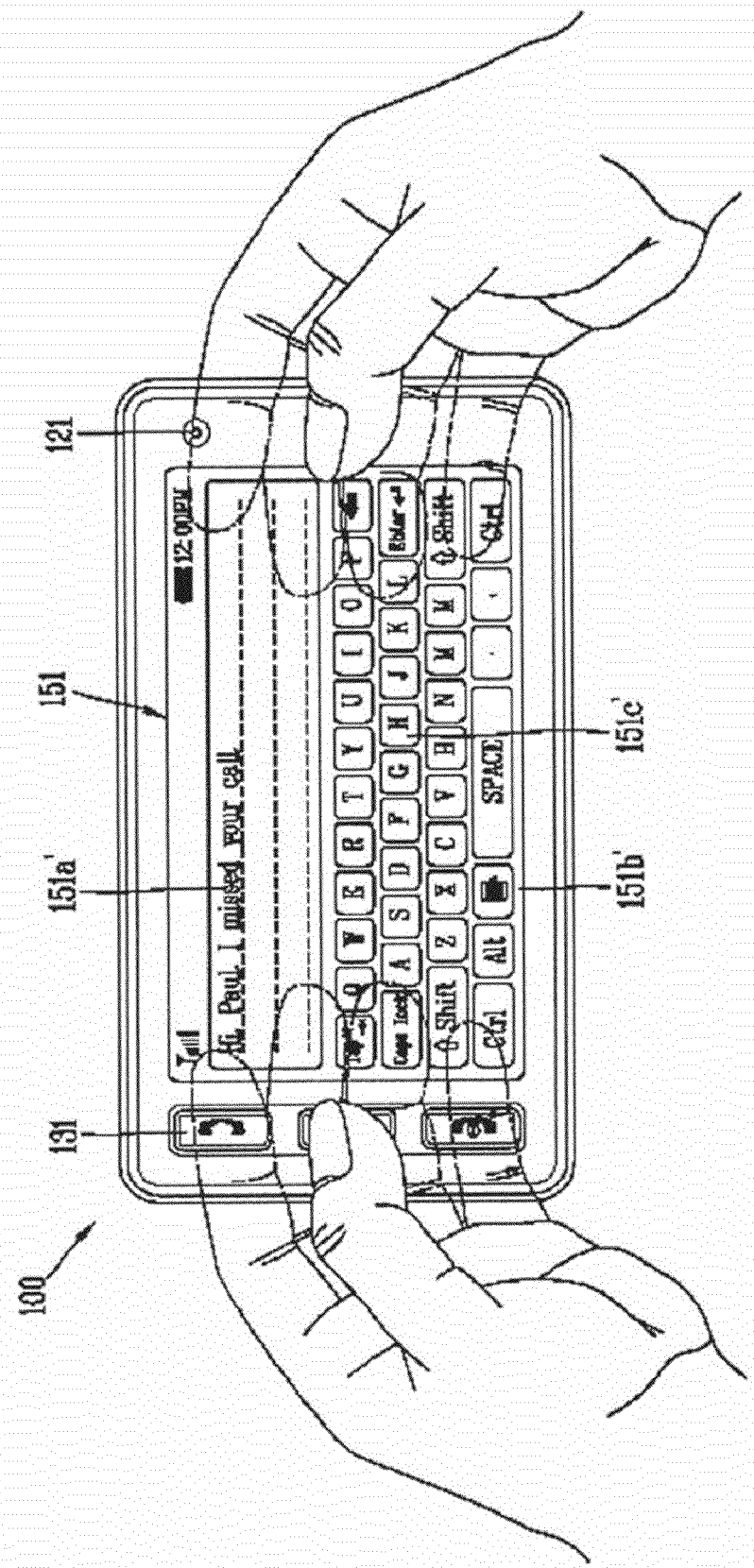

Interconnected operational mechanism between the display 151 and the touchpad 135 are explained with reference to FIG. 3A and FIG. 3B as follows. Referring to FIGS. 3A and 3B, various kinds of visual information can be displayed on the display 151. For example, the information can be displayed in characters, numerals, symbols, graphics, icons and the like.

In order to input the information, at least one of the characters, numerals, symbols, graphics and icons are represented in a single predetermined array to be implemented in a keypad formation. This keypad formation can be so-called 'soft keys'.

Referring to FIG. 3A, the display 151 is operable through an entire area or by being divided into a plurality of regions. In the latter case, a plurality of regions can be configured interoperable. For example, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

While FIG. 3A shows that the information is displayed and arranged in the terminal body vertically in a portrait orientation, FIG. 3B shows the information is displayed and arranged in the terminal body horizontally in a landscape orientation. The display 151 can be configured to change an output picture according to the arranged direction of the terminal body.

Referring to FIG. 3B, when a text input mode is activated in the mobile terminal 100, an output window 151a' and an input window 151b' are displayed on the display 151. A plurality of soft keys 151c' representing at least one of characters, symbols and digits can be arranged in the input window 151b'. For example, the soft keys 151c' can be arranged in the QWERTY key formation.

If the soft keys 151c' are touched through the touchpad 135 shown in FIG. 2B, the characters, symbols and digits corresponding to the touched soft keys are outputted to the output window 151a'. Thus, the touch input via the touchpad 135 is advantageous in that the soft keys 151c' can be prevented from being blocked by a finger in case of touch, which is compared to the touch input via the display 151. In case that the display 151 and the touchpad 135 are configured transparent, fingers located at the backside of the terminal body can be visually checked. Hence, more correct touch inputs are possible.

Besides, the display 151 or the touchpad 135 can be configured to receive a touch input by scroll. A user scrolls the display 151 or the touchpad 135 to shift a cursor or pointer located at an entity, icon or the like, displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display 151 that is a touchscreen and the touchpad 135 are touched together within a predetermined time range, one function of the mobile terminal 100 can be executed. For example, the terminal body is held by a user using a thumb and a first finger clamping the mobile terminal 100. The above function can include activation or deactivation for the display 151 or the touchpad 135.

The proximity sensor 141 described with reference to FIG. 1 is explained in detail with reference to FIG. 4 as follows.

Figure 4:
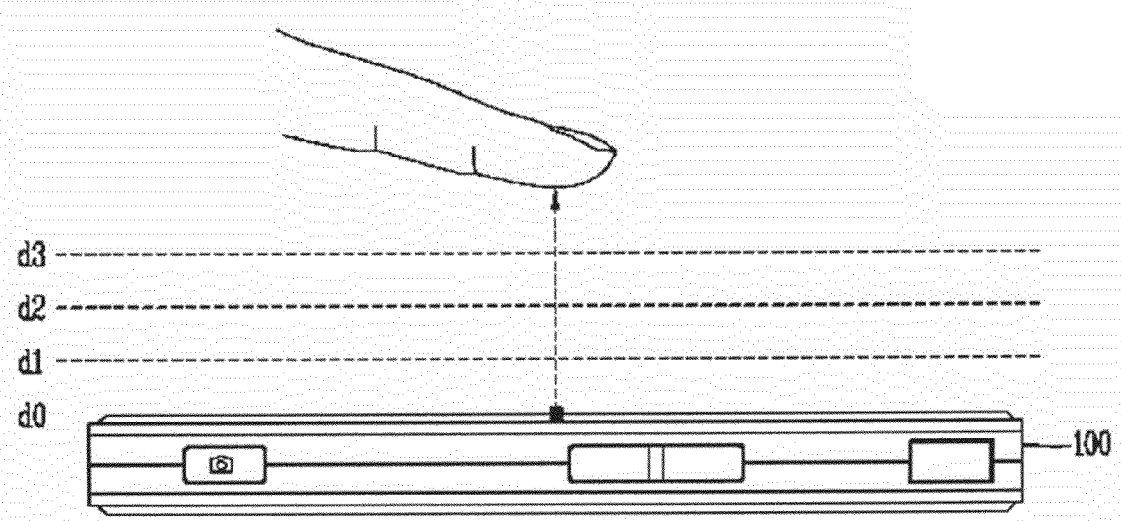
FIG. 4 is a diagram illustrating the concept of proximity depth of a proximity sensor that can be implemented in a mobile terminal according to one embodiment of the present invention.

Referring to FIG. 4, when a pointer such as a user's finger, a pen and the like approaches the touchscreen, a proximity sensor 141 provided within or in the vicinity of the touchscreen detects the approach of the pointer and then outputs a proximity signal. The proximity sensor 141 can be configured to output a different proximity signal according to a distance between the pointer and the proximity-touched touchscreen (hereinafter named 'proximity depth').

In FIG. 4, exemplarily shown is a cross-section of the touchscreen provided with a proximity sensor 141 capable of recognizing three proximity depths. It is understood that a proximity sensor 141 capable of recognizing proximity depths amounting to the number smaller than 3 or equal to or greater than 4 is also possible.

In case that the pointer is fully contacted with the touchscreen (d0), such an input is recognized as a contact touch. In case that the pointer is located to be spaced apart from the touchscreen in a distance smaller than d1 without touching the touchscreen, such an input is recognized as a proximity touch to a first proximity depth. In case that the pointer is located to be spaced apart from the touchscreen in a distance between d1 and d2, such an input is recognized as a proximity touch to a second proximity depth. In case that the pointer is located to be spaced apart from the touchscreen in a distance smaller than d3 or equal to or greater than d2, such an input is recognized as a proximity touch to a third proximity depth. In case that the pointer is located to be spaced apart from the touchscreen in a distance equal to or greater than d3, the proximity touch is released and no input is recognized by the proximity sensor 141.

Hence, the controller 180 is able to recognize the proximity touch as one of various input signals according to the proximity depth and position of the pointer. Further, the controller 180 is able to perform various operation controls according to the various input signals.

Figure 5:
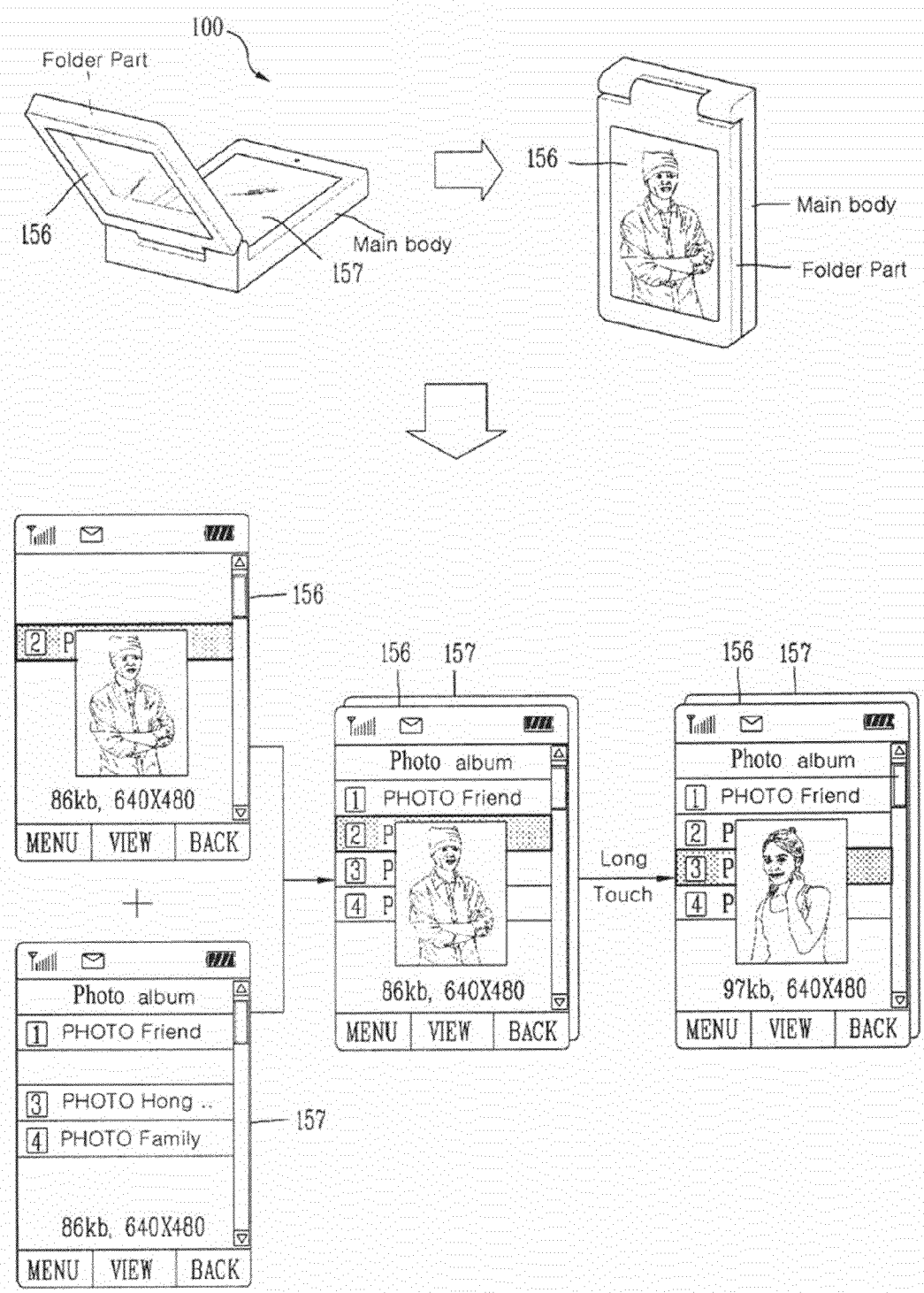
FIG. 5 is a diagram illustrating the concept of controlling a touch action on a pair of displays overlapped with each other.

Referring to FIG. 5, the exemplified mobile terminal 100 is a folder type terminal in which a folder part is connected to a main body in a manner of being folded or unfolded. A first display 156 provided to the folder part is a light-transmittive or transparent type such as TOLED, while a second display 157 provided to the main body may be a non-transmittive type such as LCD. Each of the first and second displays 156 and 157 can include a touch-inputtable touchscreen.

For example, if a touch, for example, contact touch or proximity touch, to the first display or TOLED 156 is detected, the controller 180 selects or runs at least one image from an image list displayed on the TOLED 156 according to a touch type and a touch duration. In the following description, a method of controlling information displayed on a different display or an LCD 157 in case of an touch to the TOLED 156 externally exposed in an overlapped configuration is explained, in which the description is made with reference to input types classified into a touch, a long touch, a long-touch and drag, and the like.

In the overlapped state when the mobile terminal 100 is closed or folded, the TOLED 156 is configured to be overlapped with the LCD 157. In this state, when a touch different from a touch for controlling an image displayed on the TOLED 155, for example, a long touch having a duration of at least 2 seconds, is detected, the controller 180 displays at least one image to be selected from an image list on the LCD 157 according to the touched touch input. The result of running the selected image is displayed on the TOLED 156.

The long touch may be used for selectively shifting a specific one of entities displayed on the LCD 157 to the TOLED 156 without an action for running the corresponding entity. In particular, if a user performs a long touch on a prescribed region of the TOLED 156 corresponding to a specific entity of the LCD 157, the controller 180 controls the corresponding entity to be displayed by being shifted to the TOLED 156.

Meanwhile, an entity displayed on the TOLED 156 can be displayed by being shifted to the LCD 157 according to such a prescribed touch input to the TOLED 156 as flicking, swirling and the like. In the drawing, exemplarily shown is that a second menu displayed on the LCD 157 is displayed by being shifted to the TOLED 156.

In case that another input, such as a drag, is additionally detected together with a long touch, the controller 180 executes a function associated with an image selected by the long touch such that a preview picture for the image can be displayed on the TOLED 156. In FIG. 5, exemplarily shown is a preview of the picture of a male for a second menu including the image file.

While the preview image is outputted, if a drag toward a different image is additionally performed on the TOLED 156 by maintaining the long touch, the controller 180 shifts a selection cursor or a selection bar of the LCD 157 and then displays the image selected by the selection cursor on the preview picture that is the picture of a female. Thereafter, after completion of the touch, specifically, long touch and drag, the controller 180 displays the initial image selected by the long touch.

The touch action or long touch and drag is identically applied to a case that a slide or an action of a proximity touch corresponding to the drag is detected to together with a long proximity touch that is maintained for at least 2 or 3 seconds to the TOLED 156. In case that a touch action differing from the above-mentioned touch actions is detected, the controller 180 is able to operate in the same manner of the general touch controlling method.

The method of controlling the touch action in the overlapped state is applicable to a mobile terminal having a single display. Further, the method of controlling the touch action in the overlapped state is applicable to mobile terminals differing from the folder type terminal having a dual display as well.

Figure 6A:
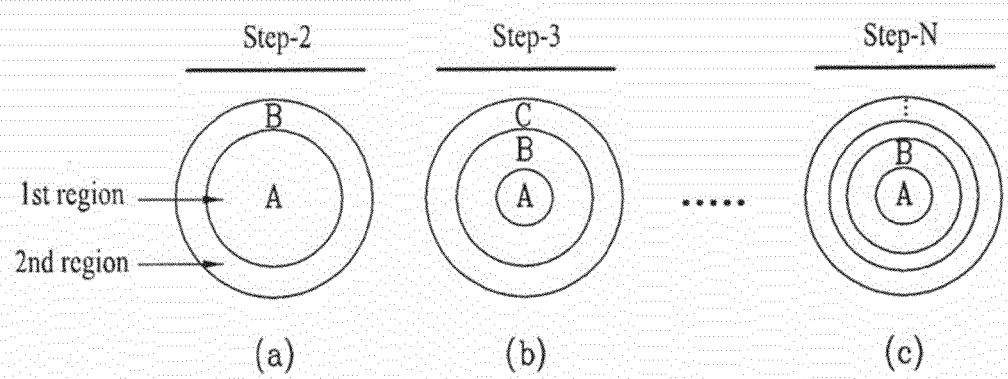
FIG. 6A and FIG. 6B are diagrams illustrating the concepts of a proximity touch recognizing area for detecting a proximity signal and a haptic area for generating a tactile effect, respectively.

FIG. 6A represents an object, such as an icon, a menu item and the like, in a circle type for clarity and convenience of explanation. A region for displaying an object on the display 151, as shown in (a) of FIG. 6A, can be divided into a first region A at a central part and a second region B enclosing the first region A. The first and second regions A and B can be configured to generate tactile effects differing from each other in strength or pattern. For example, the first and second regions can be configured to generate 2-step vibrations in a manner of outputting a first vibration if the second region B is touched or outputting a second vibration greater than the first vibration if the first region A is touched.

In the case when both of the proximity touch recognition region and the haptic region are simultaneously set in the region having the object displayed therein, it is able to set the haptic region for generating the tactile effect to be different from the proximity touch recognition region for detecting the proximity signal. In particular, it is able to set the haptic region to be narrower or wider than the proximity touch recognition region. For example, in (a) of FIG. 6A, it is able to set the proximity touch recognition region to the area including both of the first and second regions A and B. It is also able to set the haptic region to the first region A.

It is able to discriminate the region having the object displayed therein into three regions A, B and C as shown in (b) of FIG. 6A. Alternatively, it is able to discriminate the region having the object displayed therein into N regions (N>4) as shown in (c) of FIG. 6A. It is able to configure each of the divided regions to generate a tactile effect having a different strength or pattern. In case that a region having a single object represented therein is divided into at least three regions, it is able to set the haptic region and the proximity touch recognition region to differ from each other according to a use environment.

Figure 6B:
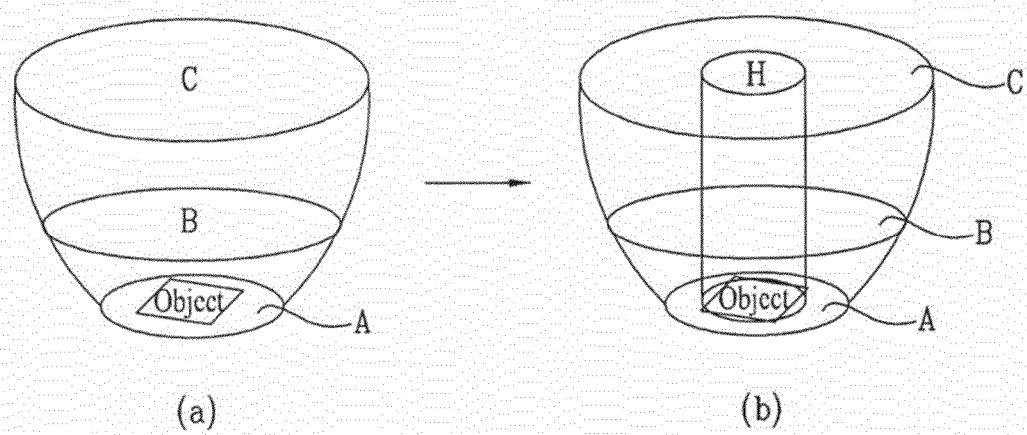

It is able to configure a size of the proximity touch recognition region of the display 151 to vary according to a proximity depth. In particular, referring to (a) of FIG. 6B, the proximity touch recognition region is configured to decrease by C→B→A according to the proximity depth for the display 151. On the contrary, the proximity touch recognition region is configured to increase by C→B→A according to the proximity depth for the display 151. Despite the above configuration, it is able to set the haptic region to have a predetermined size, as the region 'H' shown in (b) of FIG. 6B, regardless of the proximity depth for the display 151. In case of dividing the object-displayed region for the setting of the haptic region or the proximity touch recognition region, it is able to use one of various schemes of horizontal/vertical division, radial division and combinations thereof as well as the concentric circle type division shown in FIG. 6A.

Figure 7A:
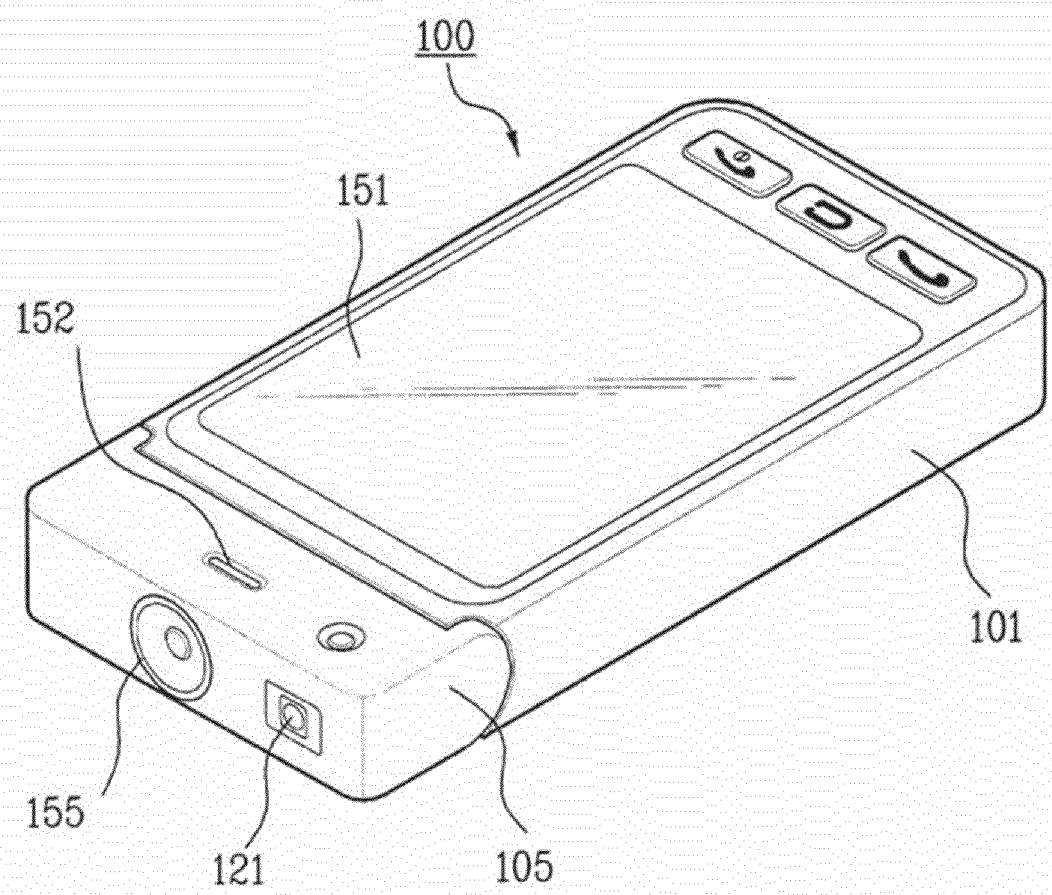
FIG. 7A and FIG. 7B are perspective diagrams of a mobile terminal according to one embodiment of the present invention.

In the following description, the configuration of the above-described projector module 155 provided to the bar type mobile terminal 100 is explained in detail with reference to FIG. 7A and FIG. 7B. Referring to FIG. 7A, a projector body 105 having the projector module 155 can be rotatably coupled to a main body 101 of the mobile terminal 100. In particular, the projector body 105 may be hinged to the main body 101 such that the projection angle of an image, which is projected via the projector module 155, can be controlled. Further, a camera 121 can be provided to the projector body 105 to photograph the image projected by the projector module 155.

Figure 7B:
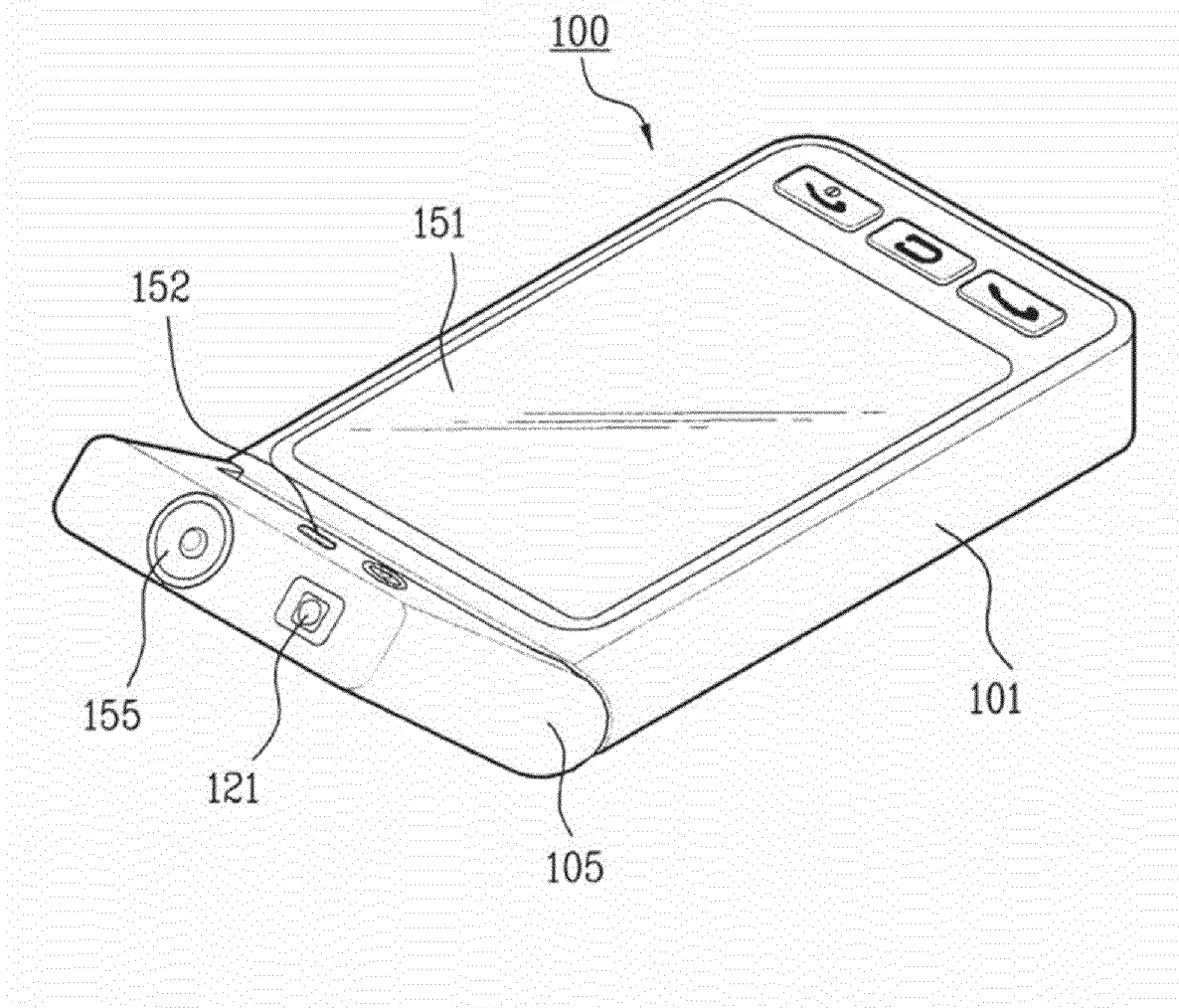

In FIG. 7A, the projector body 105 rotatably coupled to the main body 101 is not rotated, and in FIG. 7B the projector body 105 has been rotated. The mobile terminal 100 described in the following description can include at least one of the elements shown in FIG. 1 and may further include a touchscreen.

As the mobile terminal 100 receives an input for selecting an external screen area setting function from a user, a status for controlling a size or position of the external screen area (hereinafter called 'area control status') can be set up. The external screen area setting function refers to a function for setting the size or position of the external screen area on which an image projected via the projector module 155 or an image transmitted to the external screen via the wireless communication unit 110 is displayed.

Figure 9A:
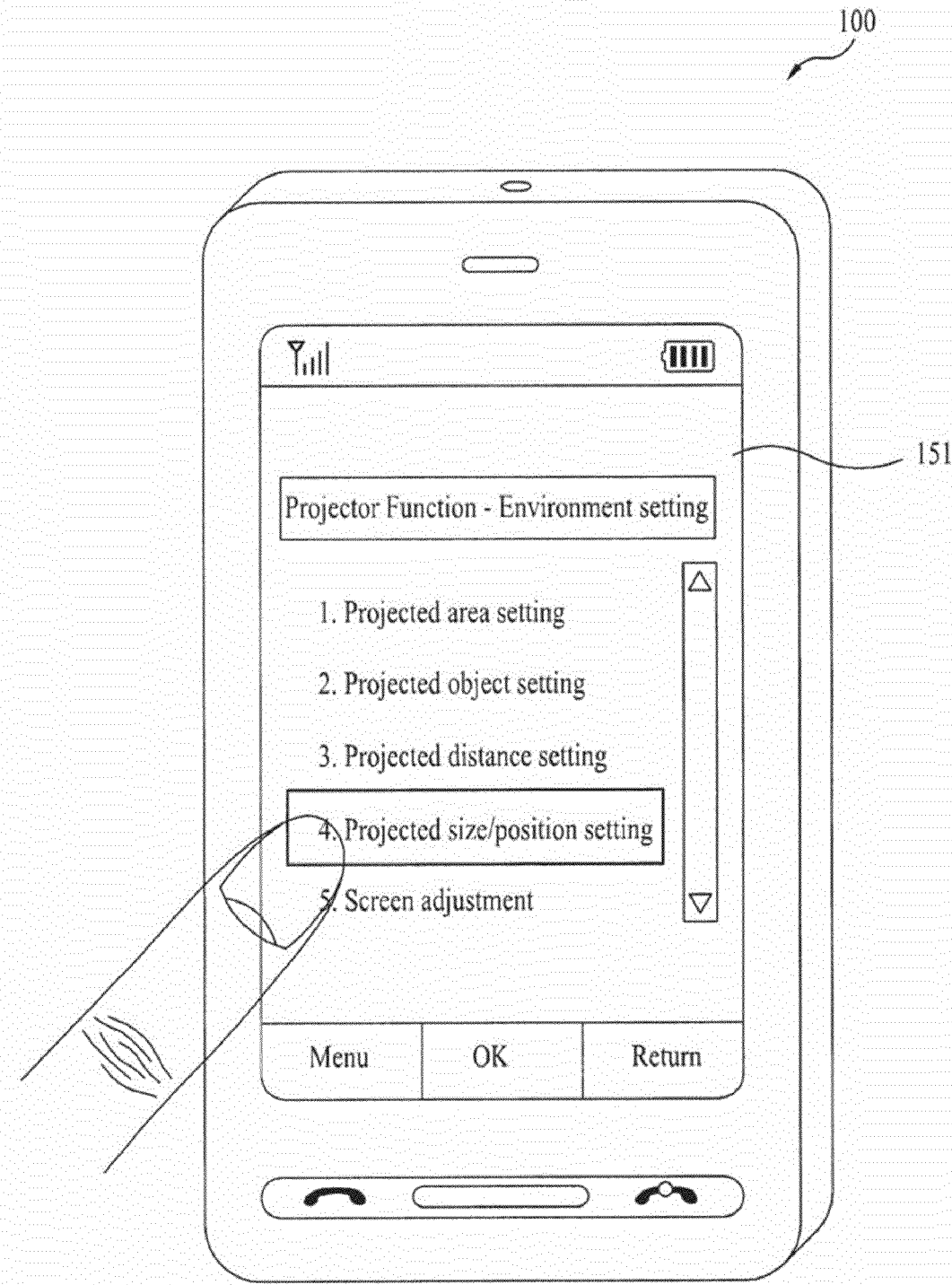

Further, in the course of or prior to performing the projector function, as shown in FIG. 9A and FIG. 10, respectively, the mobile terminal 100 sets up an area control status when a menu item "projected size/position setting" is selected via a menu search shown in FIG. 9A and FIG. 10. The area control status can also be set up when a key or a key area, if touchscreen is included, for commanding the projected size/position setting.

Moreover, in the process for setting the area prior to execution of the projector function, the mobile terminal 100 allows a user to select whether to use a default image as shown in FIG. 9B. The default image refers to an image displayed according to a size or position of the area set in the area setting process to provide the user with an example of an image display on an external screen area.

Figure 8:
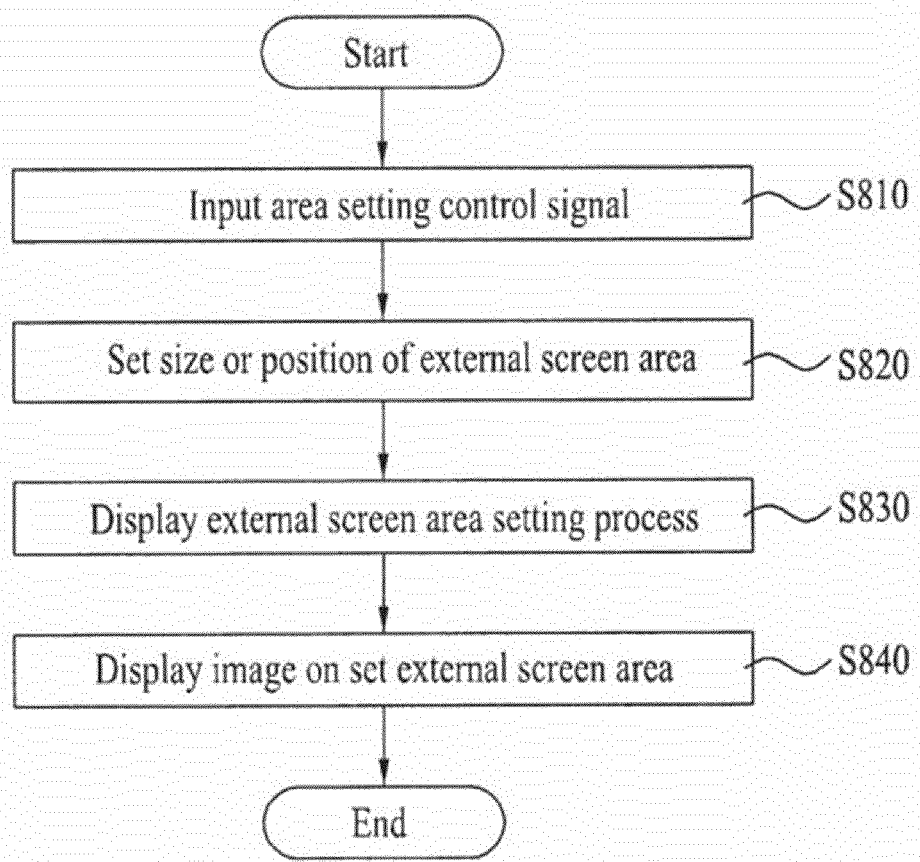
FIG. 8 is a flowchart illustrating controlling a display, in particular, a size or position of an external screen, in a mobile terminal according to one embodiment of the present invention.

Referring to FIG. 8, when the area control status needs to be set up, as mentioned in the foregoing description, the mobile terminal 100 receives an input of an area setting control signal under the control of the controller 180 at S810. The area setting control signal refers to a signal for controlling a size or position of the external screen area (hereinafter called 'area').

Subsequently at S820, under the control of the controller 180, the mobile terminal 100 sets up an area set to at least one of the size and the position according to the area setting control signal inputted in S180. In S820, the mobile terminal 100 is able to set up a plurality of areas. For example, the mobile terminal 100 may perform an operation for setting each of the plurality of the areas and sizes or positions of the plurality of the areas may differ from each other.

Subsequently at S830, the mobile terminal 100 displays the execution process for the setting set in S820 on the display 151 or the touchscreen or the external screen. This is to provide a user with an example of the size or position of the area. For example, the mobile terminal 100 displays the execution process for the setting in S820 via the display 151. The mobile terminal 100 may also display the set area on the external screen if an "OK" key for the area setting is selected by a user. Alternatively, the mobile terminal 100 may perform the setting in S820 even if the display 151 is deactivated. Thus, the mobile terminal 100 may display the execution process for the setting in S820 on the external screen.

The mobile terminal 100 may display the execution process for the setting in S820 via both the display 151 and the external screen. As the default image is displayed on the area set in S820, an exemplified image to be specifically displayed is displayed within the set area. The controller 180 determines whether to use the default image when displaying the area setting process according to a selection made by a user.

When a plurality of areas are set up in S820, the mobile terminal 100 may display the process for setting each of a plurality of the areas. For example, when first to third areas are set, the mobile terminal 100 displays the sequentially performed area setting processes while performing the first to third area setting processes in sequence.

The mobile terminal 100 may display the area setting process on the external screen via the projector module 155. For example, the mobile terminal 100 displays the area setting process on the external screen by projecting an image having the area setting process reflected thereon to the external screen via the projector module 155. Alternatively, as an area specifying signal corresponding to an area setting control signal is transmitted to the external screen via the wireless communication unit 110, the mobile terminal 100 controls the area setting process to be displayed on the external screen according to the area specifying signal.

The external screen also performs a data transceiving function with the mobile terminal 100. The area specifying signal can include information on the size or position of the area having been set in S820. When a default image is transmitted from the mobile terminal 100, the external screen displays the default image on the area having been set according to the area specifying signal. Moreover, when a key, key area or menu item for commanding an area setting process termination is selected, the mobile terminal 100 may terminate the area setting process.

The inputting step S810 to the displaying step S830 can be realized in various embodiments according to the inputted paths of the area setting control signal. For clarity and convenience of explanation, the following description shall be limited to the case where an area setting process is displayed via the projector module 155 and the area setting process using a default image is displayed on the external screen and the display 151.

According to one embodiment of the present invention, when a touchscreen for receiving a touch input is included in the mobile terminal 100, the mobile terminal is able to detect a pattern of a touch inputted via the touchscreen under the control of the controller 180. Therefore, the mobile terminal 100 receives an input of an area setting control signal corresponding to the detected touch pattern.

The mobile terminal 100 is able to set a size or position of an area according to the detected touch pattern under the control of the controller 180. The touch pattern can include a touch and drag direction, a touch and drag distance, a distance between multi-touches, a touch count/duration/size, a proximity distance in the case of a proximity touch.

Figure 11A:
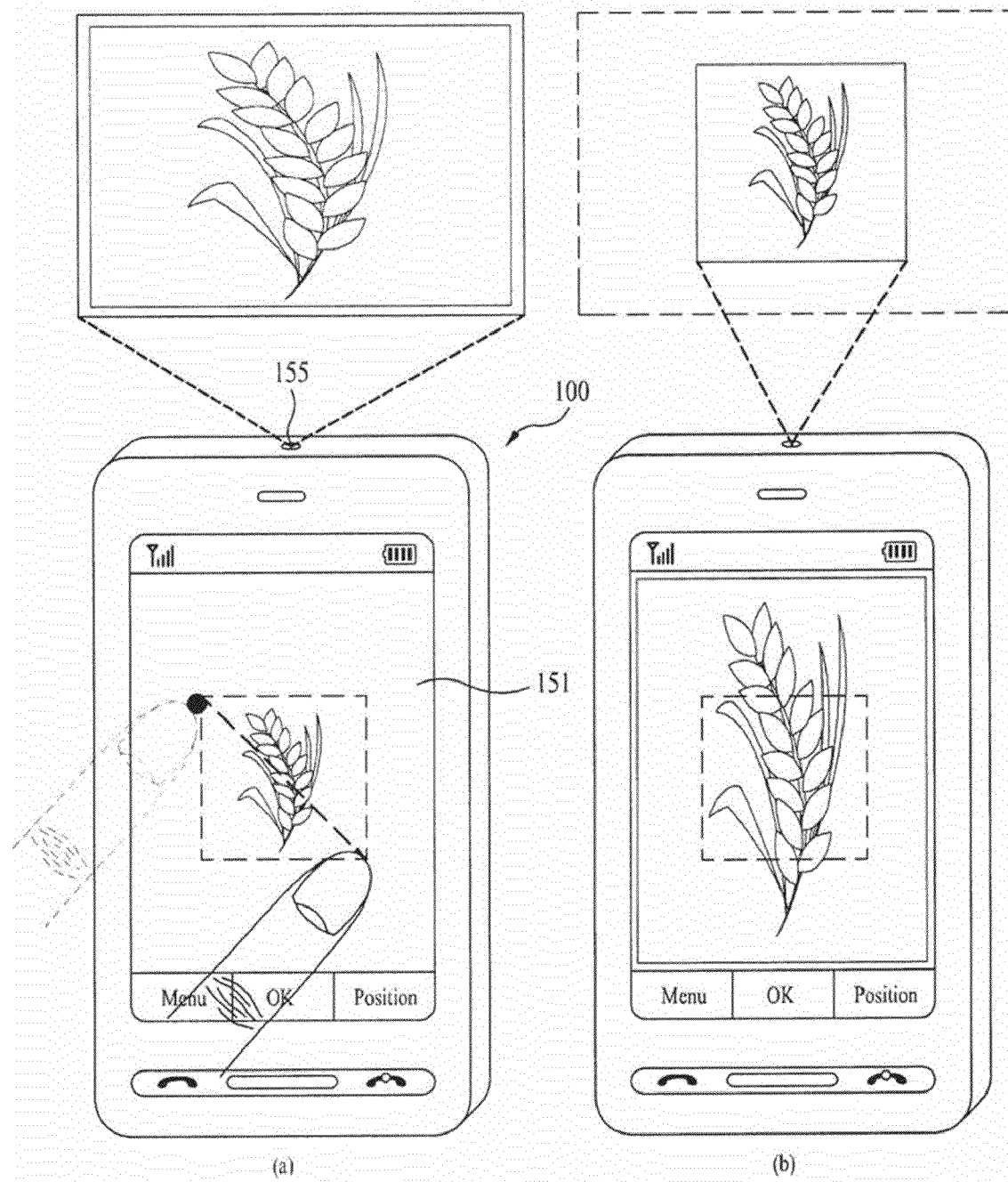
FIGS. 11A to 11D illustrate setting an area size according to a touch pattern in a mobile terminal according to one embodiment of the present invention.

In the following description, the process for setting an area size and an area position according to a touch pattern is explained in detail with reference to the accompanying drawings. Referring to FIG. 11A, while a default image is displayed, if a touch and drag action from a first point to a second point on a screen is inputted, as shown in (a) of FIG. 11A, the mobile terminal 100 sets an external screen area according to a screen area having a diagonal line connecting the first and second points together and displays the default image on the set external screen area as shown in (b) of FIG. 11A. For example, if the screen area occupies 30% of the entire external screen, the external screen area shown in (b) of FIG. 11A can be reduced to 30% of the external screen area shown in (a) of FIG. 11A.

Figure 11B:
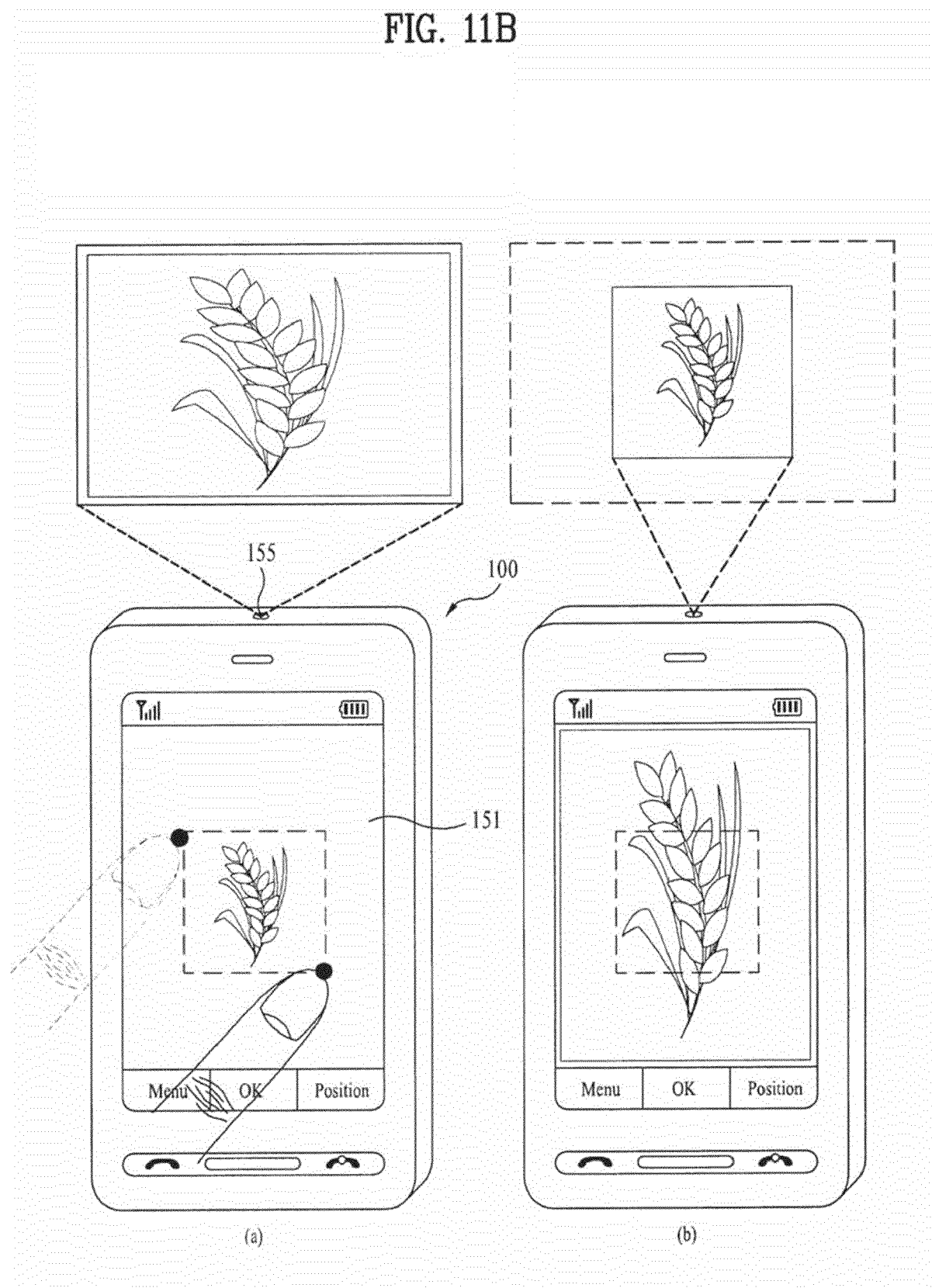

Referring to FIG. 11B, while a default image is displayed, if multi-touches to first and second points on a screen is inputted sequentially or simultaneously, as shown in (a) of FIG. 11B, the mobile terminal 100 sets an external screen area according to a screen area having a diagonal line connecting the first and second points together and then displays the default image on the set external screen area as shown in (b) of FIG. 11B. For example, if the horizontal and vertical lengths of the screen area amount to ⅓ of the horizontal length of the entire external screen and ¼ of the horizontal length of the entire external screen, respectively, the external screen area shown in (b) of FIG. 11B can be reduced to ⅓ of the horizontal length of the external screen area shown in (a) of FIG. 11B and ¼ of the vertical length thereof.

Figure 11C:
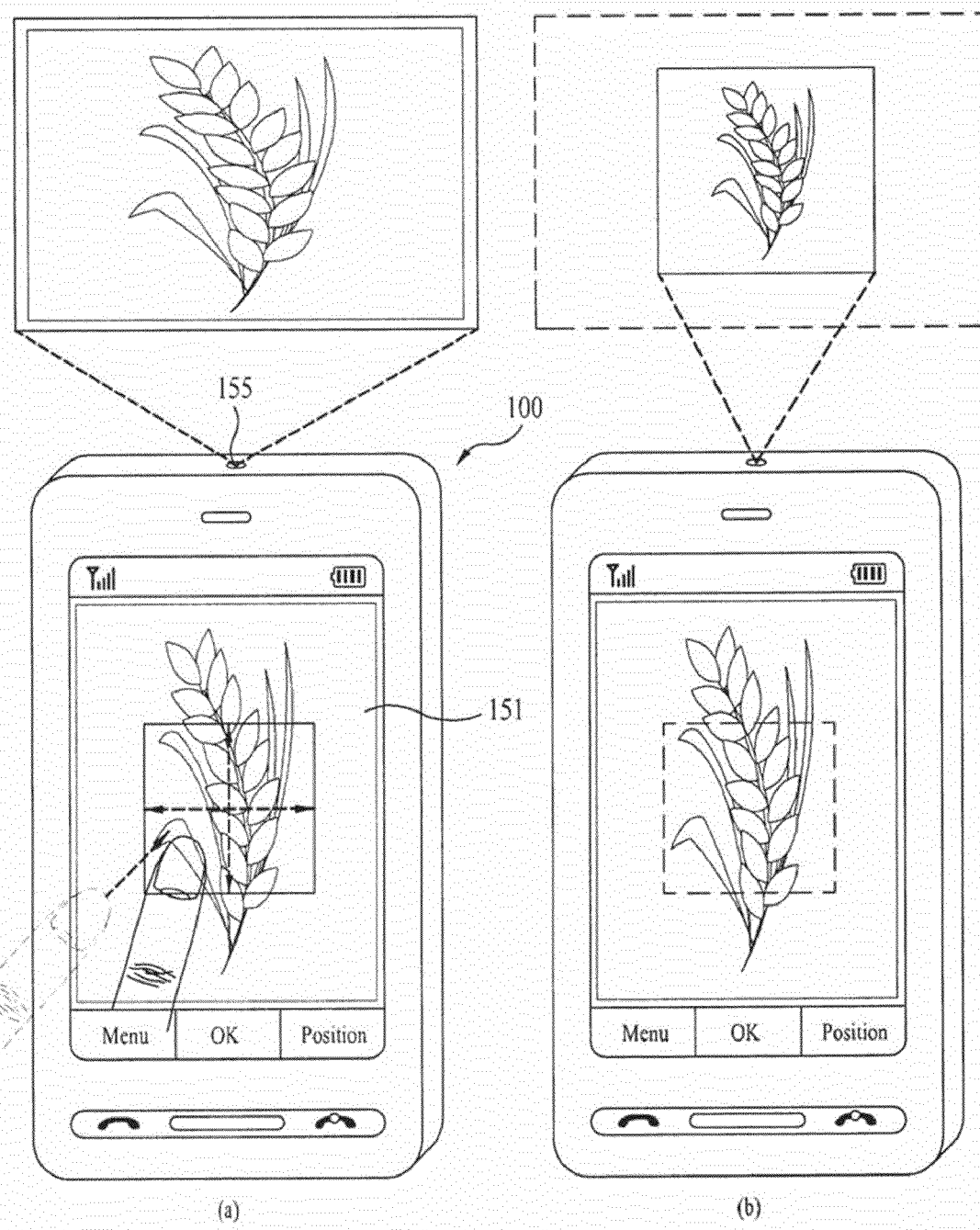

Referring to FIG. 11C, while a default image is displayed, if a proximity touch to a first point on a screen is inputted, as shown in (a) of FIG. 11C, the mobile terminal 100 sets an external screen area according to a screen area having the first point as a center and then displays the default image on the set external screen area as shown in (b) of FIG. 11C. In this case, the screen area can be set in a manner of getting wider in inverse proportion to a proximity touch distance.

Figure 11D:
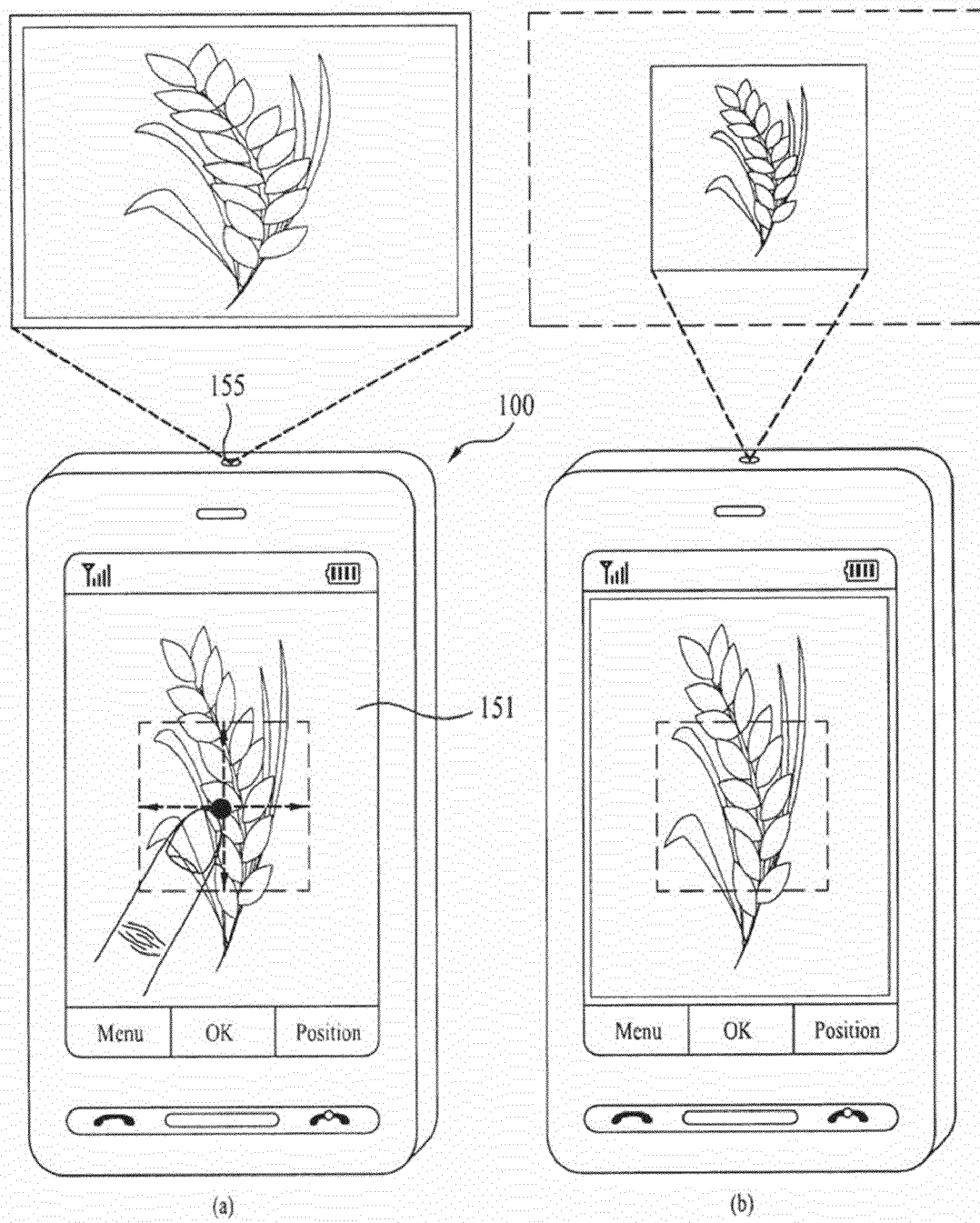

Referring to FIG. 11D, while a default image is displayed, if a touch amounting to a preset count or one of a preset duration, a preset size, a preset pressure, and the like for a first point on a screen is inputted, as shown in (a) of FIG. 11D, the mobile terminal 100 sets an external screen area according to a screen area having the first point as a center and then displays the default image on the set external screen area as shown in (b) of FIG. 11D. In this case, a size proportional to the touch count or one of the preset duration, preset size, preset pressure, and the like can be set for the screen area.

Figure 12:
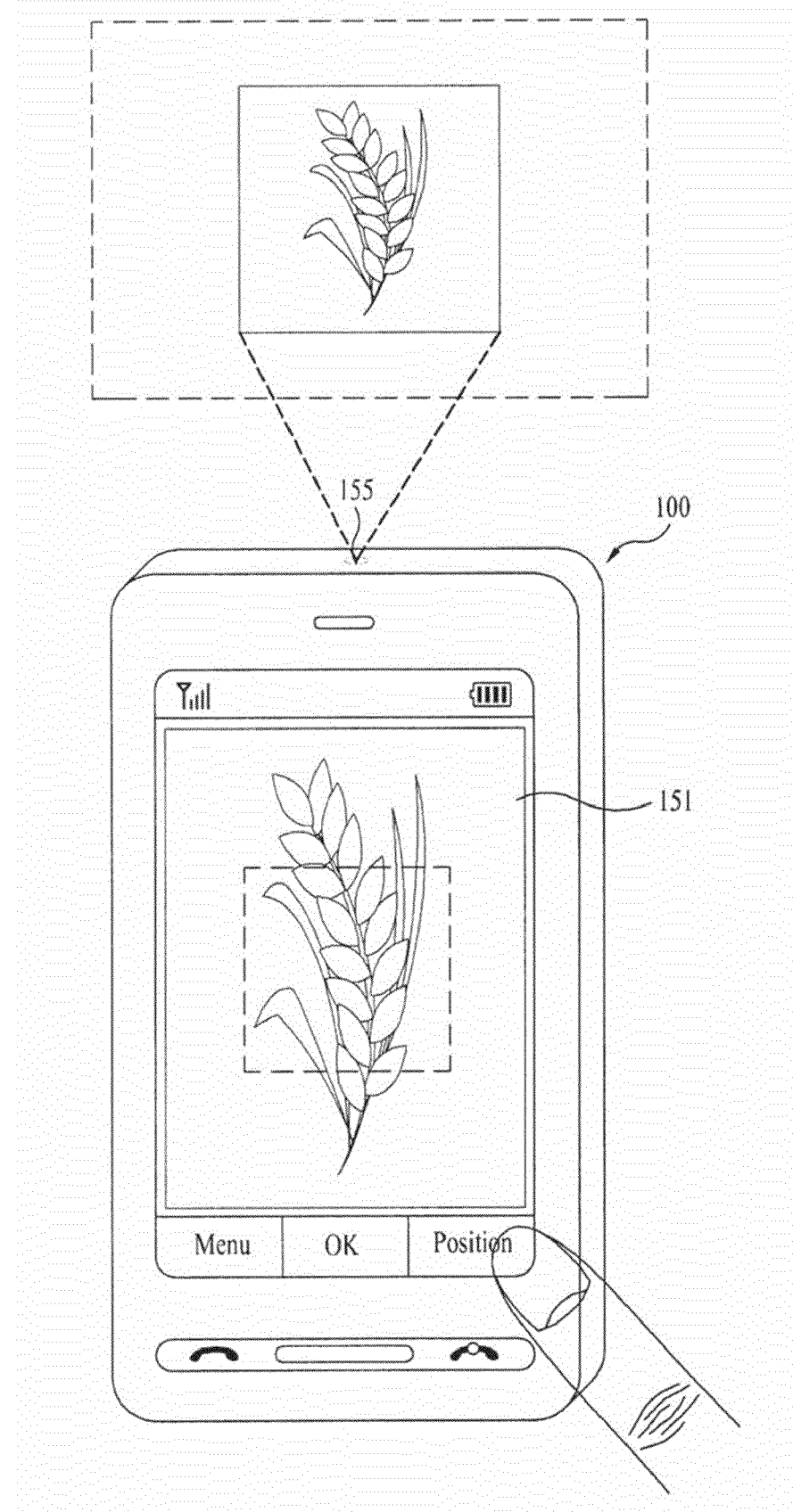
FIGS. 12 to 13E illustrate setting an area position according to a touch pattern in a mobile terminal according to one embodiment of the present invention.

Referring to FIG. 12, while a default image is displayed on a prescribed area of an external screen, the mobile terminal 100 is able to activate an area position setting function according to a selection made by a user. For example, the area position setting function is activated when a key, key area provided to a touchscreen or menu item for activation of the area position setting function is selected. As the area position setting function is activated, the mobile terminal 100 displays a screen area on the display 151 or touchscreen. In this case, the screen area may be movable according to a touch action made by a user.

Figure 13A:
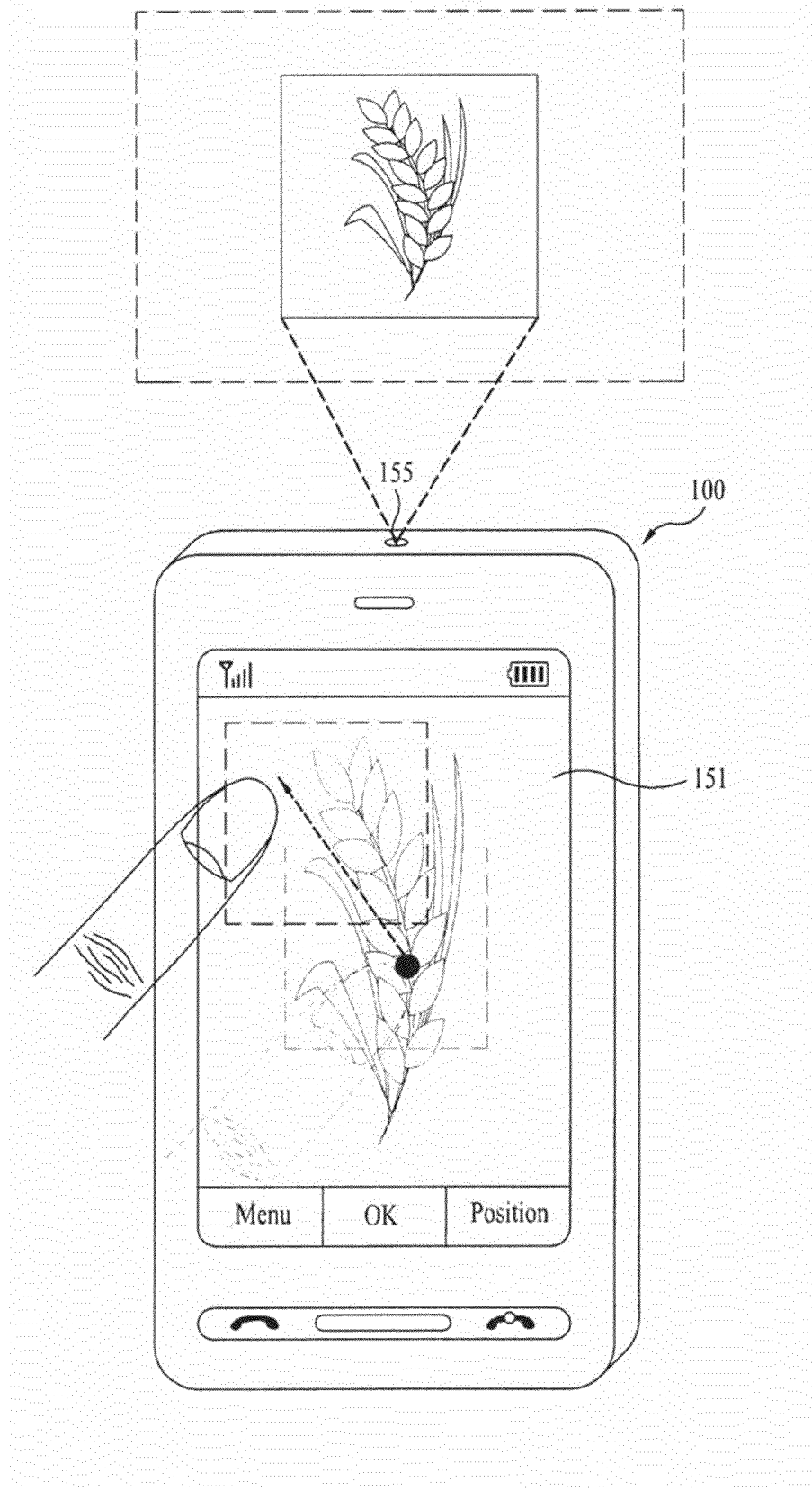
Figure 13B:
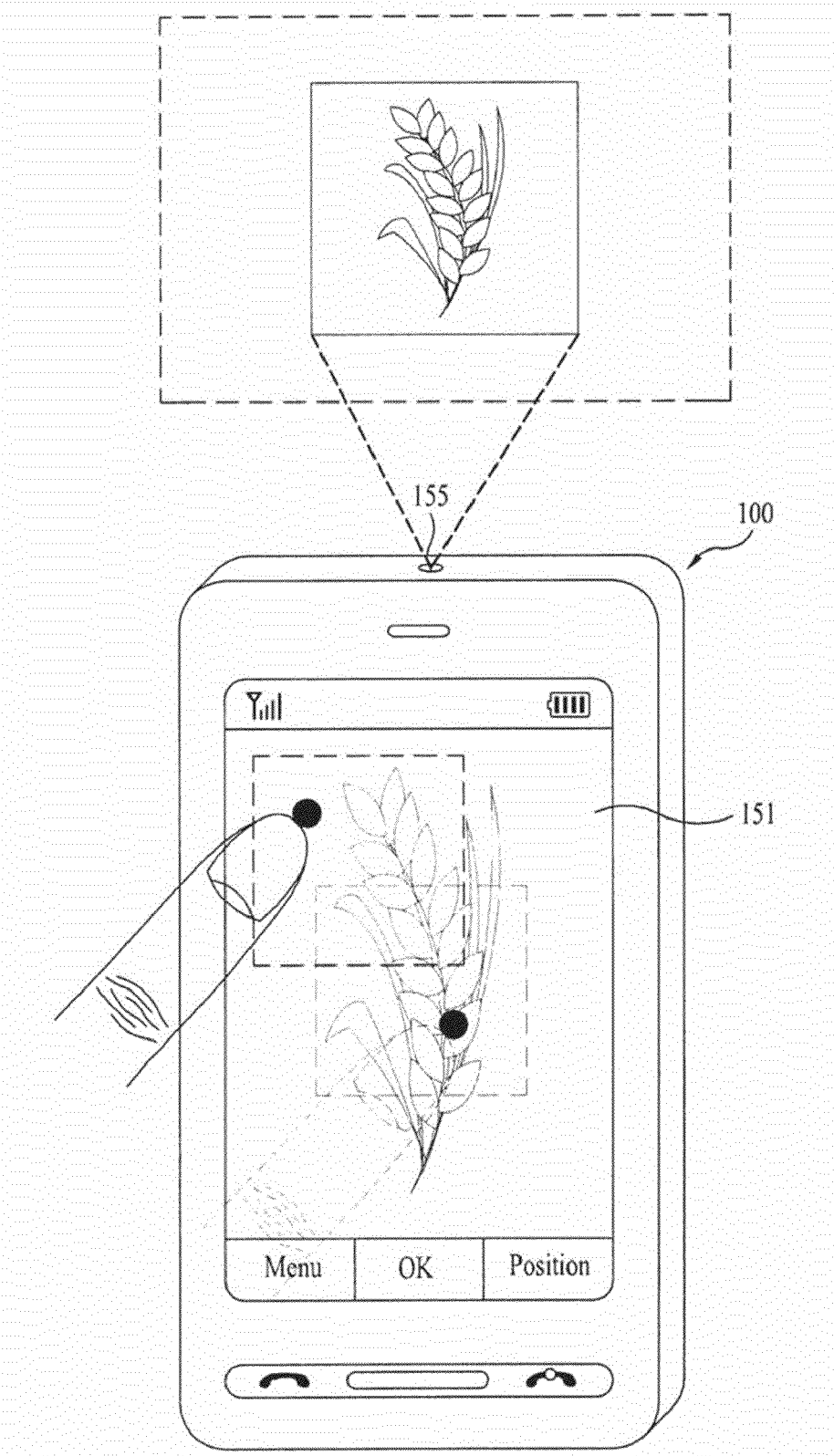
Figure 13C:
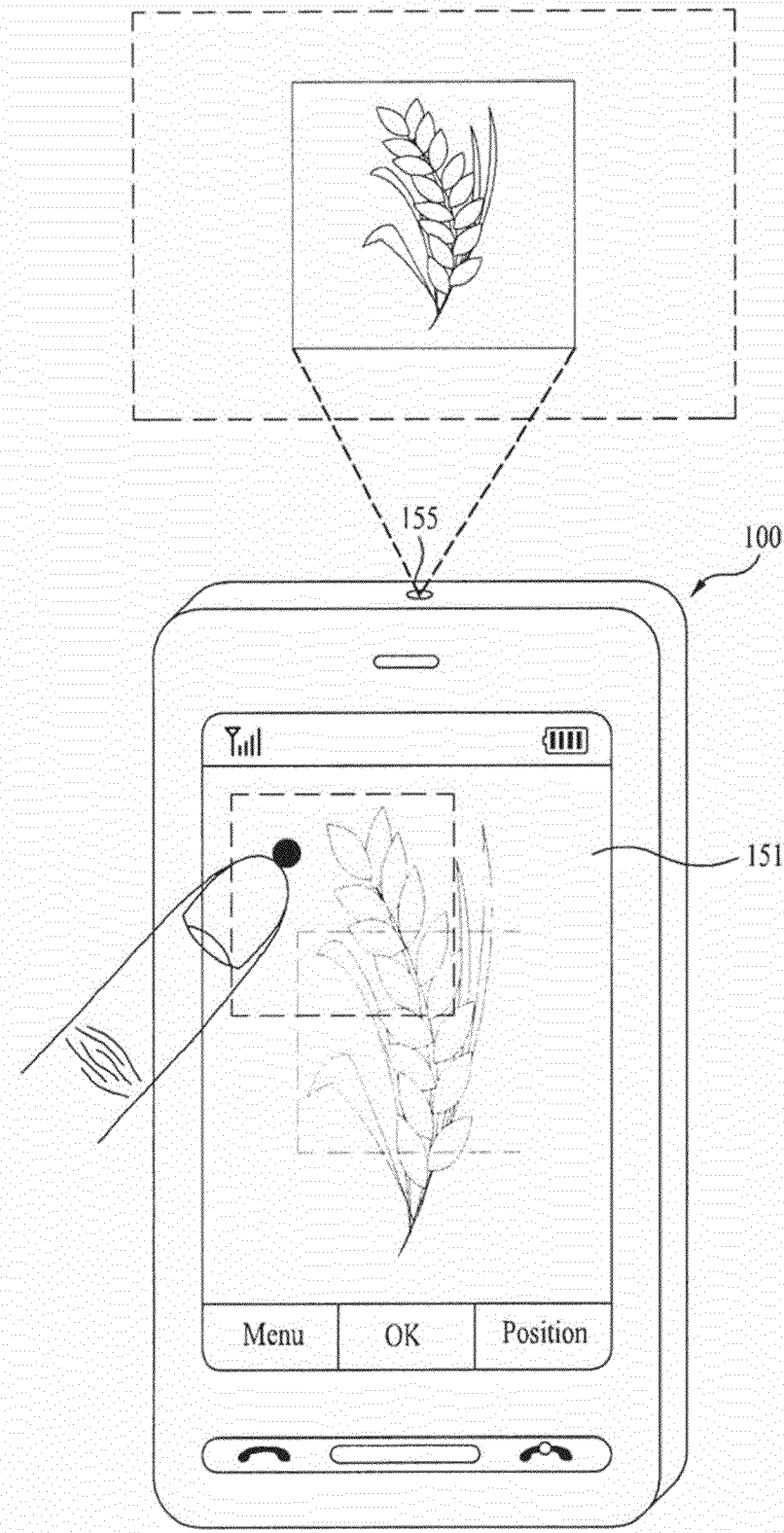
Figure 13D:
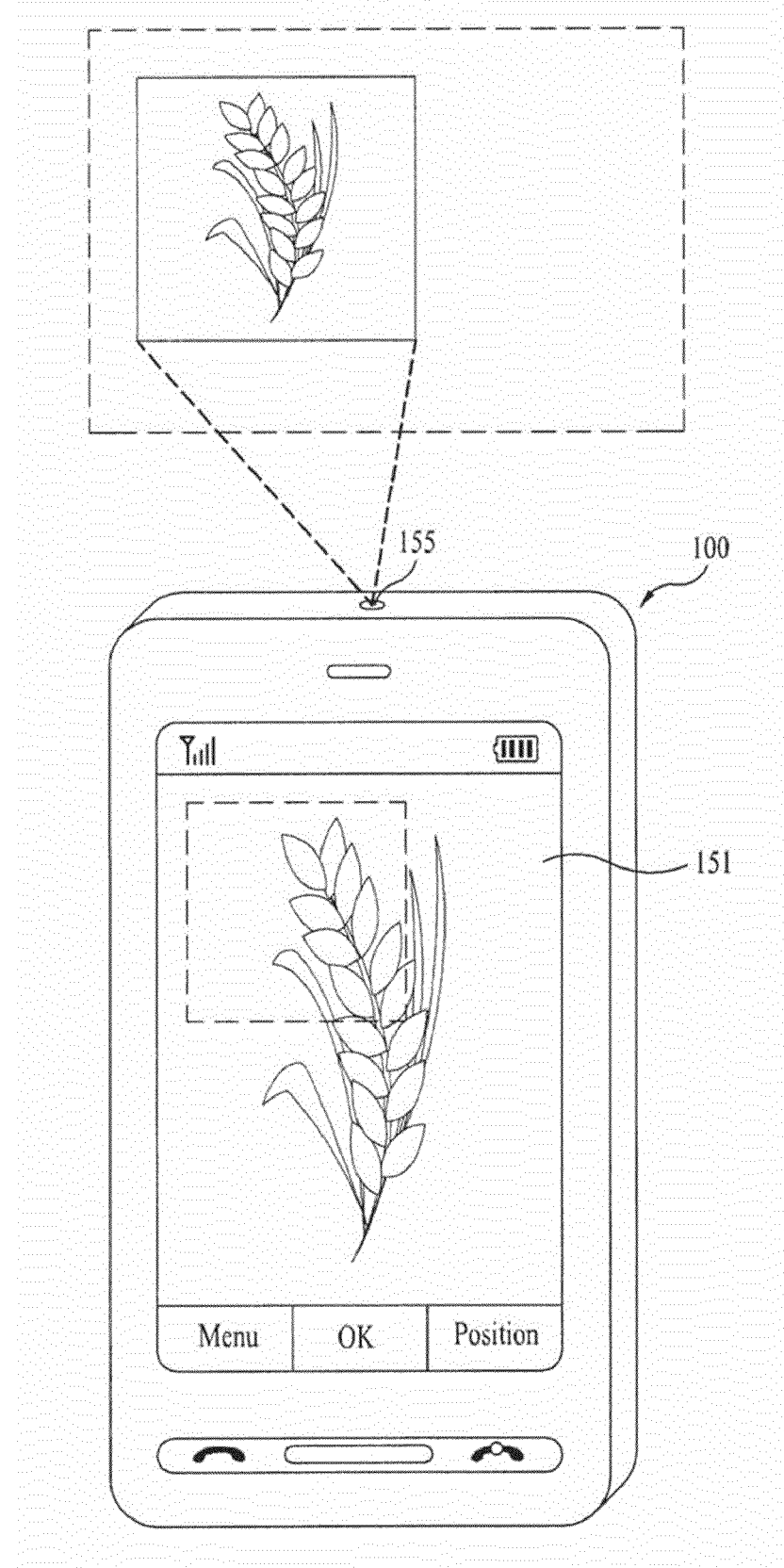

Upon detecting at least one of a touch and drag from a first point of the screen area to a second point thereof, as shown in FIG. 13A, multi-touches to first and second points of the screen area, as shown in FIG. 13B, and a touch to a second point of the entire screen, as shown in FIG. 13C, the mobile terminal 100 shifts the screen area to have the second point as a reference and then shifts the external screen area according to the shift of the screen area as shown in FIG. 13D.

Figure 13E:
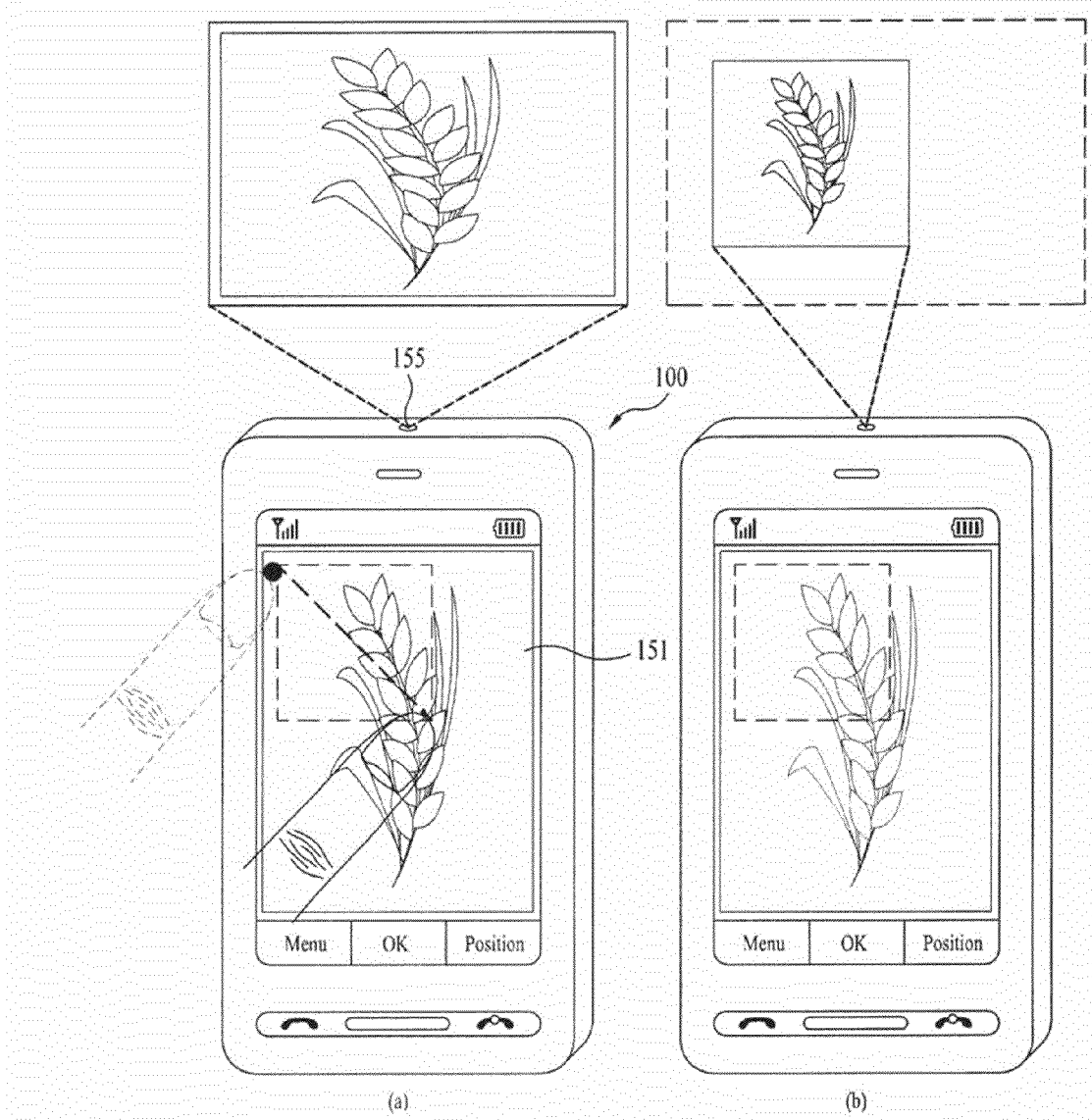

Alternatively, referring to FIG. 13E, while a default image is displayed on a prescribed area of an external screen, if a touch and drag for setting a screen area having a prescribed size is inputted, as shown in (a) of FIG. 13E, the mobile terminal 100 displays the default image on the external screen area according to a position of the screen area, as shown in (b) of FIG. 13E.

According to one embodiment of the present invention, if the mobile terminal 100 includes the camera 121 for receiving an input of an image including an area setting operation for an external screen, the mobile terminal 100 recognizes the area setting operation from the image inputted through the camera 121 and then receives an input of an area setting control signal according to the recognized area setting operation, under the control of the controller 180. Subsequently, under the control of the controller 180, the mobile terminal 100 sets a size or position of an area according to the area setting operation.

As an area control status is set, the mobile terminal 100 activates the camera 121 and then sets the activated camera 121 to enter an image input mode. For example, under the control of the controller 180, the camera 121 adjusts its photographing angle with reference to a part on which the area setting operation is performed.

The mobile terminal 100 can recognize a finger motion or other pointer motion as an example for the area setting operation from an image inputted via the camera 121. For example, using an object recognition technology, the mobile terminal 100 is able to recognize a finger or pointer from an image. The mobile terminal 100 is also able to trace and recognize a finger or pointer motion from a plurality of images which are sequentially inputted.

Figure 14:
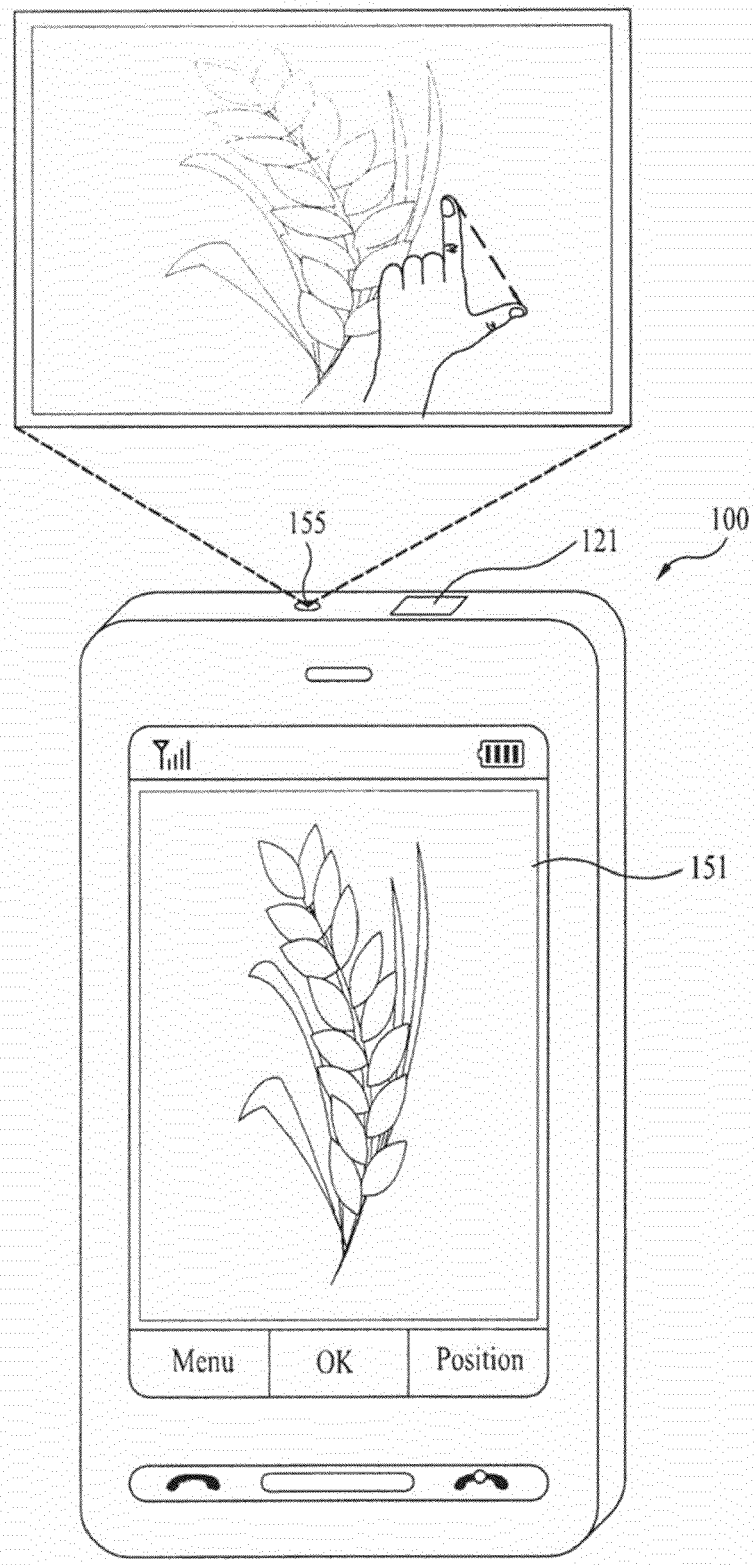
FIGS. 14 to 15B illustrate setting an area size to according to a finger motion in a mobile terminal according to one embodiment of the present invention.
Figure 15A:
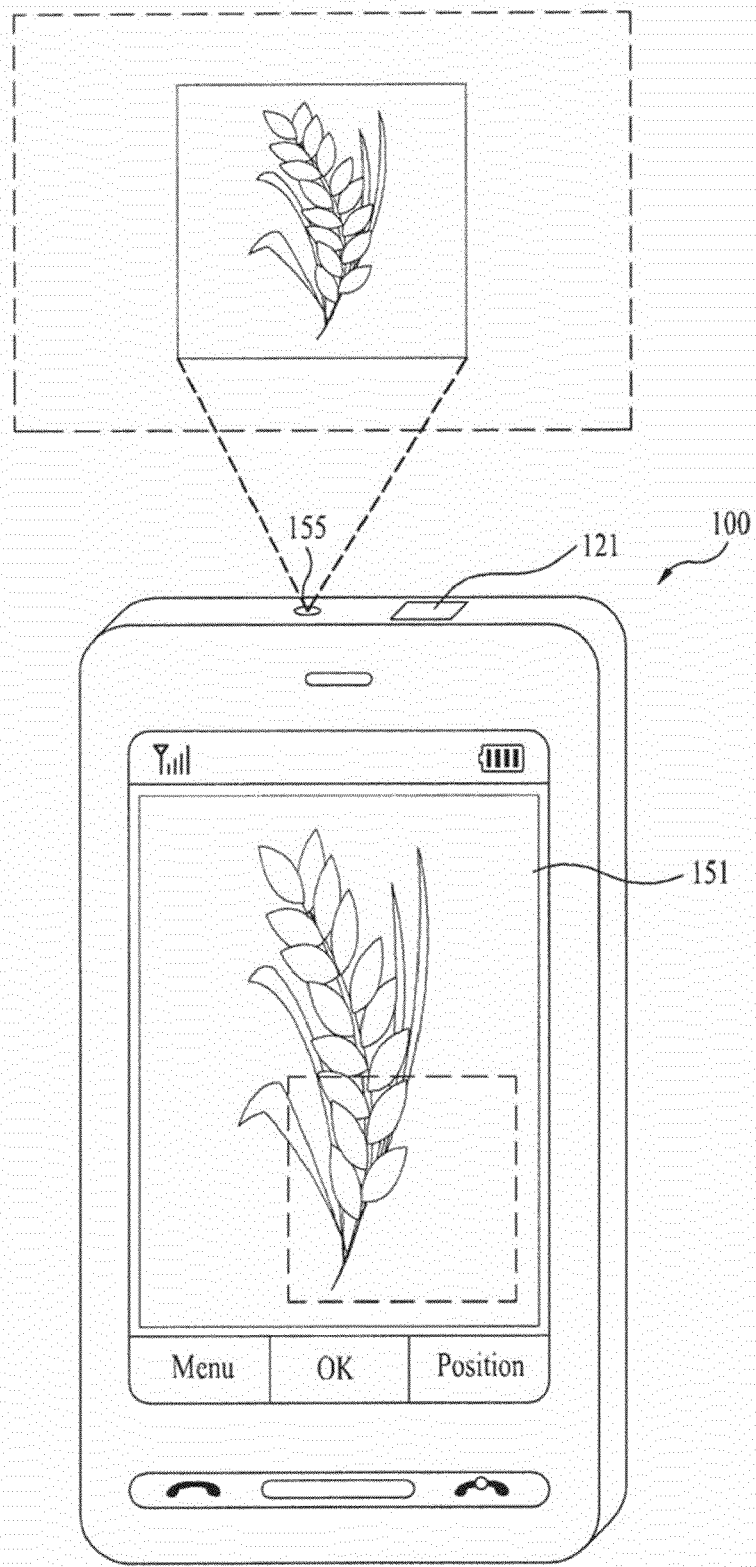
Figure 15B:
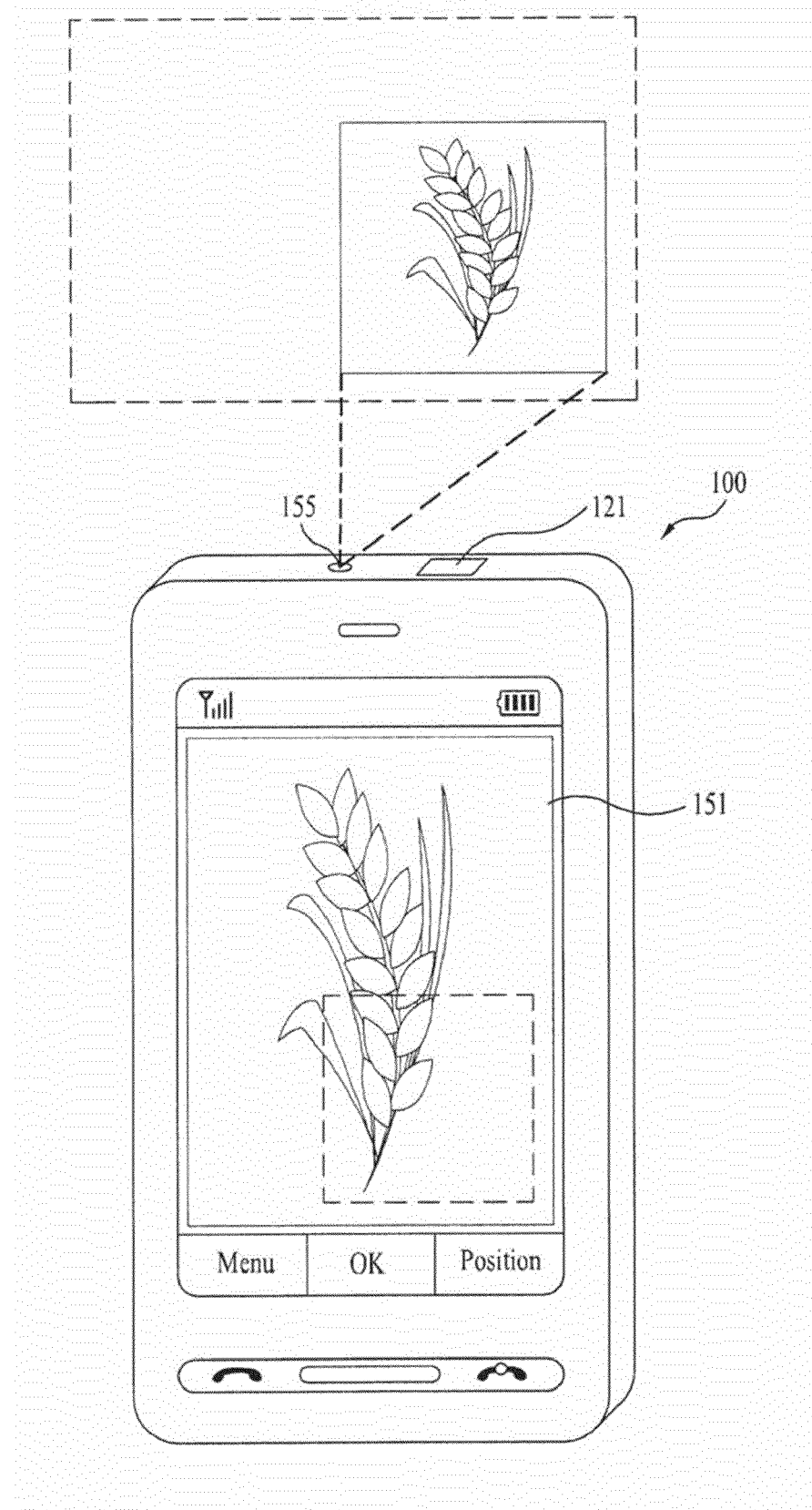

In the following description, a process for setting an area size and an area position according to the area setting operation is explained in detail with reference to the accompanying drawings. Referring to FIGS. 14-15B, while a default image is displayed, if an image including a finger motion for an external screen is inputted via the camera 121, as shown in FIG. 14, the mobile terminal 100 sets the part indicated by the finger motion to an external screen area and then displays the default image on the set area as shown in FIGS. 15A and 15B. In particular, FIG. 15A shows that the area is set to the center of the external screen irrespective of the part indicated by the finger motion and FIG. 15B shows that the area is set to the part indicated by the finger motion.

Figure 16A:
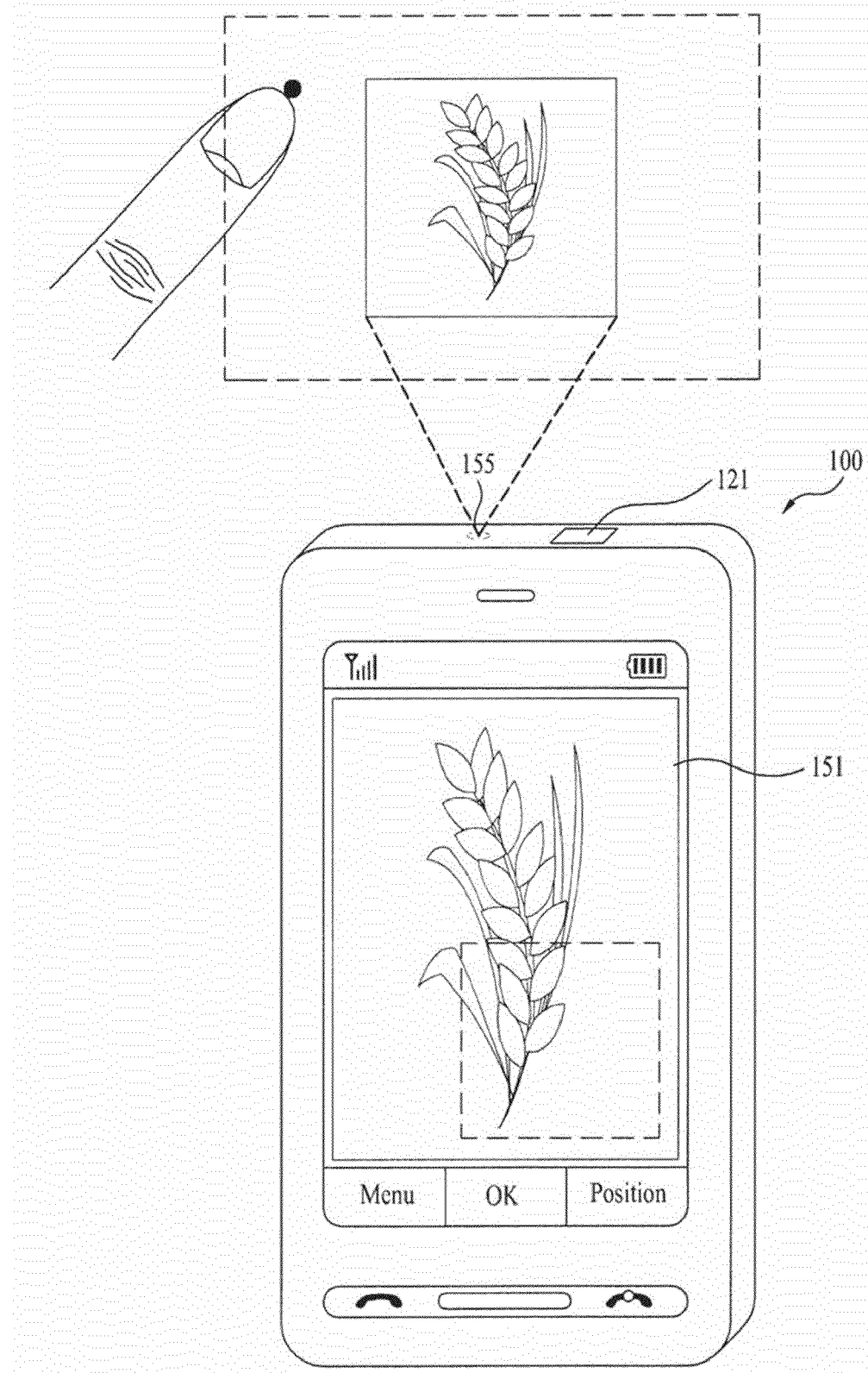
FIG. 16A and FIG. 16B illustrate setting an area position according to a finger motion in a mobile terminal according to one embodiment of the present invention.
Figure 16B:
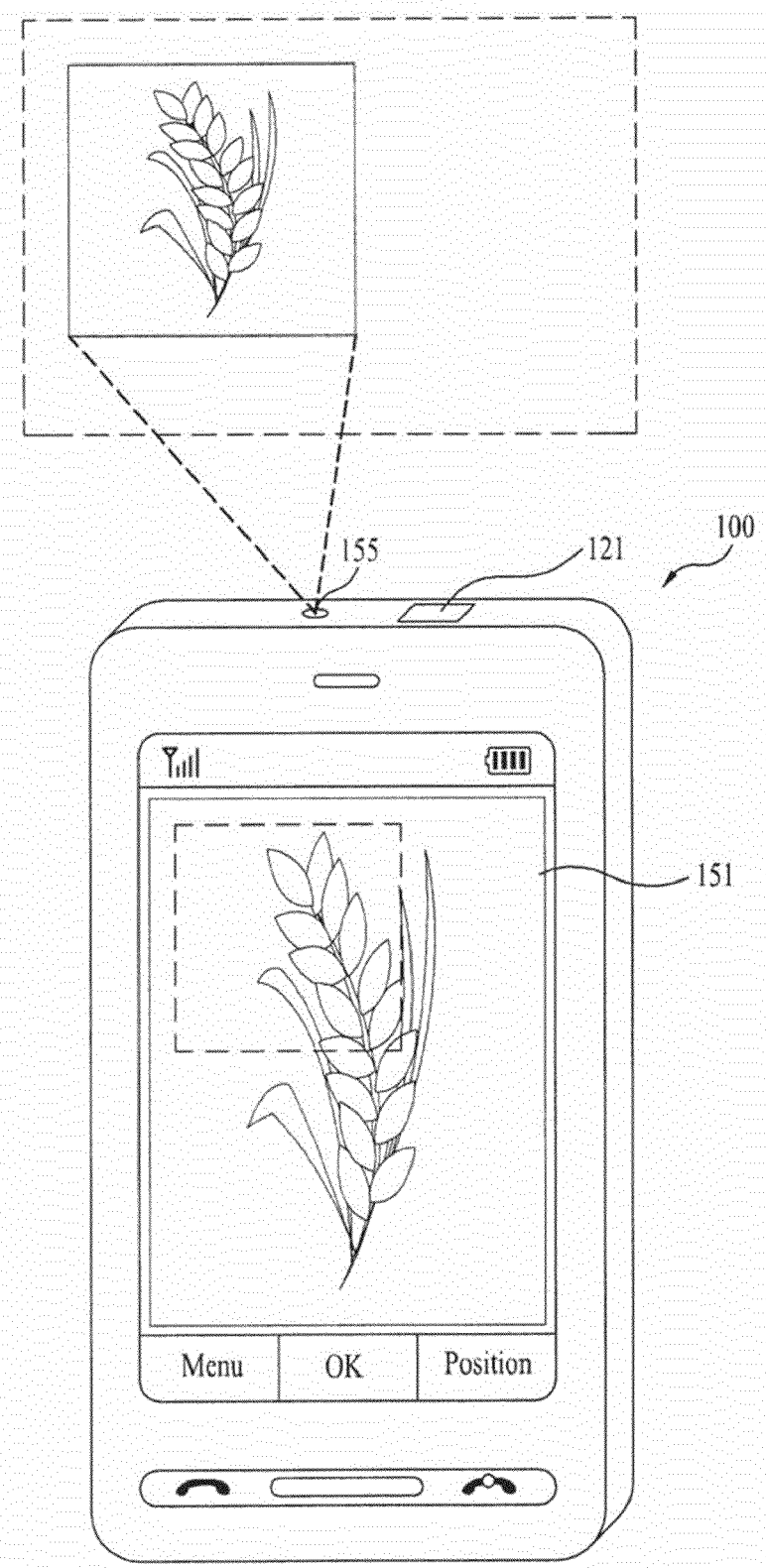

Referring to FIGS. 16A and 16B, as mentioned in the foregoing description, if the area position setting function is activated, as an image including a finger indicating a prescribed point of an external screen is inputted, as shown in FIG. 16A, the mobile terminal 100 shifts an area of an external screen such that the prescribed point indicated by the finger can become a center of the area as shown in FIG. 16B. Moreover, it is able to apply the area position setting process according to a touch pattern to the touchscreen, as shown in FIGS. 12 to 13D.

Figure 17:
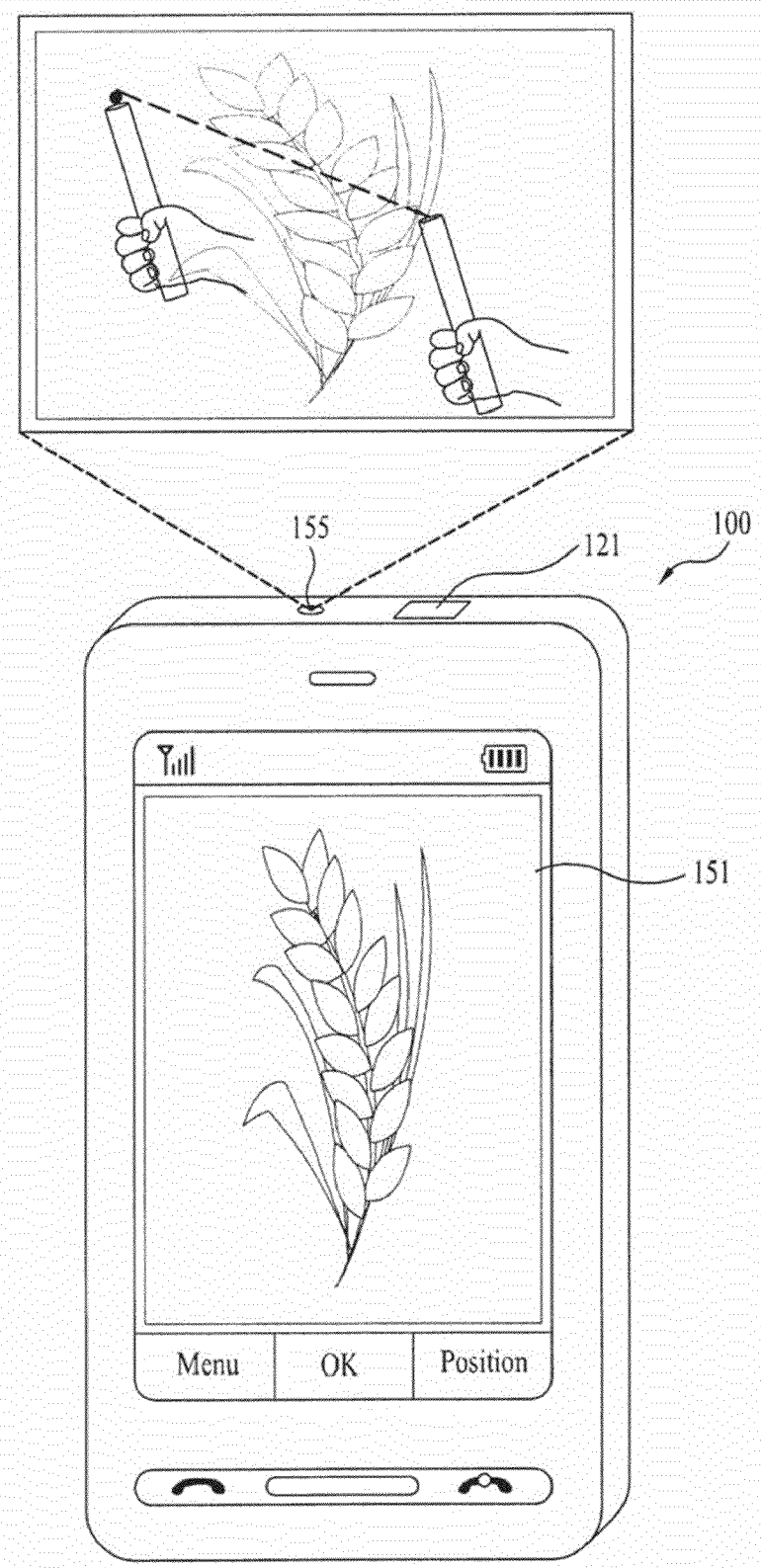
FIGS. 17 to 18B illustrate setting an area size according to pointer motion in a mobile terminal according to one embodiment of the present invention.
Figure 18A:
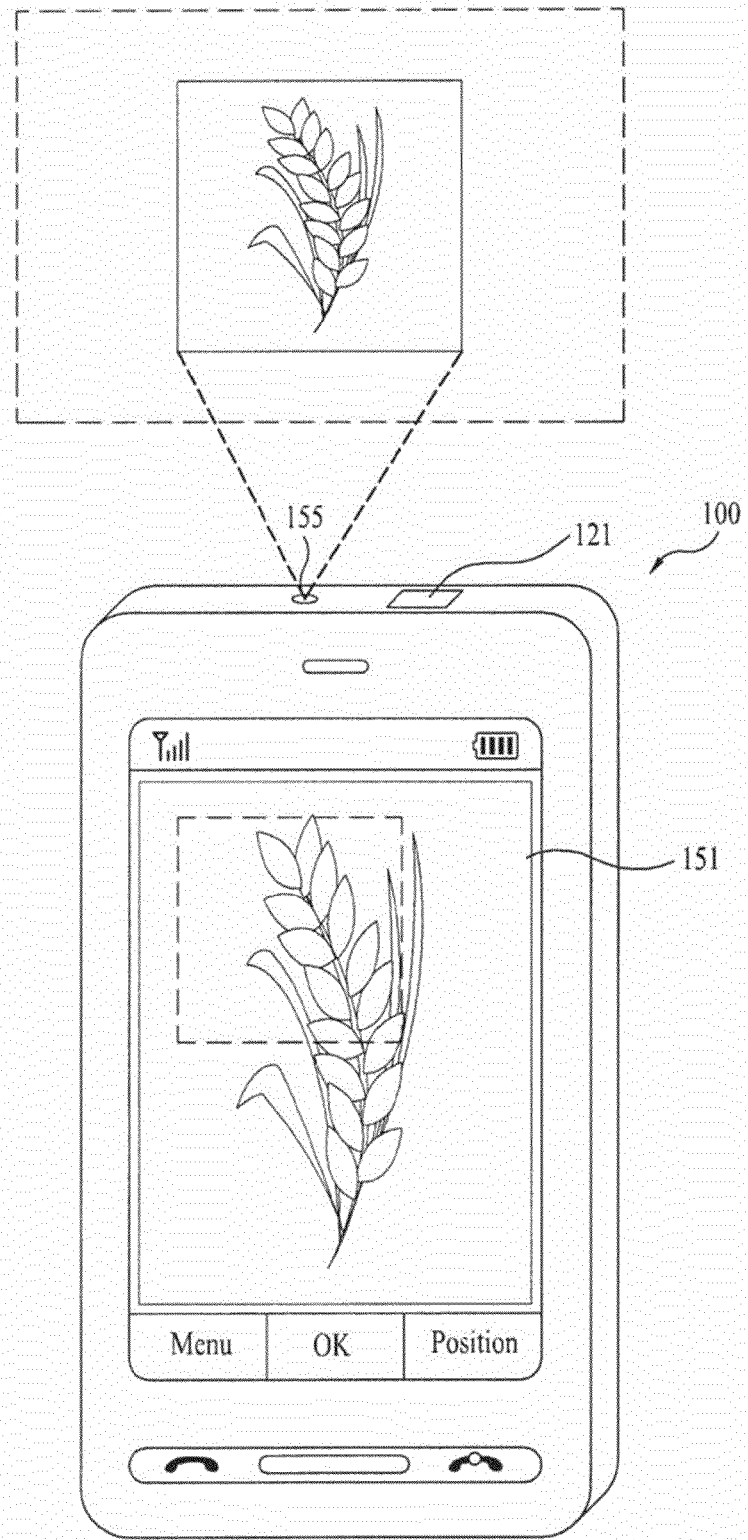
Figure 18B:
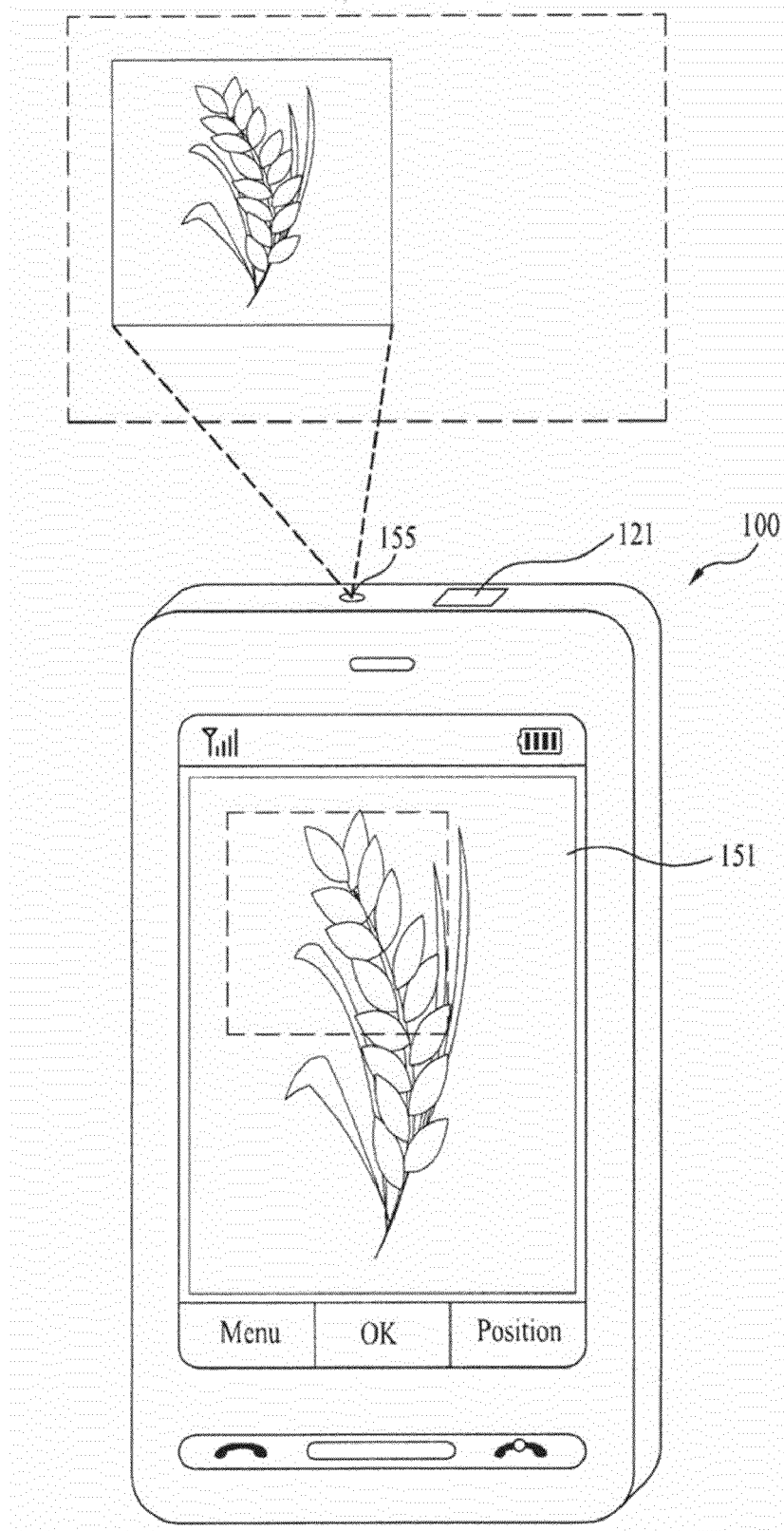

Referring to FIGS. 17 to 18B, while a default image is displayed, if an image including pointer motion for an external screen is inputted via the camera 121, as shown in FIG. 17, the mobile terminal 100 sets the part indicated by the pointer motion to an external screen area and then displays the default image on the set area as shown in FIGS. 18A and 18B. In particular, FIG. 18A shows that the area is set to the center of the external screen irrespective of the part indicated by the pointer motion and FIG. 18B shows that the area is set to the part indicated by the pointer motion.

Referring to FIG. 19A and FIG. 19B, as mentioned in the foregoing description, if the area position setting function is activated, as an image including a pointer indicating a prescribed point of an external screen is inputted, as shown in FIG. 19A, the mobile terminal 100 is able to shift an area on an external screen such that the prescribed point indicated by the pointer can become a center of the area as shown in FIG. 19B. Moreover, it is able to apply the area position setting process according to a touch pattern to the touchscreen, as shown in FIGS. 12 to 13D.

According one embodiment of the present invention, the mobile terminal 100 includes the sensing unit 140 for recognizing a motion pattern of the mobile terminal 100. The mobile terminal 100 is also able to receive an input of an area setting control signal according to the recognized motion pattern under the control of the controller 180. The mobile terminal 100 is able to set a size or position of an area according to the motion pattern under the control of the controller 180. The sensing unit 140 recognizes a motion of the mobile terminal 100 and the sensing unit 140 can include one of a motion detecting sensor, a gyro-sensor, a gravity detecting sensor, and the like. The motion pattern can include at least one of a motion direction, a motion distance, a motion speed, a motion angle, a motion angular speed, and the like.

Figure 20A:
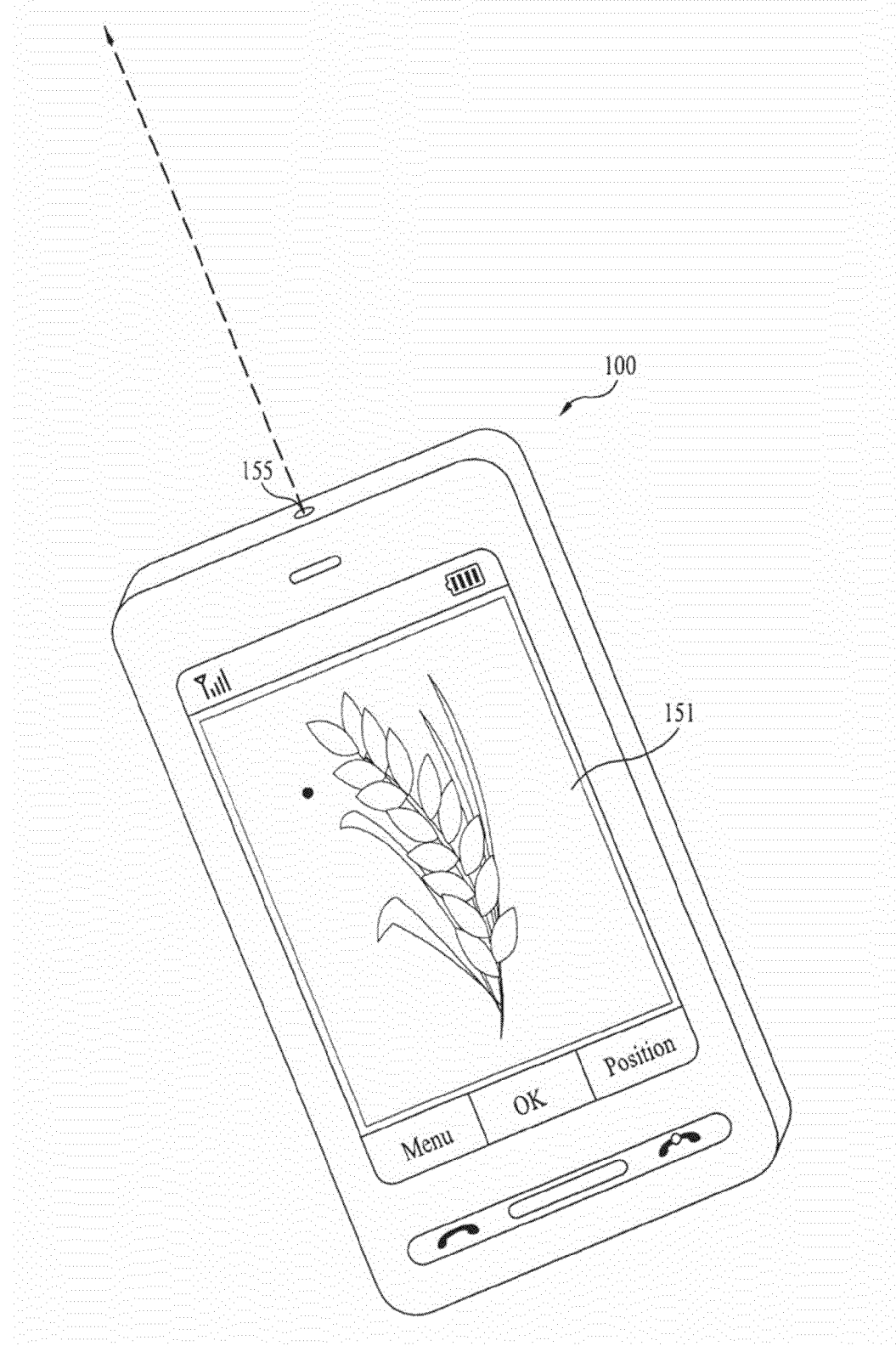

In the following description, a process for setting an area size and an area position according to a motion pattern is explained in detail with reference to the accompanying drawings. Referring to FIG. 20A and FIG. 20B, upon detecting a motion from a first position to a second position, the mobile terminal 100 sets an external screen area according to a screen area having a diagonal line connecting a first point corresponding to the first position to a second point corresponding to the second position and then displays a default image on the set area. In this case, the first point can be fixed. For example, a size of the area can be set in proportion to a motion speed or distance.

Figure 21A:
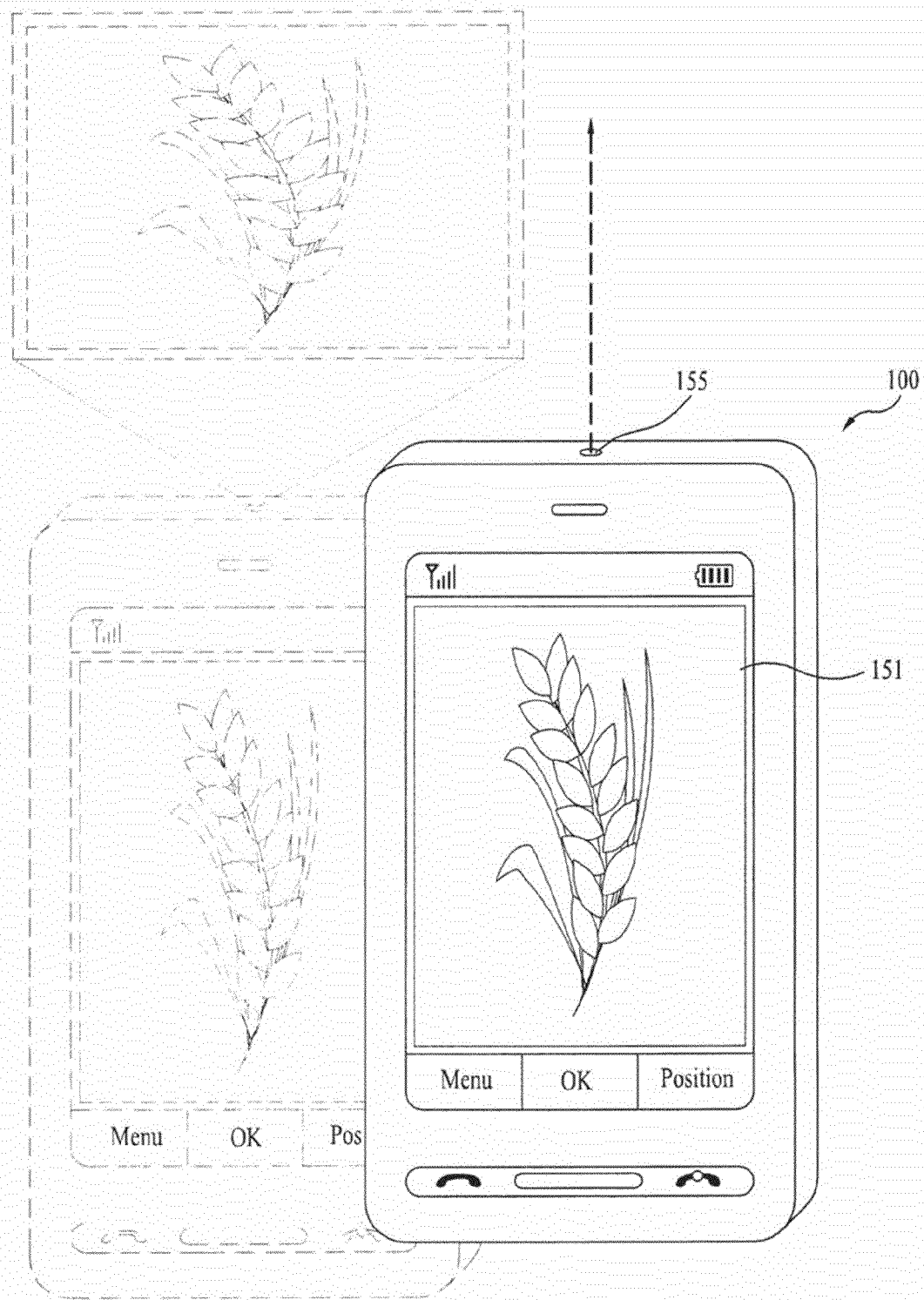
FIG. 21A and FIG. 21B illustrate setting an area position according to a motion pattern of a mobile terminal according to one embodiment of the present invention.
Figure 21B:
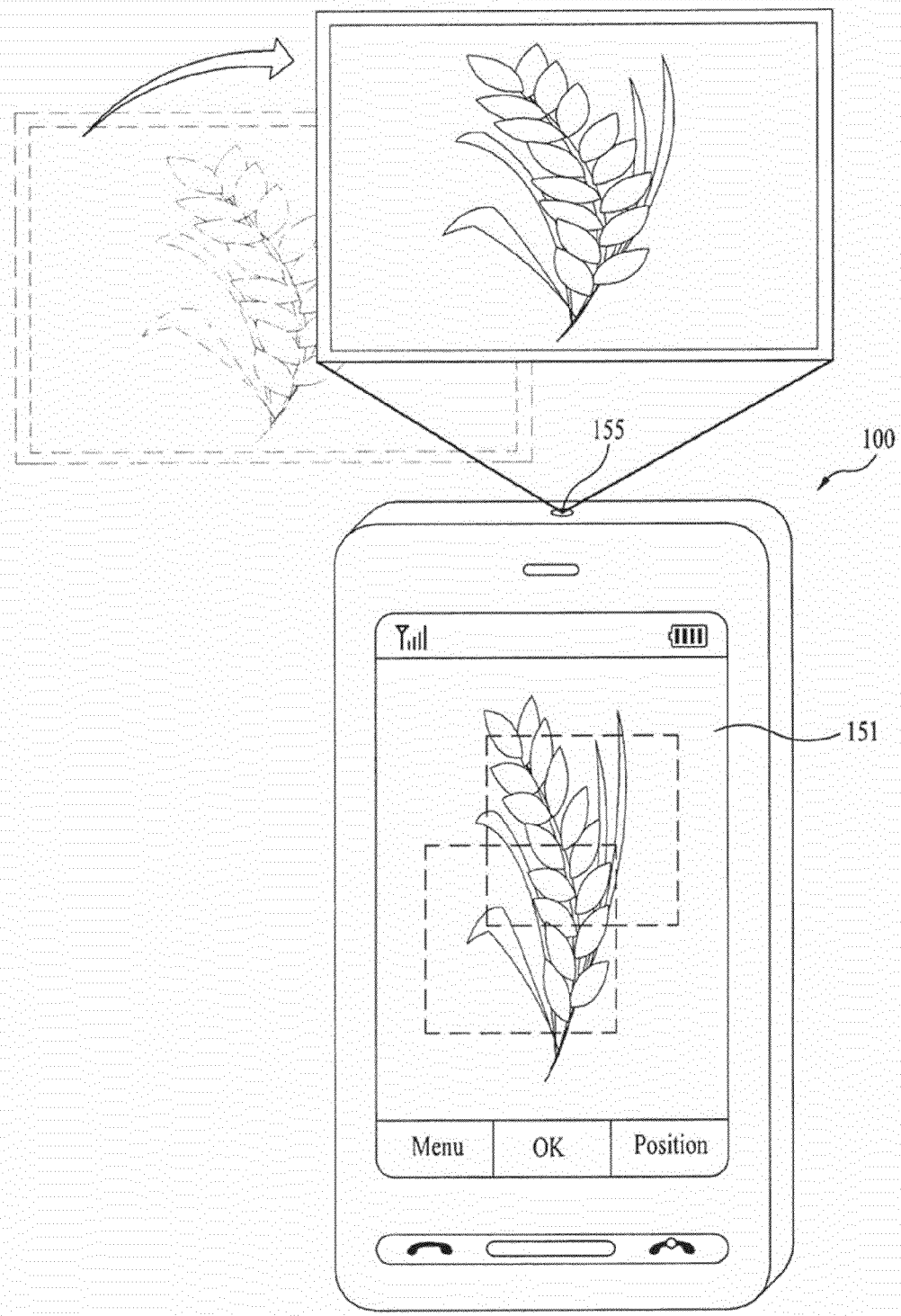

Referring to FIG. 21A and FIG. 21B, upon detecting a position shift while a default image is displayed, the mobile terminal 100 shifts a screen area to have a point corresponding to the shifted position become a center and then shifts an external screen area according to the shift of the screen area. If the screen area is not displayed or the shift of the screen area is not accompanied, the mobile terminal 100 is able to shift the external screen area such that a point on the external screen corresponding to the shifted position can become the center.

While a signal input button for setting an area size or position corresponding to a motion pattern is pressed, the mobile terminal 100 is able to perform the aforesaid area size or position setting process. If the signal input button is released from being pressed, the mobile terminal 100 is able to complete the aforesaid area size or position setting process.

According to one embodiment of the present invention, the mobile terminal 100 includes a microphone 122 for receiving an input of a speech signal for an area setting control. The mobile terminal 100 is able to receive an input of an area setting control signal corresponding to the speech signal inputted via the microphone 122 under the control of the controller 180. The mobile terminal 100 is also able to set a size or position of the area according to the speech signal under the control of the controller 180.

Figure 22B:
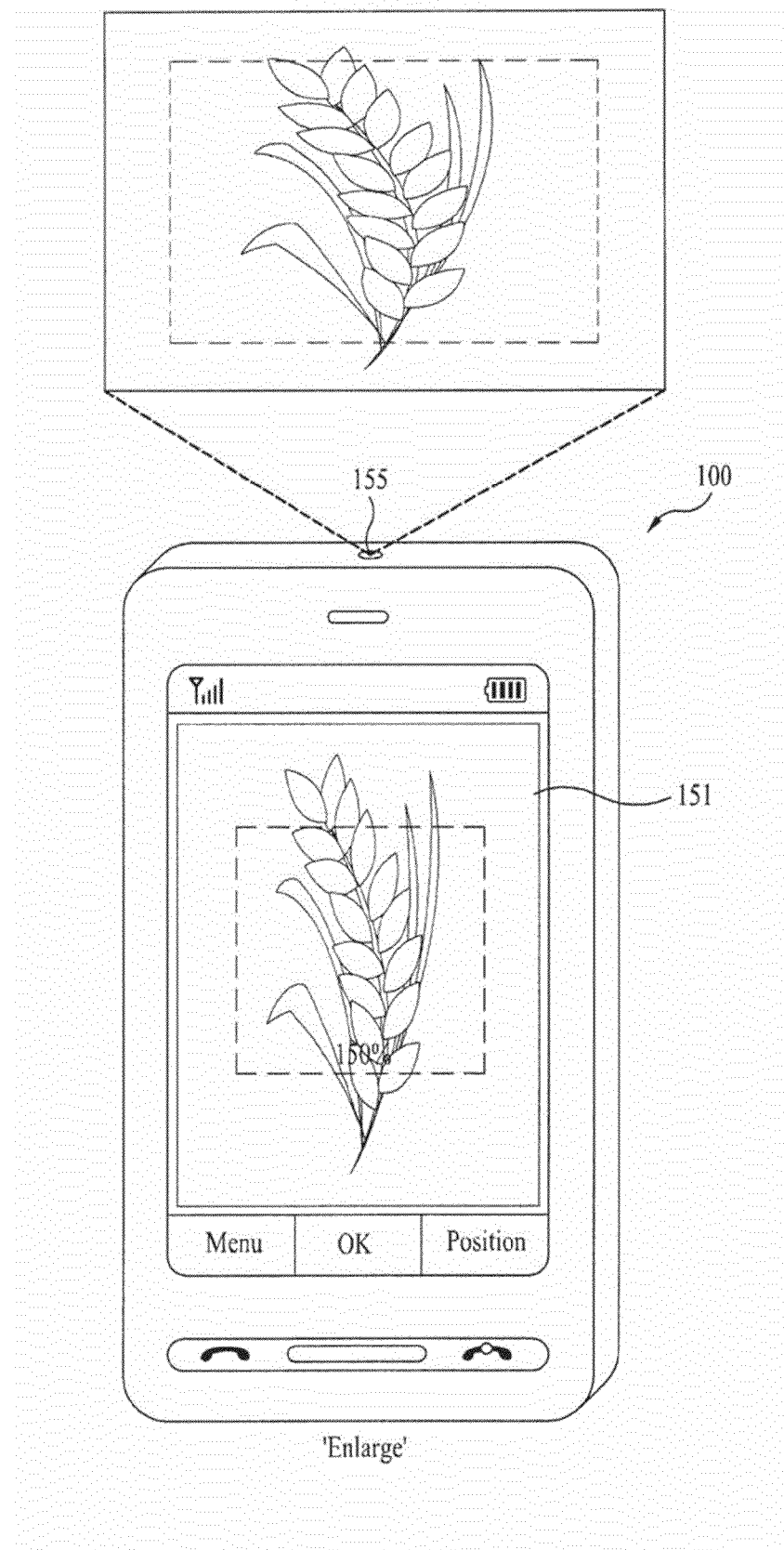

In the following description of an embodiment, a process for setting an area size or an area position according to a speech signal is explained in detail with reference to the accompanying drawings. Referring to FIGS. 22A to 22C, upon receiving an input of a speech signal, for example "Show me" for commanding a start of an area size setting process, the mobile terminal 100 displays a default image on an external screen area as shown in FIG. 22A. In this case, the display 151 is able to display a screen area having an area or position set according to the external screen area.

In the external screen area shown in FIG. 22A, a default image is displayed in 100% size. Upon receiving an input of a speech signal, for example, "Enlarge" for area size enlargement, as shown in FIG. 22A, the mobile terminal 100 displays a default image on an external screen area enlarged by a prescribed magnifying power as shown in FIG. 22B. In this case, a screen area can be enlarged together. For example, an area size may be enlarged in proportion to an input count or volume of the speech signal.

Upon receiving an input of a speech signal, for example, "Reduce" for area size reduction, as shown in FIG. 22C, the mobile terminal 100 displays a default image on an external screen area reduced by a prescribed magnifying power as shown in FIG. 22C. In this case, a screen area can be reduced together. For example, an area size may be reduced in proportion to an input count or volume of the speech signal.

Figure 23A:
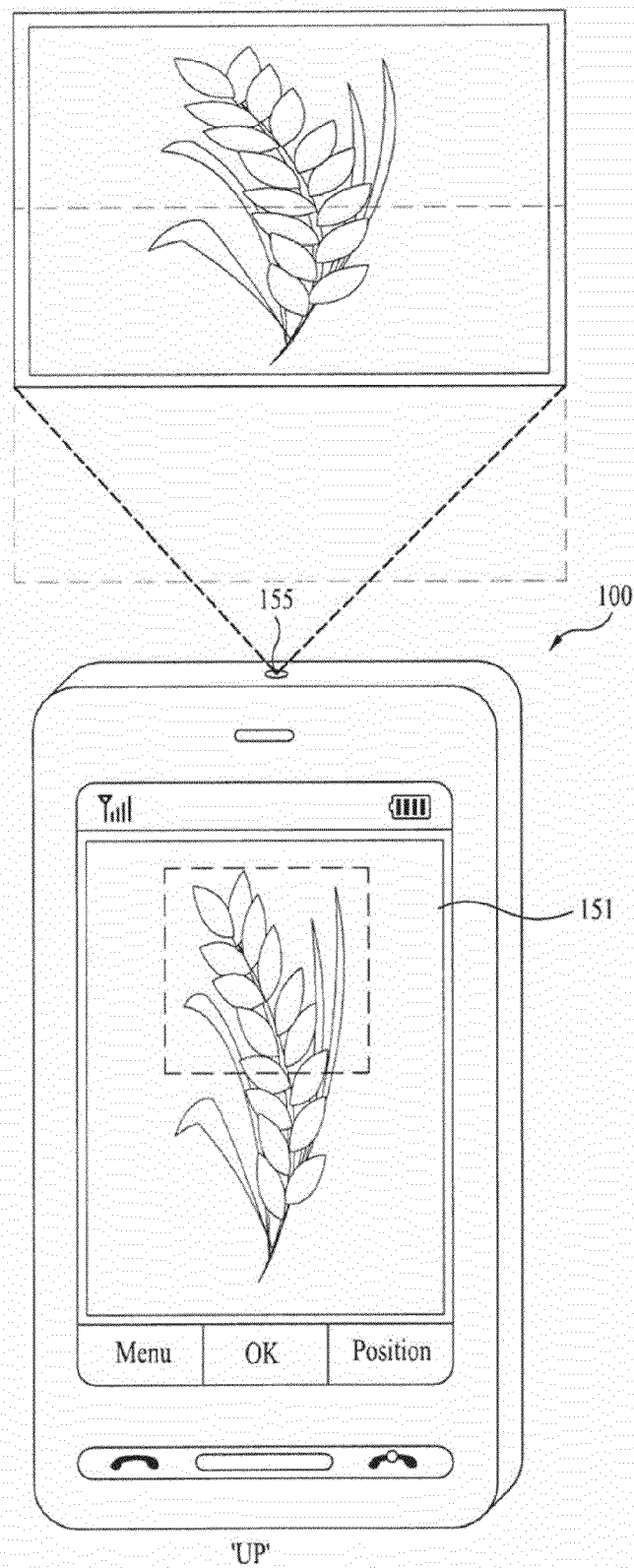
FIG. 23A and FIG. 23B illustrate setting an area position according to a speech signal in a mobile terminal according to one embodiment of the present invention.
Figure 23B:
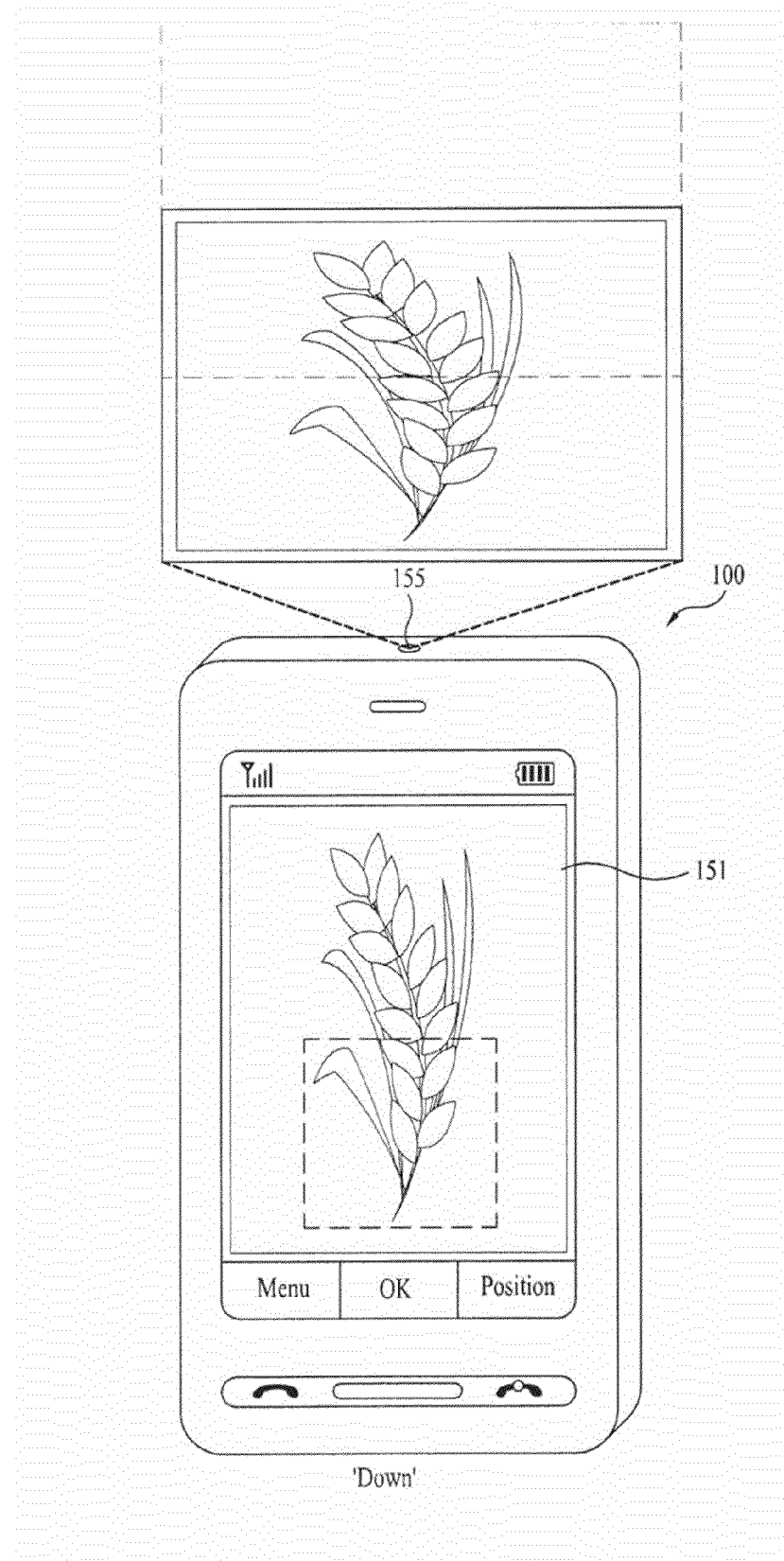

Referring to FIG. 23A and FIG. 23B, while a default image is displayed on an external screen area, upon receiving an input of a speech signal, for example "up" or "down" for an area position shift, the mobile terminal 100 shifts the external screen area by a prescribed distance according to the speech signal. For example, the shifted distance may be increased in proportion to an input count or volume of the speech signal.

According to one embodiment of the present invention, upon receiving an input in response to a key manipulation for an area size setting for an area size, an area ratio, an area resolution and the like via the user input unit 130, the mobile terminal 100 is able to receive an area setting control signal according to the inputted key manipulation under the control of the controller 180. The mobile terminal 100 is able to set a size of an area according to the inputted key manipulation under the control of the controller 180.

Figure 24:
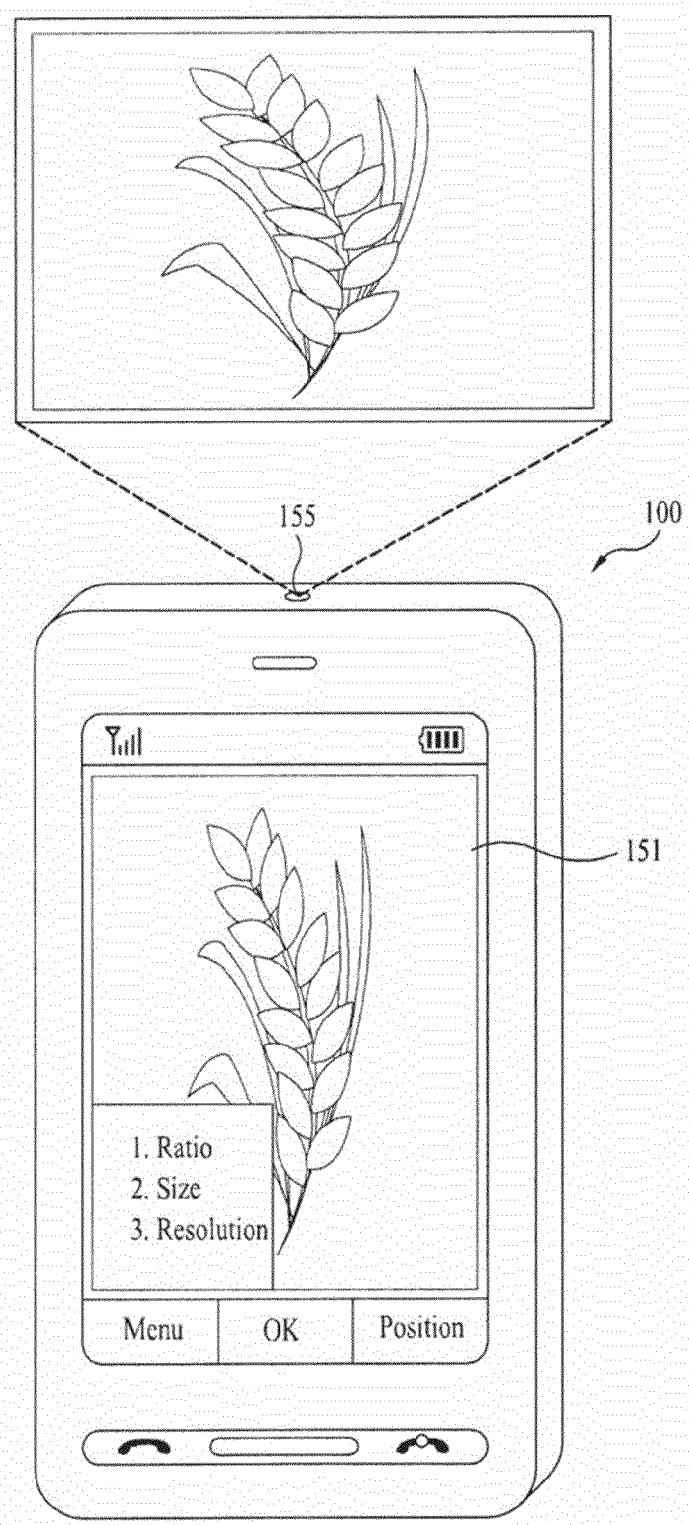
FIGS. 24 to 27 illustrate setting an area size by manipulating a key in a mobile terminal according to one embodiment of the present invention.

In the following description, an area size setting process in response to a key manipulation is explained in detail with reference to the accompanying drawings. Referring to FIGS. 24 to 27, while a default image is displayed on an external screen area, upon receiving an input of a user operation for commanding an area size setting using a key manipulation, the mobile terminal 100 displays an area size setting reference list on a prescribed area of a screen as shown in FIG. 24. In this case, the area size setting reference can include a screen ratio, a screen size, a screen resolution and the like.

Figure 25:
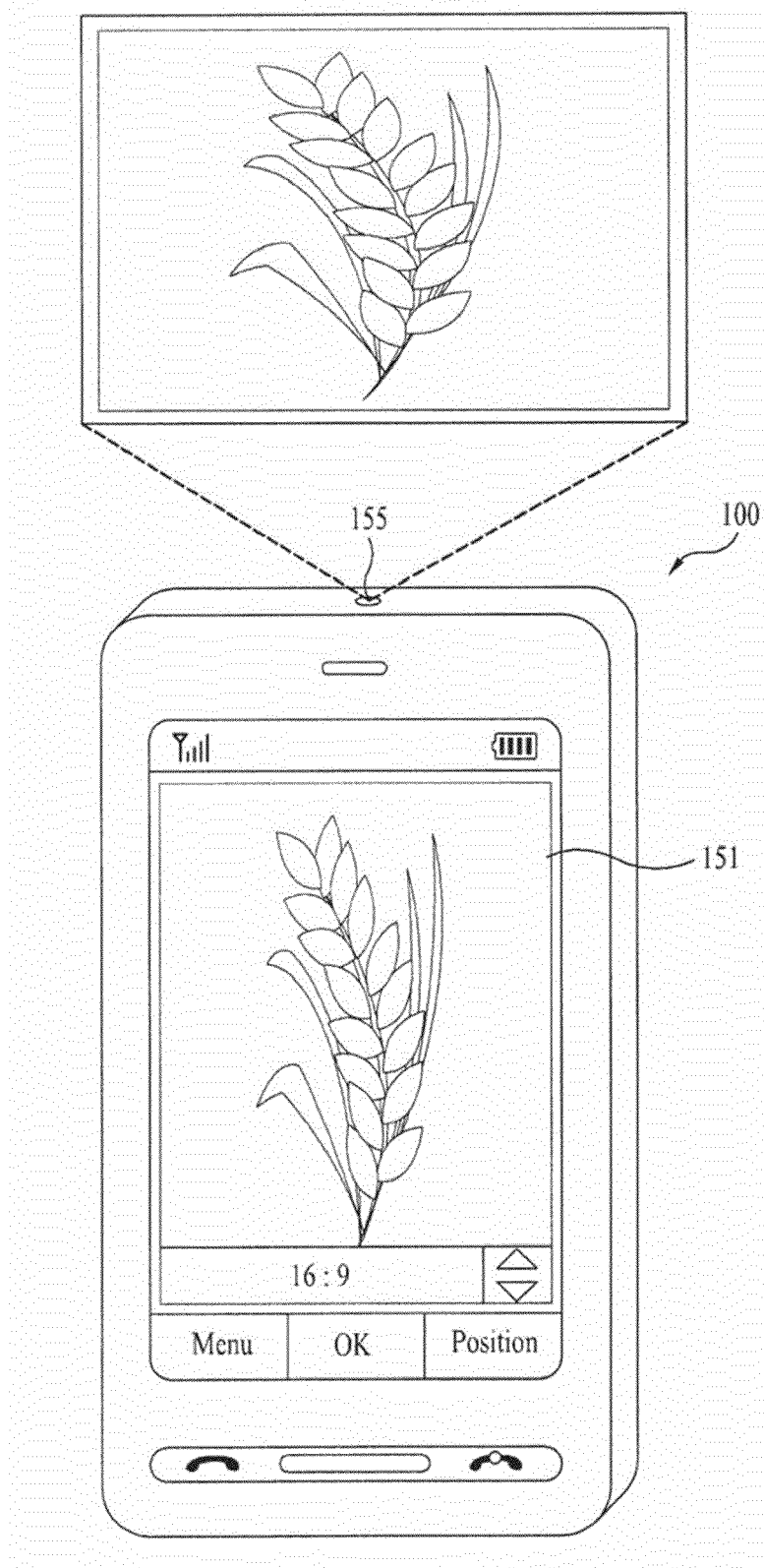
Figure 26A:
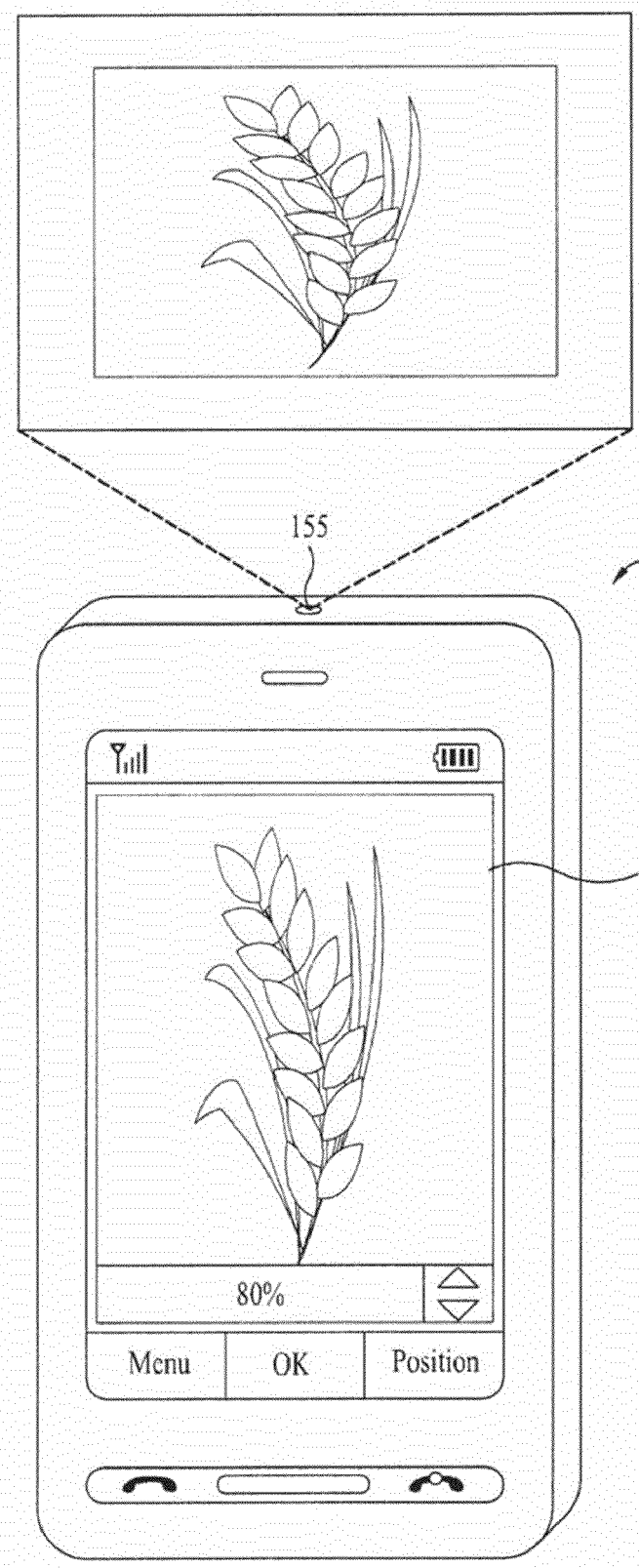
Figure 26B:
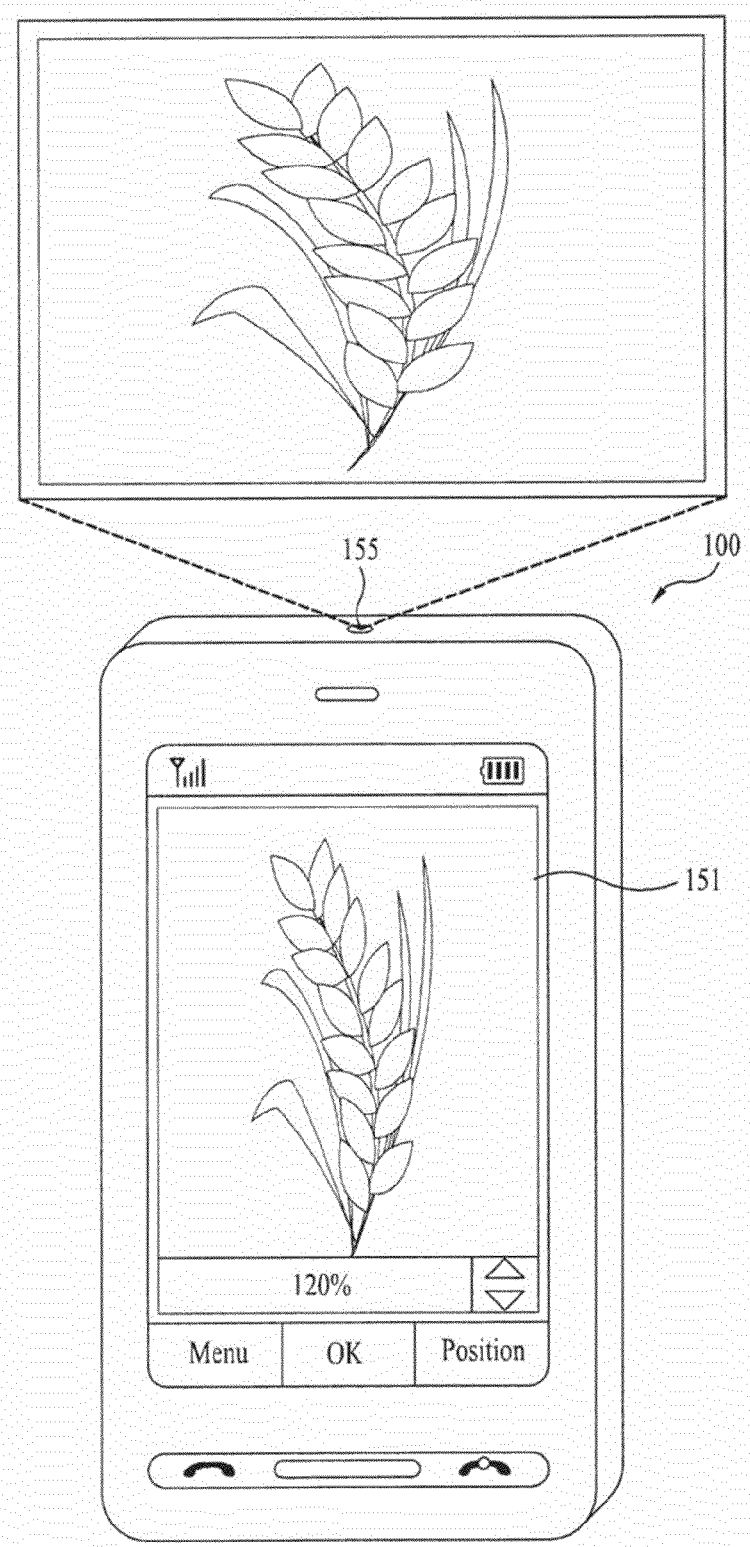
Figure 27:
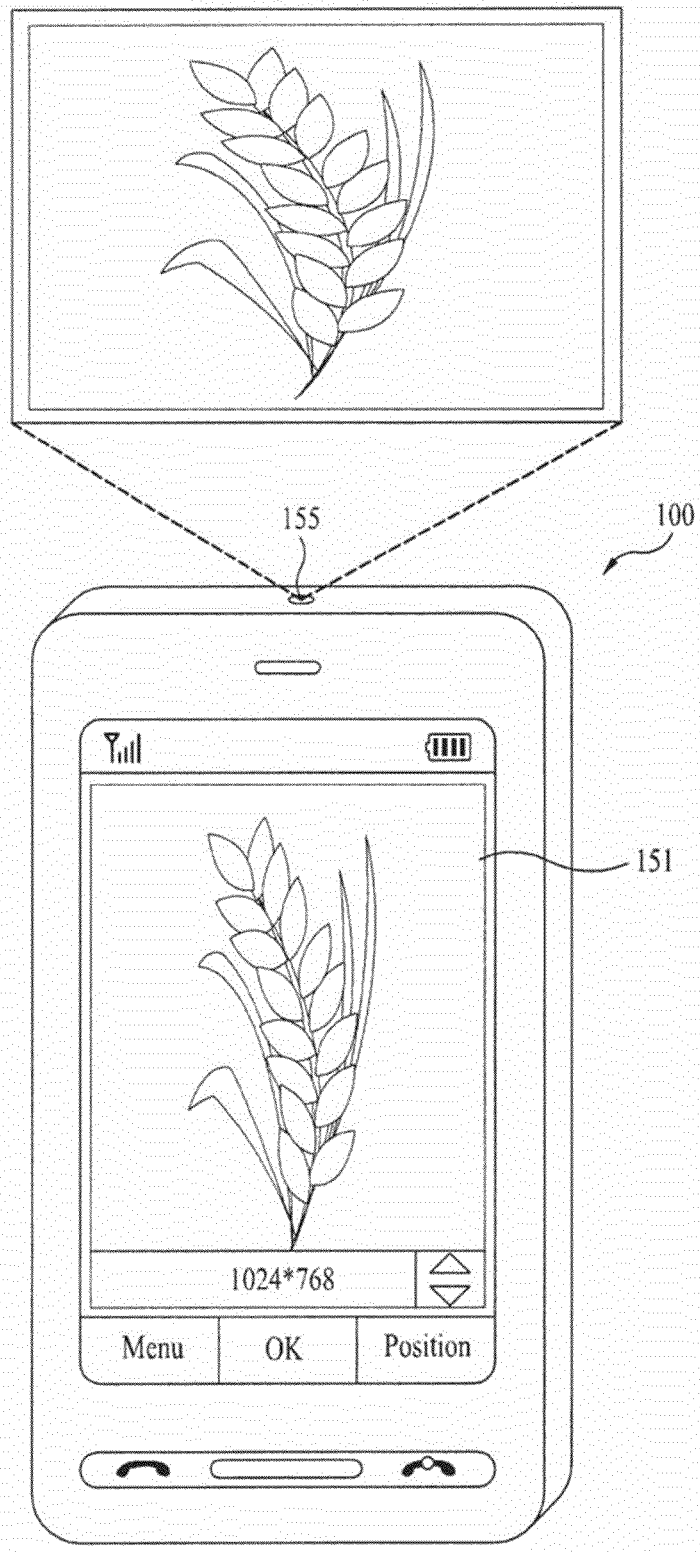

If a ratio, for example, "16:9," (horizontal vs. vertical) is selected from the area size setting list, the mobile terminal 100 sets the ratio of the external screen area according to the screen ratio inputted via the key manipulation as shown in FIG. 25. If a size, for example, "80%" or "120%" is selected from the area size setting list, the mobile terminal 100 sets the size of the external screen area according to the screen size inputted via the key manipulation as shown in FIG. 26A or FIG. 26B, respectively. If a resolution, for example, "1,024*768" is selected from the area size setting list, the mobile terminal 100 sets the resolution of the external screen area according to the screen resolution inputted via the key manipulation as shown in FIG. 27. In this case, the key manipulation can include both a numeral input corresponding to screen ratio/size/resolution using numeral keys and a size adjustment of screen ratio/size/resolution using a navigation key.

According to one embodiment of the present invention, the mobile terminal 100 is able to receive an input via a user operation for an area size setting using a navigation key, such as a jog dial, included in the user input unit 130. The mobile terminal 100 receives an input of an area setting control signal according to the inputted user operation and then sets a size of an area according to the inputted area setting control signal, under the control of the controller 180.

In the following description, an area size setting process in response to a navigation key manipulation is explained in detail with reference to the accompanying drawings. For example, the navigation key can set an area having a prescribed size according to a motion in a prescribed direction and can include at least one of a jog dial, a jog shuttle, a joystick, a track ball, a touchpad and the like.

Figure 28A:
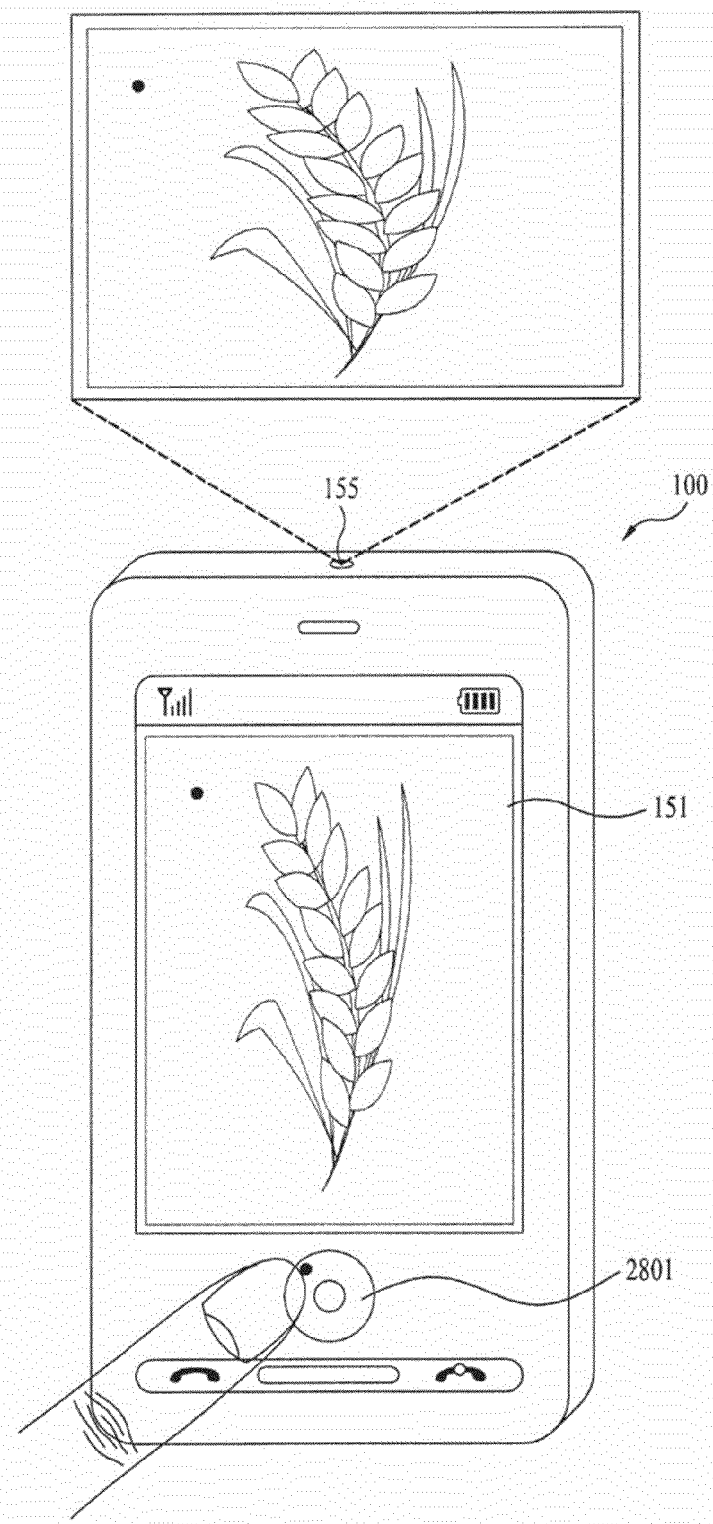
FIGS. 28A to 28C illustrate setting an area size by manipulating a jog dial in a mobile terminal according to one embodiment of the present invention.
Figure 28B:
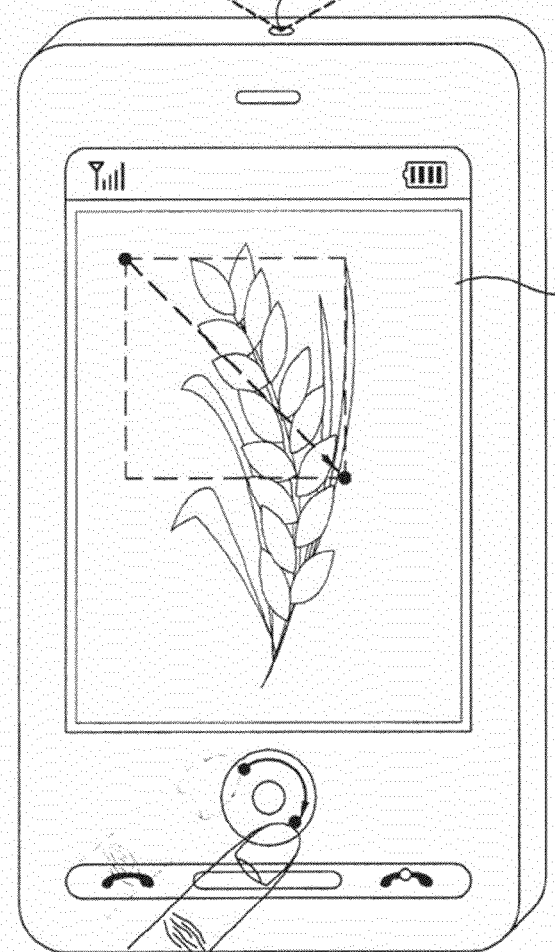
Figure 28C:
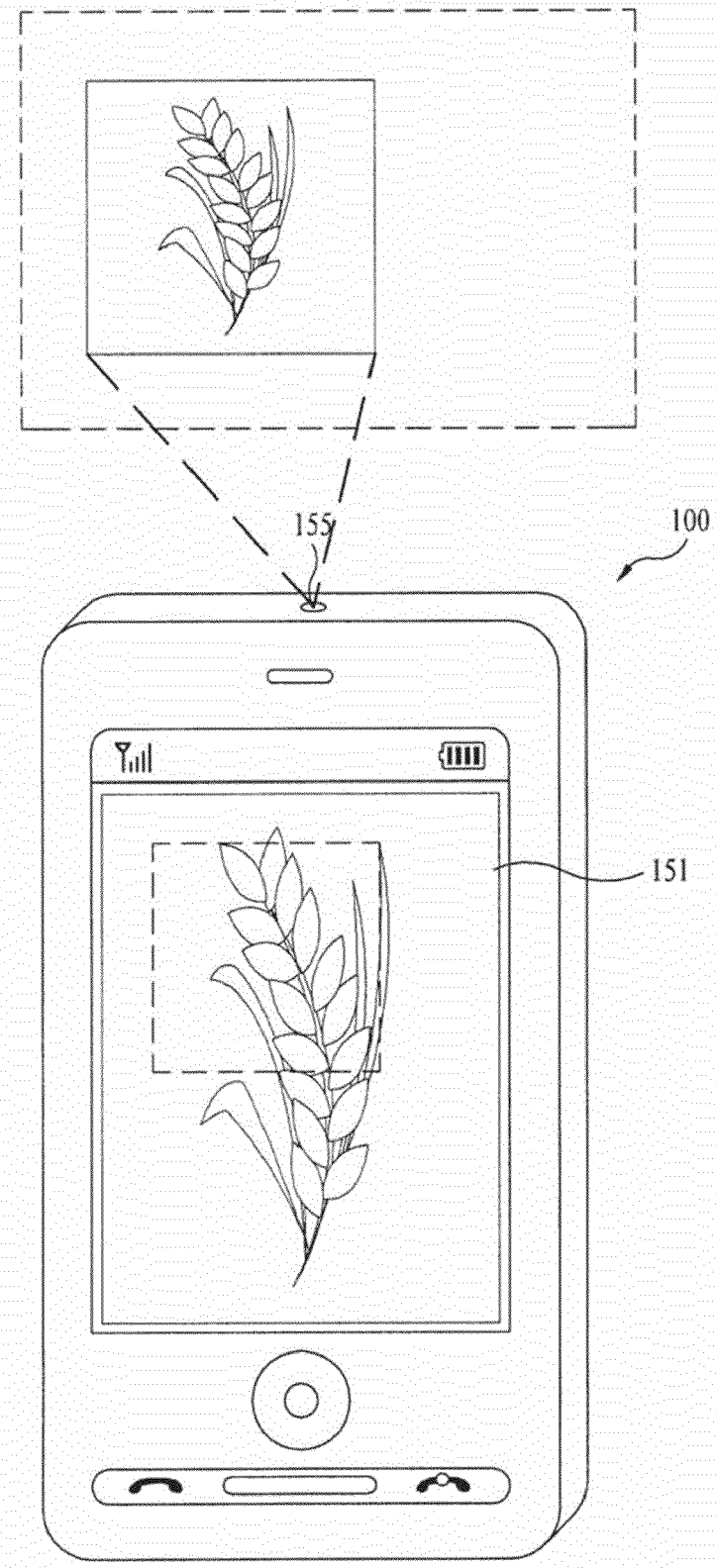

Referring to FIGS. 28A to 28C, while a default image is displayed on an external screen area, the mobile terminal 100 is able to display a point corresponding to a jog dial manipulation start (hereinafter called 'start point') on the default image as shown in FIG. 28A. In this case, the start point can be fixed. Therefore, even if the manipulation of the jog dial starts from any position of the jog dial, the start point can be always identical. Alternatively, the start point may vary according to the manipulation start position of the jog dial.

When the jog dial is shifted from a first position to a second position by a user, the mobile terminal 100 sets an external screen area according to a screen area having a diagonal line connecting a start point corresponding to the first position to an end point corresponding to the second position as shown in FIG. 28B. The mobile terminal 100 is able to display a default image on the external screen area set in FIG. 28B as shown in FIG. 28C. The above-described embodiments of the present invention can be performed by being combined together.

Figure 29:
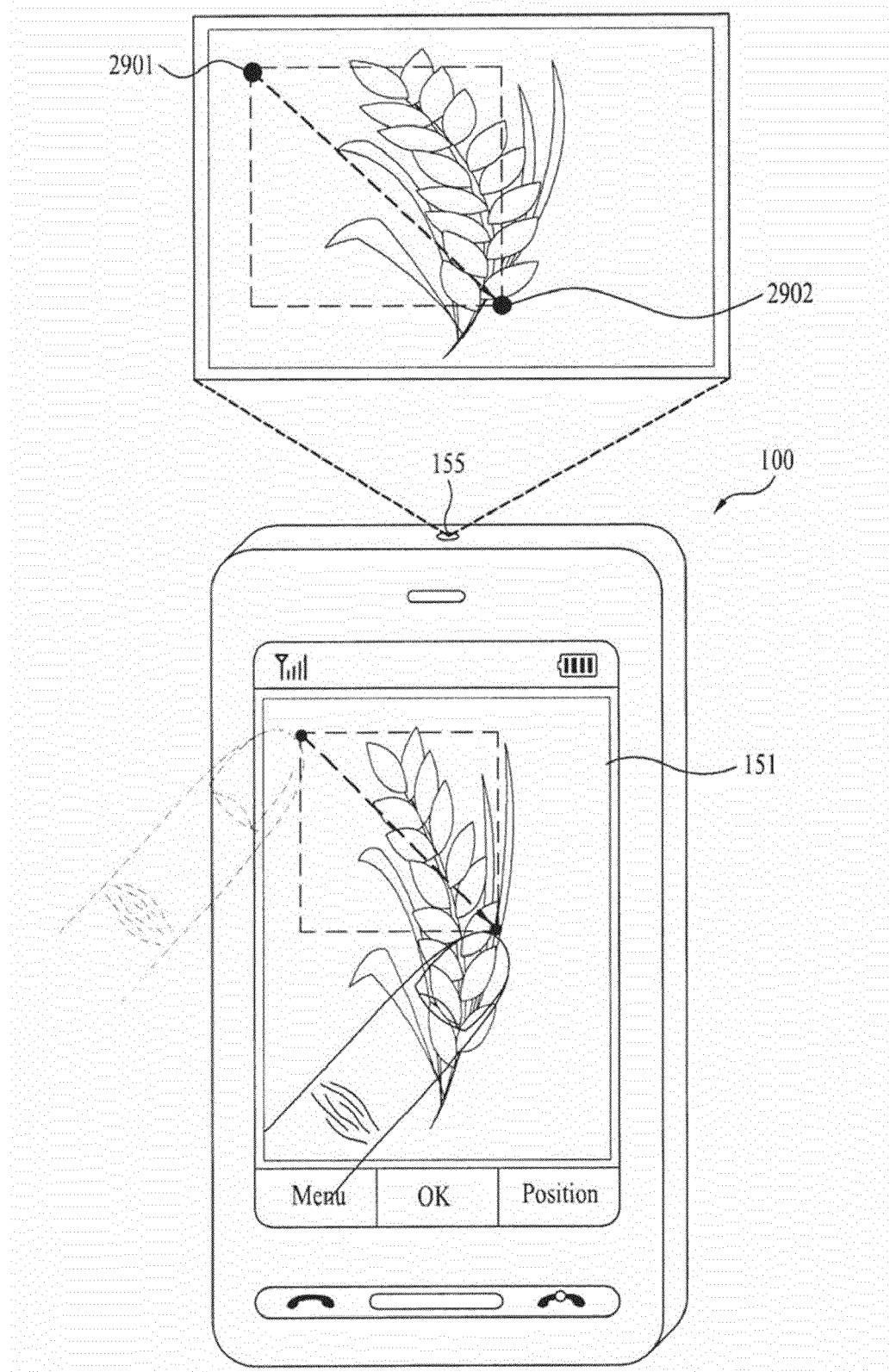
FIG. 29 illustrates setting an area on an external screen using a pointer in a mobile terminal according to one embodiment of the present invention.

In the following description, additional embodiments for an area setting process are explained with reference to the accompanying drawings. Referring to FIG. 29, the mobile terminal 100 is able to display a setting start point 2901 or a setting end point 2902 of an external screen area according to an area setting process using a pointer.

Referring to FIG. 30, the mobile terminal 100 displays area information of an external screen area set by an area setting process, such as size information or position information, on an external screen. Upon receiving an input via an area setting confirmation operation from a user, the mobile terminal 100 applies the set external screen area to an image to display the image via the projector module 155.

Referring to FIG. 31, the mobile terminal 100 displays a text for prompting a user to select whether to apply an external screen area set by an area setting process. If the user selects "yes," the mobile terminal 100 applies the set external screen area to an image to display the image via the projector module 155.

Figure 32B:
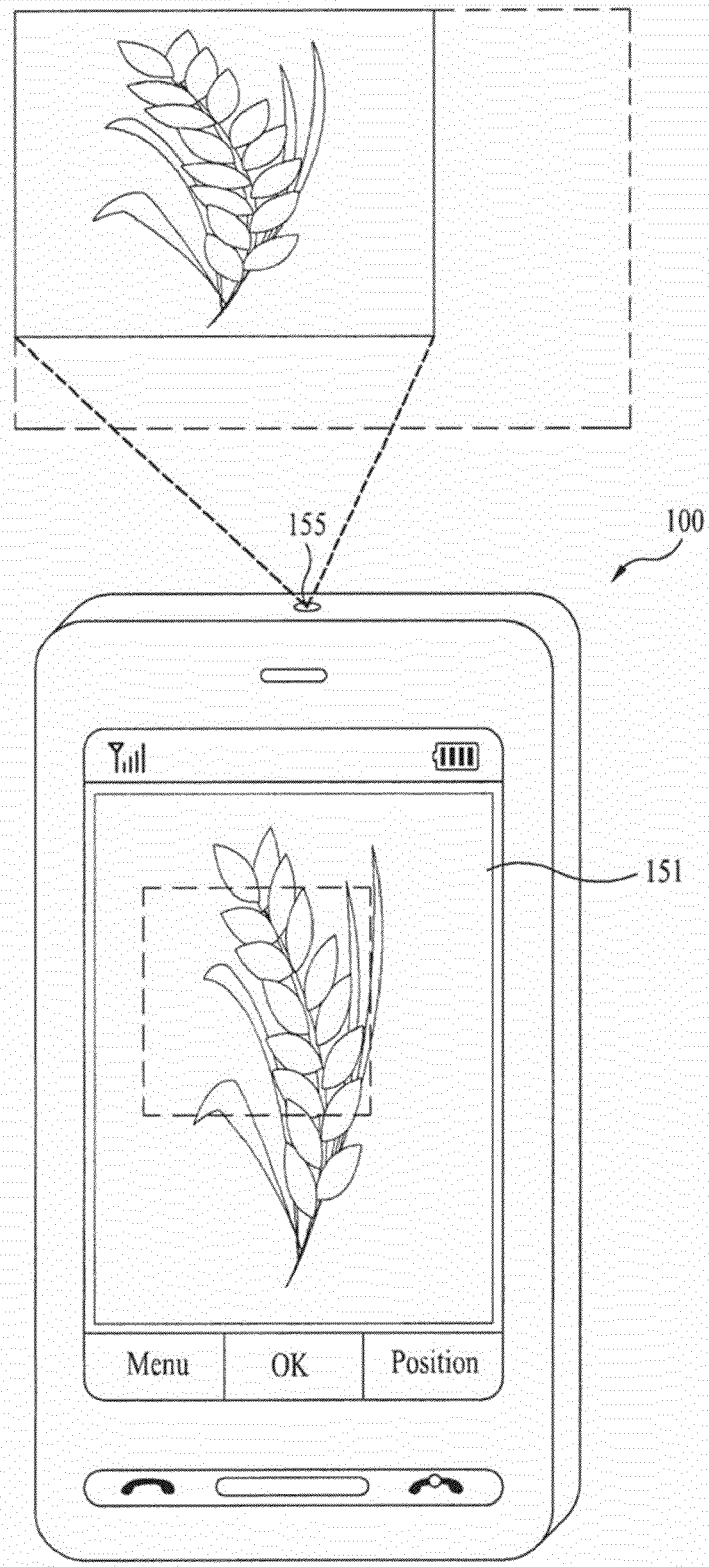

Referring to FIG. 32A and FIG. 32B, the mobile terminal 100 displays a screen area on a touchscreen. If a touch and drag action from a first corner of the screen area to a prescribed point within the screen area is performed, the mobile terminal 100 recognizes an external screen area as a single block and then displays a block that is reduced according to the touch and drag action. Similar operation is applicable to the case when a touch and drag from the first corner of the screen area to a prescribed point except the screen area or a prescribed point of one of two sides configuring the first corner is performed.

Figure 33A:
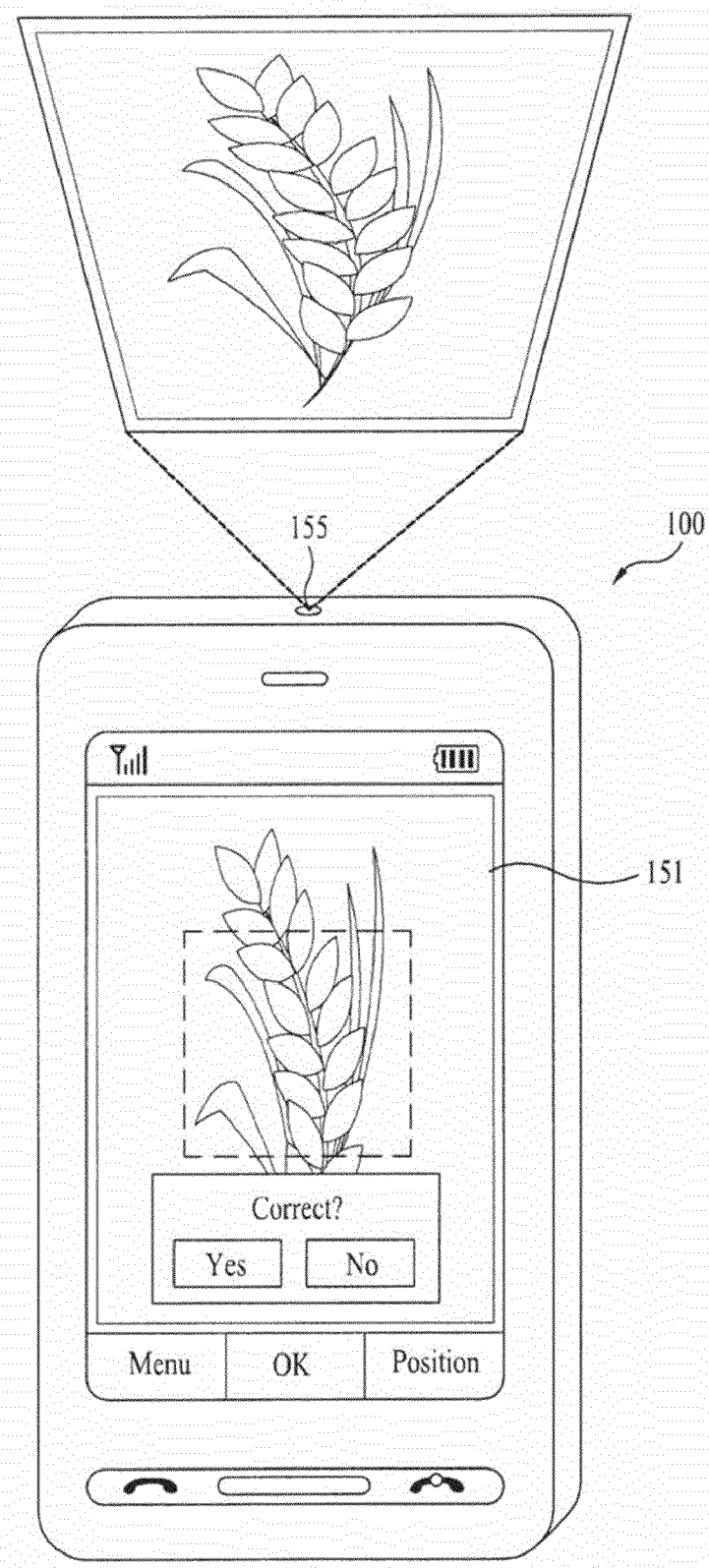

Referring to FIG. 33A and FIG. 33B, if an external screen area is displayed as a shape, for example, trapezoid that is not suitable, the mobile terminal 100 outputs a text for querying a user whether to correct the external screen area. If the user selects "yes", the mobile terminal 100 displays the external screen area as a suitable shape. The suitable shape generally refers to a rectangle having a uniformly specified horizontal vs. vertical ratio. The suitable shape can be automatically set by the mobile terminal 100 or can be set according to a selection made by the user.

Figure 34A:
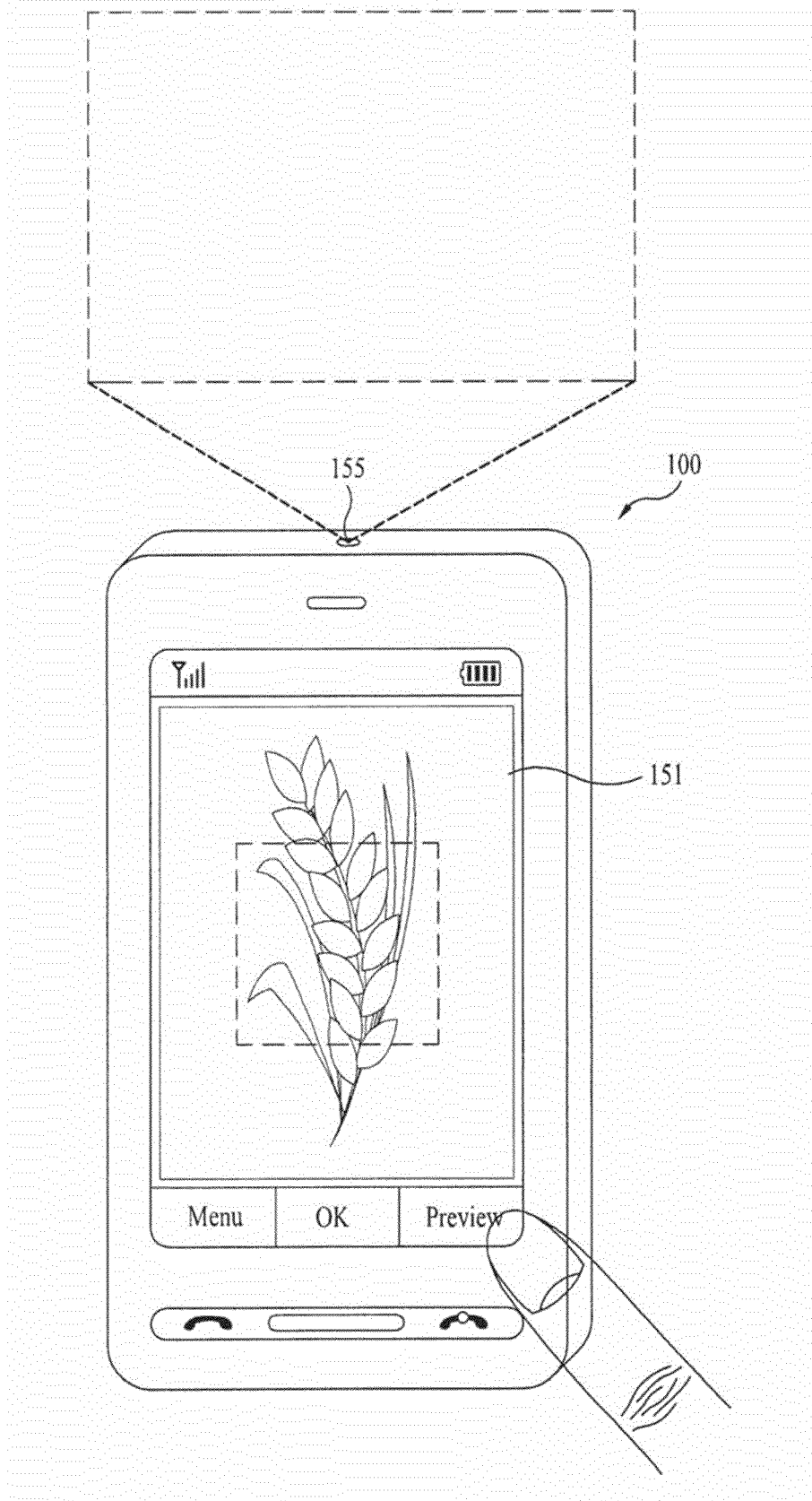

Referring to FIG. 34A and FIG. 34B, while a default image is not displayed when an external screen area is set, as shown in FIG. 34A, if a user selects "preview", the mobile terminal 100 displays a default image or an image pre-designated for a preview on the set external screen area as shown in FIG. 34B.

Referring back to FIG. 8, the mobile terminal 100 displays an image on the external screen area set in S820 under the control of the controller 180 (S840). The image displayed in S840 is the image to be substantially displayed via the projector module 155 and differs from a default image for effectively illustrating a process for setting an external screen area.

The above-described area setting process can be performed in the course of performing the displaying in S840. If so, the image displayed in S840 can be displayed intact to replace the default image. The displaying in S840 can be performed if an image displaying function using the projector module 155 (hereinafter called 'first displaying function') or an image displaying function using data transceivings with an external screen (hereinafter called 'second displaying function') is selected by a user. For example, the first or second displaying function can be selected using a key or key area or a menu item separately provided for a function selection. If the first displaying function is selected, the mobile terminal 100 displays an image, which is projected via the projector module 155, on the set external screen area. If the second displaying function is selected, the mobile terminal 100 transmits an image to the external screen using the wireless communication unit 110 and then displays the transmitted image on the external screen area.

In the following description, a process for displaying an image on an external screen area, which performs data transceivings with the mobile terminal 100, is explained in detail with reference to the accompanying drawings. In this embodiment, the mobile terminal 100 receives an input of an image including an area setting operation for an external screen via the camera 121. Therefore, the controller 180 recognizes the area setting operation from the inputted image and then sets a size and position of an external screen area according to the recognized area setting operation as shown in FIG. 35A.

Figure 35B:
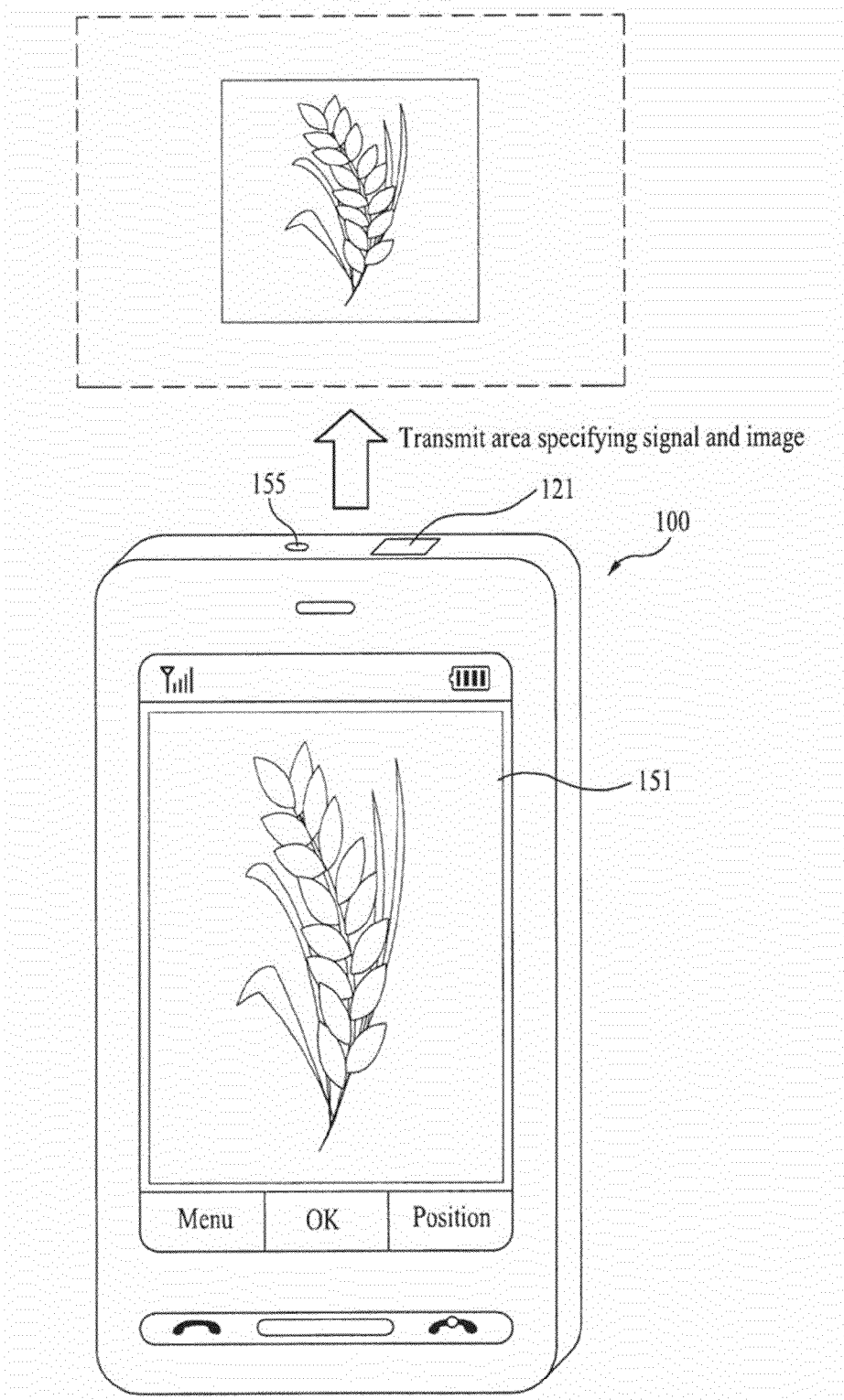
Figure 36B:
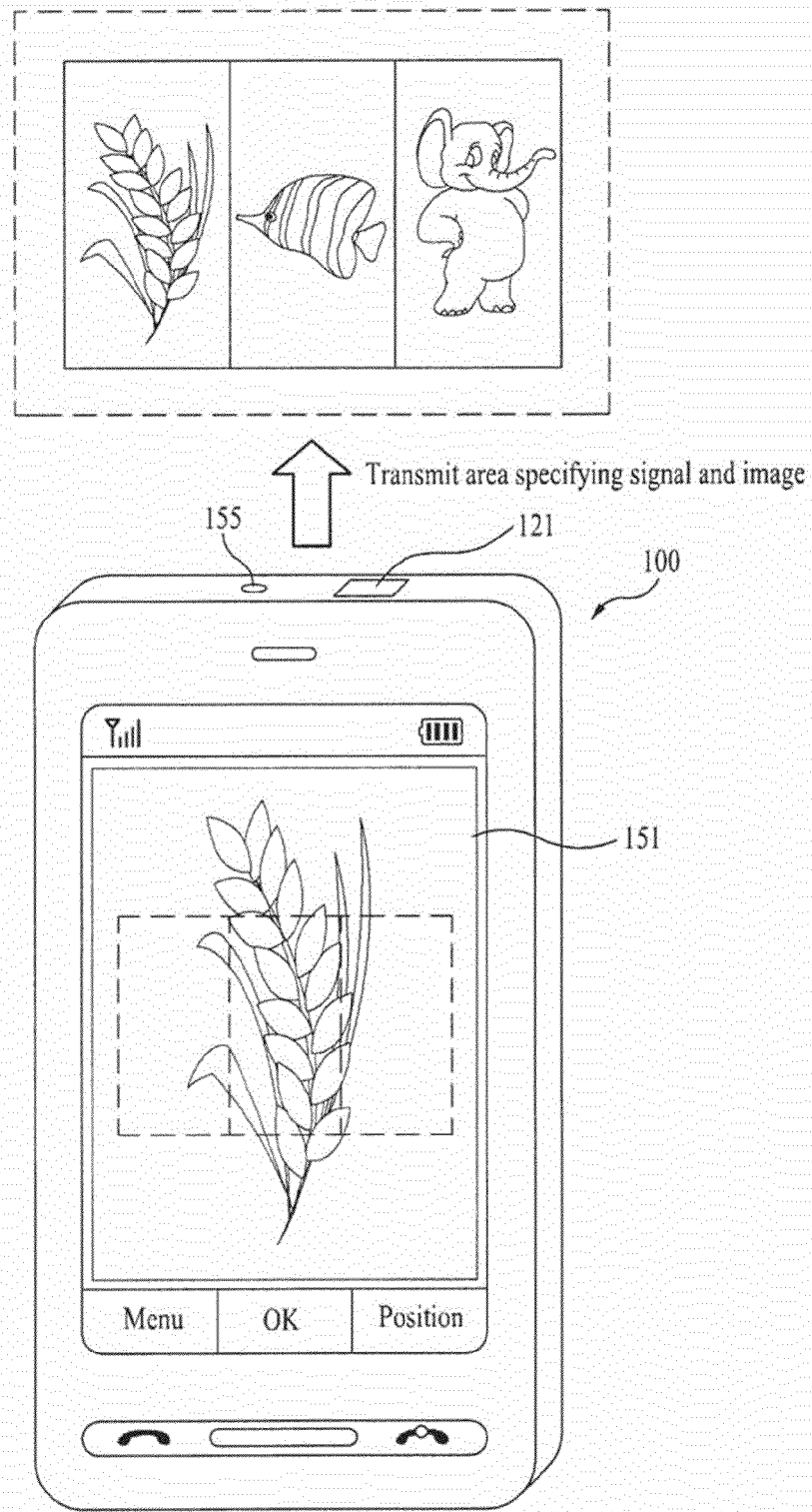

When a plurality of area setting operations are included in the inputted images, the size and position of the external screen area can be set according to each of a plurality of the area setting operations as shown in FIG. 36A. The mobile terminal 100 is able to transmit an area specifying signal including information on the size and position of the external screen area and the image to be displayed on the external screen area to the external screen via the wireless communication unit 110. Therefore, the external screen sets an area and then displays the received image on the set area according to the received area specifying signal and the received image as shown in FIG. 35B and FIG. 36B.

A size and position of an area are set by the area size and position setting process according to each of the above described embodiments and an area specifying signal including information on the set size and position of the area can be transmitted to the external screen. Moreover, the mobile terminal 100 according to an embodiment of the present invention is able to display a shifted image on the external screen area according to an image shift control signal. The image shift control signal refers to a signal for shifting an image in a prescribed direction to display a second partial image while a first partial image of a whole image is displayed. Such embodiments are explained in detail with reference to the accompanying drawings as follows.

Figure 37A:
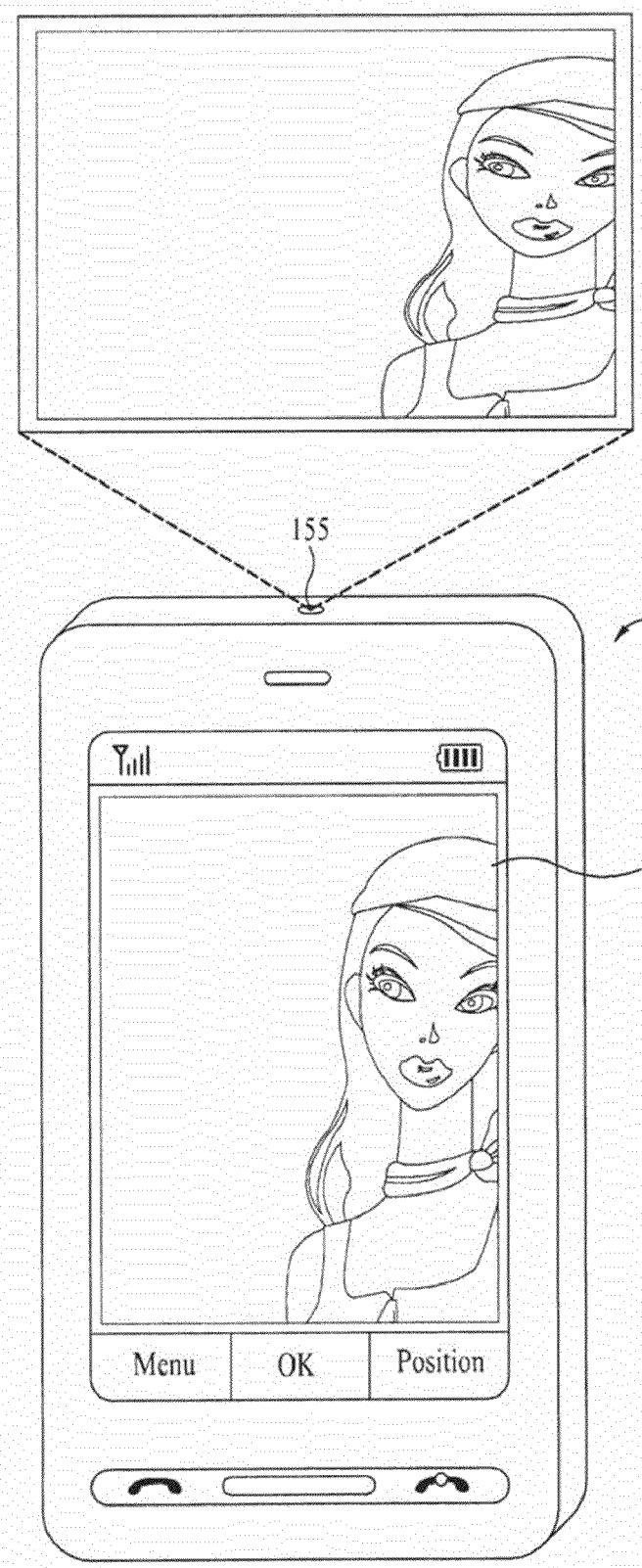
FIGS. 37A to 40 illustrate displaying an image on an area of an external screen responsive to an image shift control signal in a mobile terminal according to one embodiment of the present invention.
Figure 37B:
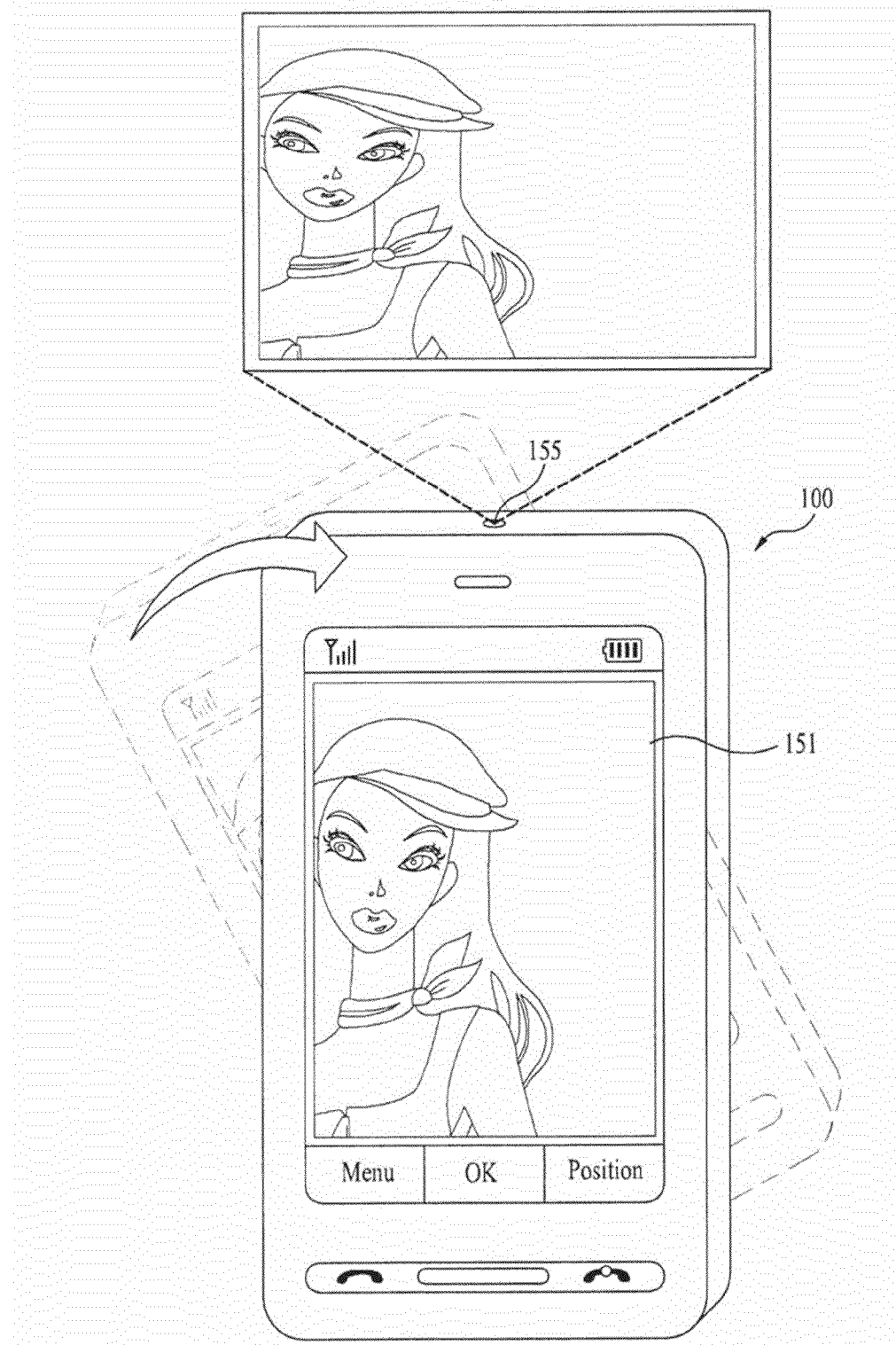
Figure 38B:
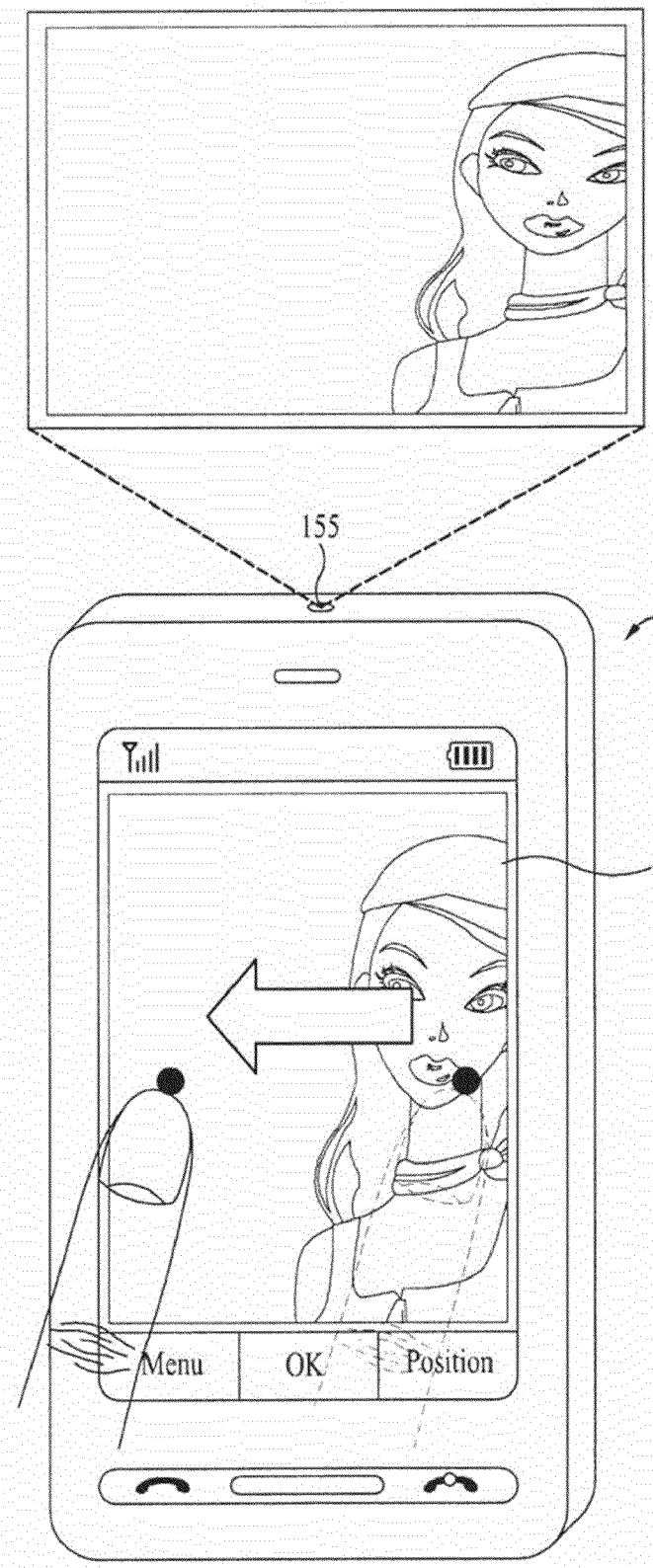
Figure 38C:
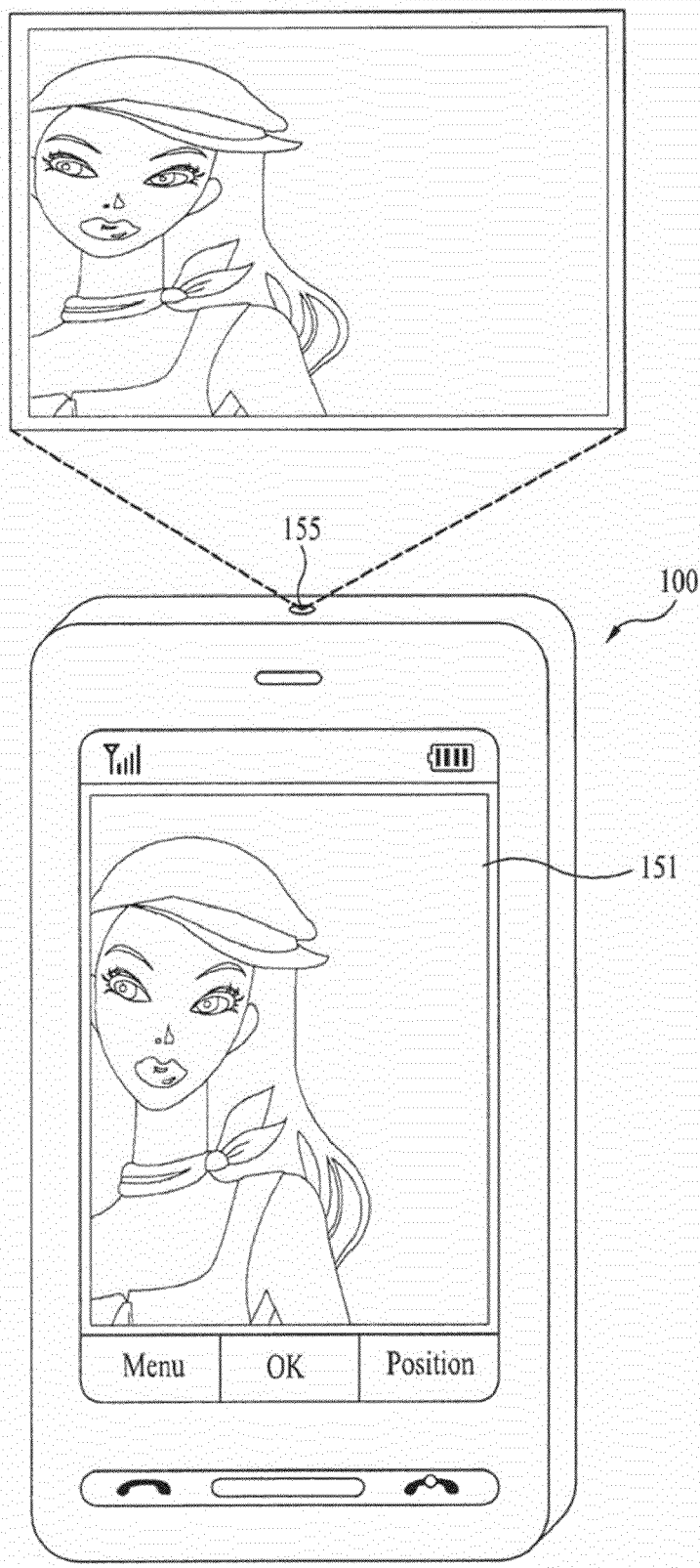
Figure 39A:
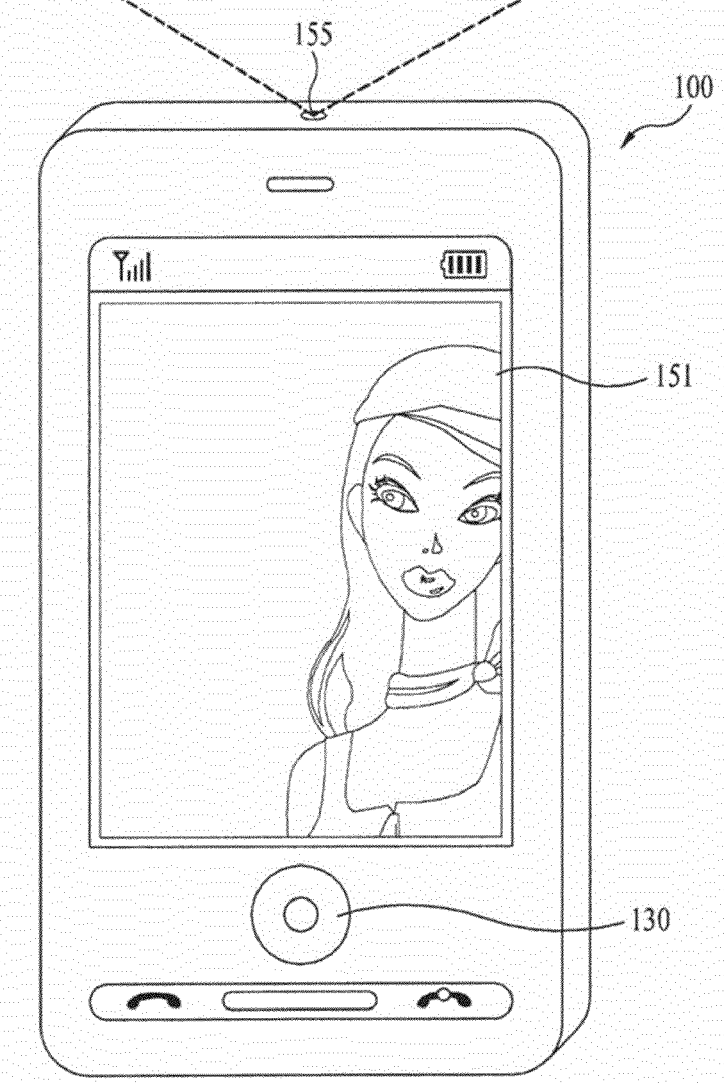
Figure 39B:
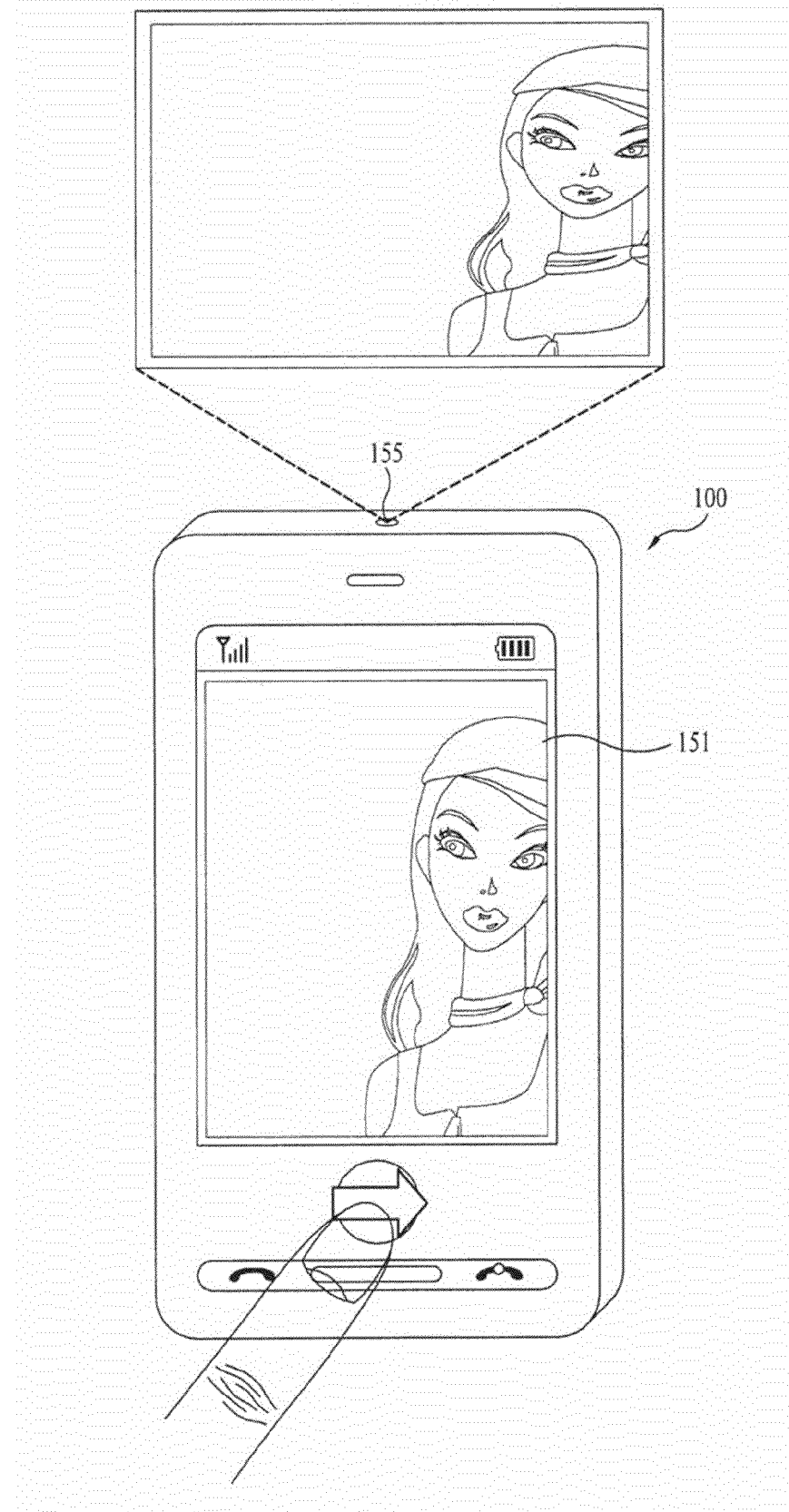
Figure 39C:
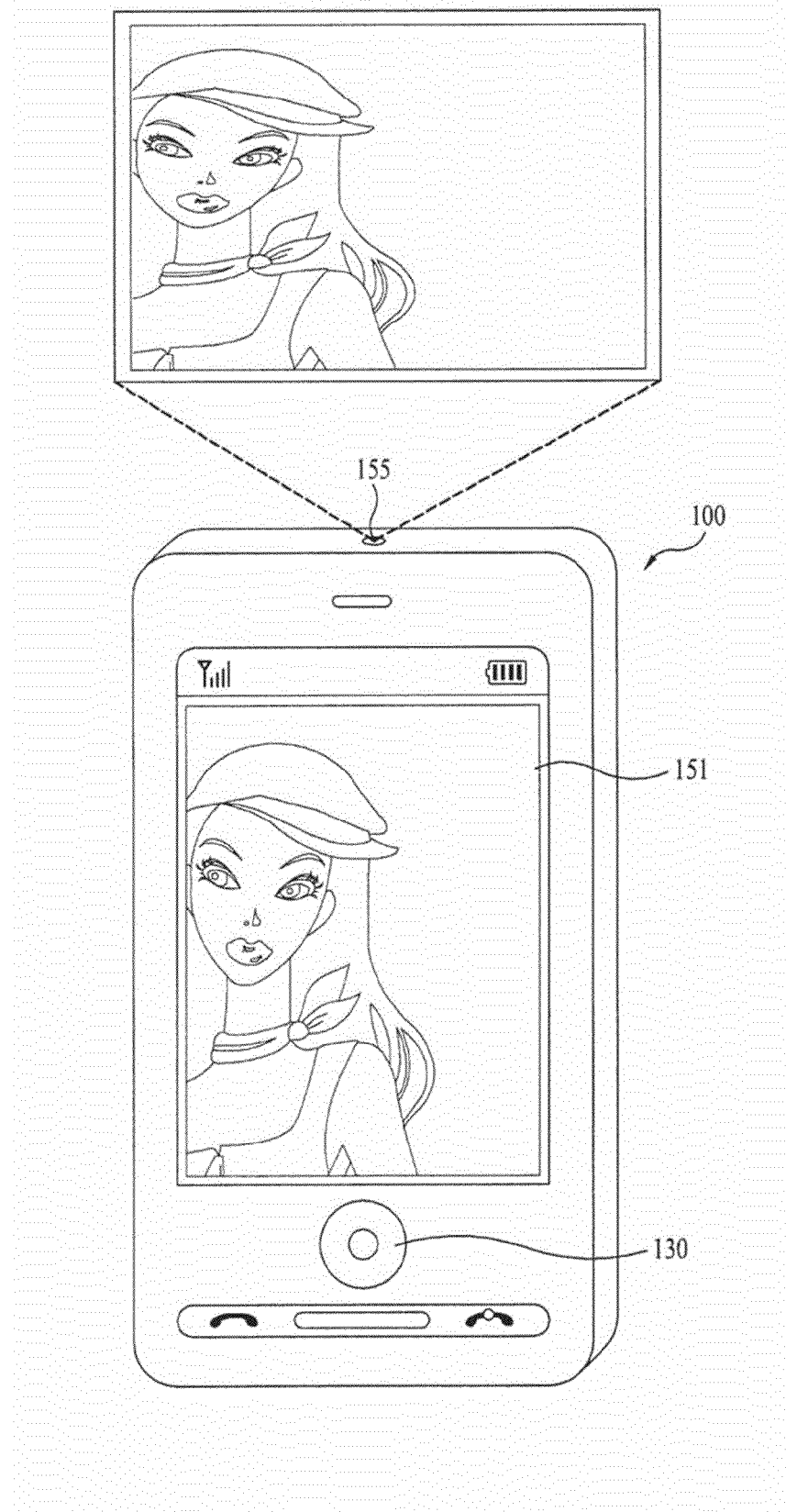
Figure 40:
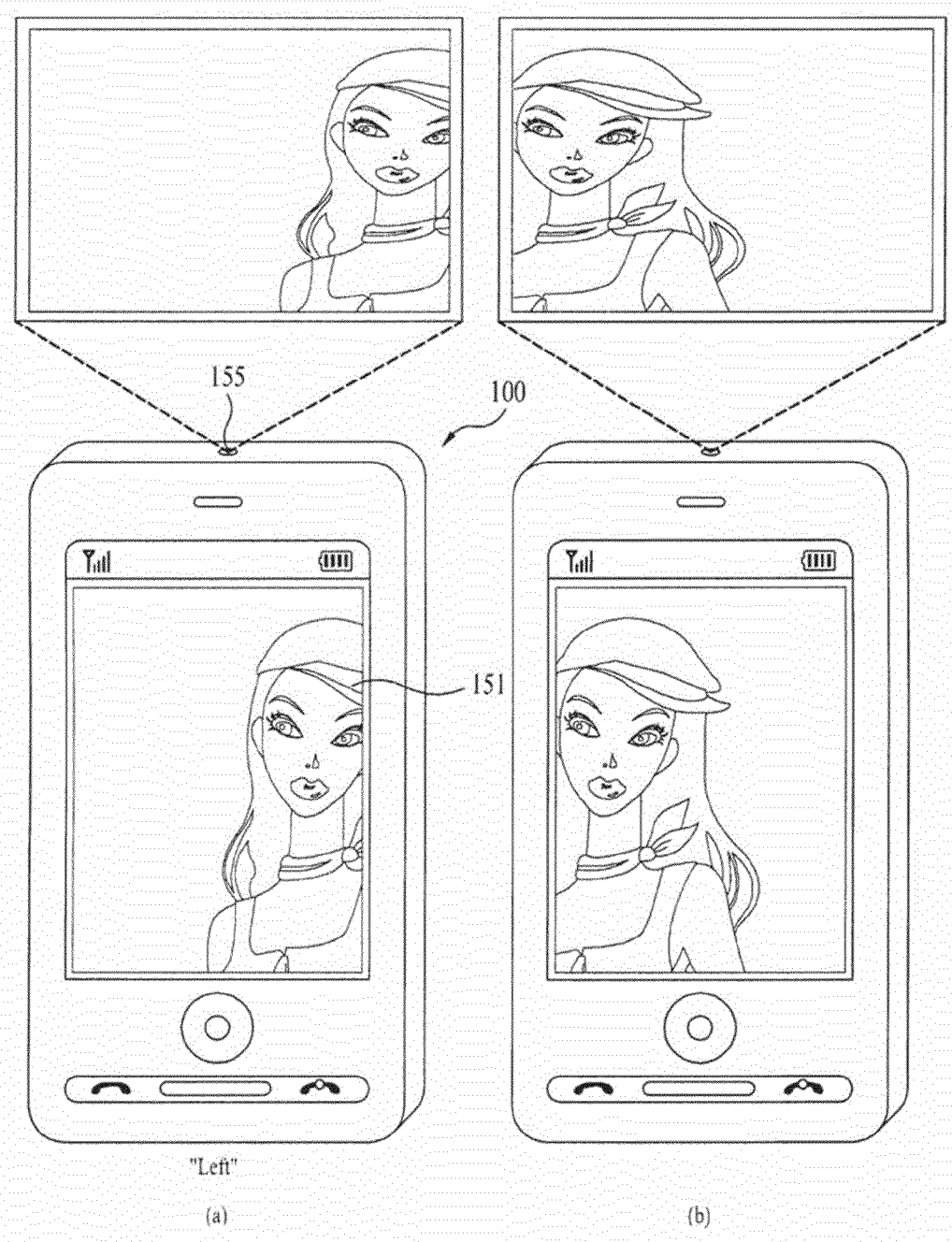

In this embodiment, while a first partial image of an entire image is displayed, upon detecting a shift signal in a prescribed direction, the mobile terminal 100 displays a second partial image shifted from the first partial image as shown in FIGS. 37A to 40. For example, the shift signal can be generated responsive to a motion of the mobile terminal 100 to a second position from a first position as shown in FIG. 37A and FIG. 37B, a touch and drag action on a touchscreen to a second point from a first point as shown in FIGS. 38A to 38C, a shift from a first position of a jog dial 130 to a second position thereof as shown in FIGS. 39A to 39C, a speech signal input for commanding a position shift, for example, "Left," as shown in FIG. 40 or the like.

According to one embodiment of the present invention, the above-described display controlling methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations such as transmission via the Internet.

Accordingly, various embodiments of the present invention provide the following effects and/or advantages. A user may be permitted to set a size and position of an area for displaying an image on an external screen in various ways. When displaying an image projected to an external screen via a projector module or an image transmitted to the external screen via a wireless communication unit, the image can be displayed on an area having the size or position set by the user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
 a projector module configured to project an image onto an external surface;
 a display having a touchscreen configured to receive a touch input, the touch input comprising a predetermined touch pattern; and a controller configured to:
  prompt whether a default image is to be used for display adjustment in response to an input for adjusting at least a size or a position of an external display area formed on the external surface;
  cause displaying of the default image on the external display area when the default image is selected for the display adjustment in response to the prompting;
  cause resizing of a screen area displayed via the display in response to a first touch pattern received via the touchscreen;
  adjust a size of the external display area according to the resizing of the screen area;
  cause repositioning of the resized screen area displayed via the display in response to a second touch pattern received via the touchscreen;
  adjust a position of the external display area according to the repositioning of the screen area; and
  cause the projector module to project the image on the adjusted external display area.

2. The mobile terminal of claim 1, wherein the first touch pattern comprises at least a touch and drag direction, a touch and drag distance, a distance between multi-touches, a touch count, a touch duration, a touch size, or a proximity distance of a proximity touch.

3. The mobile terminal of claim 1, wherein the second touch pattern comprises a touch and drag from a first point of the screen area to a second point, and the controller is further configured to:
  cause shifting of the screen area displayed via the display with reference to the second point; and
  cause shifting of the external display area according to the shifting of the screen area.

4. The mobile terminal of claim 1, further comprising:
  an image capturing device configured to receive a motion input,
  wherein the controller is further configured to:
    receive a control signal corresponding to the motion input; and
    adjust at least a size or a position of the external display area in response to the control signal.

5. The mobile terminal of claim 1, further comprising:
  a sound input device configured to receive a voice input,
  wherein the controller is further configured to:
    receive a control signal corresponding to the voice input; and
    adjust at least a size or a position of the external display area in response to the control signal.

6. The mobile terminal of claim 1, further comprising:
  a sensing unit configured to recognize movement of the mobile terminal,
  wherein the controller is further configured to:
    receive a control signal corresponding to the movement; and
    adjust at least a size or a position of the external display area in response to the control signal.

7. The mobile terminal of claim 1, further comprising:
  an input unit configured to receive an input for adjusting a size and a ratio of the projected image,
  wherein the controller is further configured to control the projector module to project the image on the external surface according to a default setting value, the default setting value being adjustable to one of a plurality of setting values responsive to the input for adjusting the size and the ratio of the projected image.

8. The mobile terminal of claim 1, further comprising:
  a wireless communication unit configured to transmit data including an image to another device including the external surface, wherein the transmitted image is displayed on the adjusted external display area.

9. The mobile terminal of claim 1, wherein the controller is further configured to cause the projector module to project a selected image onto the external surface such that the selected image is displayed on the adjusted external display area.

10. The mobile terminal of claim 9, wherein an entire image of the selected image is displayed on both the display and the adjusted external display area.

11. The mobile terminal of claim 1, wherein the controller is further configured to cause displaying of a key for activating an area position setting function at a portion of the touchscreen when the default image is displayed for the display adjustment.

12. The mobile terminal of claim 11, wherein the second touch pattern is recognized when the area position setting function has been activated such that the screen area displayed via the display is repositioned only after the key has been selected.

13. The mobile terminal of claim 1, wherein the controller is further configured to cause displaying of the default image on the display such that the same default image is displayed on both the external display area and the display concurrently during the display adjustment.

14. A method for projecting an image on an external surface via a mobile terminal comprising a projector module and a display having a touchscreen, the method comprising:
  projecting an image onto an external surface;
  receiving a touch input via the touchscreen, the touch input comprising a predetermined touch pattern;
  prompting whether a default image is to be used for display adjustment in response to an input for adjusting at least a size or a position of an external display area formed on the external surface;
  displaying the default image on the external display area when the default image is selected for the display adjustment in response to the prompting;
  resizing a screen area displayed via the display in response to a first touch pattern received via the touchscreen;
  adjusting a size of the external display area according to the resizing of the screen area;
  repositioning the resized screen area displayed via the display in response to a second touch pattern received via the touchscreen;
  adjusting a position of the external display area according to the repositioning of the screen area; and
  projecting the image on the adjusted external display area.

15. The method of claim 14, wherein
  the first touch pattern comprises at least a touch and drag direction, a touch and drag distance, a distance between multi-touches, a touch count, a touch duration, a touch size, or a proximity distance of a proximity touch.

16. The method of claim 14, wherein the second touch pattern comprises a touch and drag from a first point of the screen area to a second point, the method further comprising:
  shifting the screen area displayed via the display with reference to the second point; and
  shifting the external display area according to the shifting of the screen area.

17. The method of claim 14, further comprising:
  receiving a motion input via an image capturing device of the mobile terminal;
  receiving a control signal corresponding to the motion input; and adjusting at least a size or a position of the external display area in response to the control signal.

18. The method of claim 14, further comprising:
receiving a voice input via a sound input device of the mobile terminal;
receiving a control signal corresponding to the voice input; and
adjusting at least a size or a position of the external display area in response to the control signal.

19. The method of claim 14, further comprising:
recognizing movement of the mobile terminal via a sensing unit of the mobile terminal; and
receiving a control signal corresponding to the movement; and
adjusting at least a size or a position of the external display area in response to the control signal.

20. The method of claim 14, further comprising:
projecting the image on the external surface according to a default setting value.

21. The method of claim 20, further comprising:
receiving an input for adjusting a size and a ratio of the projected image via an input unit of the mobile terminal;
adjusting a setting value by switching from the default setting value to one of a plurality of predefined setting values in response to the input for adjusting the size and the ratio of the projected image; and
projecting the image on the external surface according to the adjusted setting value.

22. The method of claim 21, wherein the plurality of predefined setting values comprise a ratio of the image.

23. The method of claim 14, further comprising:
transmitting data including an image to another device including the external surface via a wireless communication unit of the mobile terminal,
wherein the transmitted image is displayed on the adjusted external display area.

24. The method of claim 14, further comprising:
selecting an image to be displayed on the external surface; and
projecting the selected image onto the external surface such that the selected image is displayed on the adjusted external display area.

* * * * *